US012309097B2

(12) United States Patent
Farag et al.

(10) Patent No.: US 12,309,097 B2
(45) Date of Patent: May 20, 2025

(54) METHOD AND APPARATUS FOR JOINT AND SEPARATE BEAM INDICATION

(71) Applicant: Samsung Electronics Co., Ltd., Suwon-si (KR)

(72) Inventors: Emad N. Farag, Flanders, NJ (US); Eko Onggosanusi, Coppell, TX (US); Md. Saifur Rahman, Plano, TX (US); Dalin Zhu, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 58 days.

(21) Appl. No.: 18/476,265

(22) Filed: Sep. 27, 2023

(65) Prior Publication Data

US 2024/0031105 A1 Jan. 25, 2024

Related U.S. Application Data

(63) Continuation of application No. 17/584,239, filed on Jan. 25, 2022, now Pat. No. 11,777,686.

(60) Provisional application No. 63/242,948, filed on Sep. 10, 2021, provisional application No. 63/228,948, filed on Aug. 3, 2021, provisional application No. 63/177,691, filed on Apr. 21, 2021, provisional application No. 63/144,328, filed on Feb. 1, 2021.

(51) Int. Cl.
*H04L 5/00* (2006.01)
(52) U.S. Cl.
CPC ......... *H04L 5/0053* (2013.01); *H04L 5/0048* (2013.01)

(58) Field of Classification Search
CPC ........................... H04L 5/0053; H04L 5/0048
See application file for complete search history.

(56) References Cited

U.S. PATENT DOCUMENTS

| 2020/0077395 A1 | 3/2020 | Guo |
| 2020/0267734 A1 | 8/2020 | Khoshnevisan |
| 2022/0272706 A1* | 8/2022 | Sengupta ............... H04W 52/18 |

OTHER PUBLICATIONS

"3rd Generation Partnership Project; Technical Specification Group Radio Access Network; NR; Physical channels and modulation (Release 16)", 3GPP TS 38.211 V16.8.0, Dec. 2021, 134 pages.
"3rd Generation Partnership Project; Technical Specification Group Radio Access Network; NR; Multiplexing and channel coding (Release 16)", 3GPP TS 38.212 V16.8.0, Dec. 2021, 153 pages.

(Continued)

*Primary Examiner* — Ronald B Abelson

(57) ABSTRACT

Systems and methods for joint and separate beam indication in a wireless communication system. A method of operating a user equipment (UE) includes receiving configuration information for a first set of transmission configuration indicator (TCI) states for joint TCI states or downlink (DL) TCI states and for a second set of TCI states for uplink (UL) TCI states if configured to operate with separate beam indication; receiving M TCI state code points; and if M>1, receiving downlink control information (DCI) that indicates at least one TCI state code point from the M TCI state code points. The method further includes determining a TCI state to apply to at least one of DL channels and UL channels; updating one or more spatial filters based on the determined TCI state; and at least one of receiving and transmitting the DL channels and the UL channels, respectively, based on the updated spatial filters.

18 Claims, 14 Drawing Sheets

(56) References Cited

OTHER PUBLICATIONS

"3rd Generation Partnership Project; Technical Specification Group Radio Access Network; NR; Physical layer procedures for control (Release 16)", 3GPP TS 38.213 V16.8.0, Dec. 2021, 189 pages.
"3rd Generation Partnership Project; Technical Specification Group Radio Access Network; NR; Physical layer procedures for data (Release 16)", 3GPP TS 38.214 V16.8.0, Dec. 2021, 172 pages.
"5G; NR; Medium Access Control (MAC) protocol specification (3GPP TS 38.321 version 16.7.0 Release 16)", ETSI TS 138 321 V16.7.0, Jan. 2022, 160 pages.
"5G; NR; Radio Resource Control (RRC); Protocol specification (3GPP TS 38.331 version 16.7.0 Release 16)", ETSI TS 138 331 V16 7.0, Jan. 2022, 950 pages.
International Search Report and Written Opinion dated May 3, 2022 regarding Application No. PCT/KR2022/001662, 7 pages.
Futurewei, "Enhancement on multi-beam operation", 3GPP TSG RAN WG1 Meeting #104-e, R1-2100044, Jan. 2021, 13 pages.
Samsung, "Multi-beam enhancements", 3GPP TSG RAN WG1 #104-e, R1-2101186, Jan. 2021, 22 pages.
Oppo, "Enhancements on Multi-Beam Operation", 3GPP TSG RAN WG1 #104-e, R1-2100118, Jan. 2021, 25 pages.

\* cited by examiner

METHOD AND APPARATUS FOR JOINT AND SEPARATE BEAM INDICATION

CROSS-REFERENCE TO RELATED APPLICATIONS AND CLAIM OF PRIORITY

This application is a continuation of U.S. patent application Ser. No. 17/584,239, filed on Jan. 25, 2022, which claims priority to: U.S. Provisional Patent Application No. 63/144,328, filed on Feb. 1, 2021; U.S. Provisional Patent Application No. 63/177,691, filed on Apr. 21, 2021; U.S. Provisional Patent Application No. 63/228,948, filed on Aug. 3, 2021; and U.S. Provisional Patent Application No. 63/242,948, filed on Sep. 10, 2021. The content of the above-identified patent document is incorporated herein by reference.

TECHNICAL FIELD

The present disclosure relates generally to wireless communication systems and, more specifically, the present disclosure relates to a joint and separate beam indication in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a joint and separate beam indication in a wireless communication system.

In one embodiment, a user equipment (UE) is provided. The UE includes a transceiver configured to: receive configuration information for operation with a joint beam indication or a separate beam indication, receive configuration information for a first set of transmission configuration indicator (TCI) states for joint TCI states or downlink (DL) TCI states, receive configuration information for a second set of TCI states for uplink (UL) TCI states if configured to operate with separate beam indication, receive M TCI state code points activated by a medium access control-control element (MAC CE), wherein M is a positive integer, and if M>1, receive downlink control information (DCI) that indicates at least one TCI state code point from the M TCI state code points. The UE also includes a processor operably coupled to the transceiver. The processor is configured to determine a TCI state to apply to at least one of DL channels and UL channels and update one or more spatial filters for at least one of the DL channels and the UL channels based on the determined TCI state. If M=1, the determined TCI state is based on the one TCI state code point activated by the MAC CE. If M>1, the determined TCI state is based on the at least one TCI state code point indicated by the DCI. The transceiver is further configured to at least one of receive and transmit the DL channels and the UL channels, respectively, based on the updated one or more spatial filters.

In another embodiment, a base station (BS) is provided. The BS includes a transceiver configured to: transmit configuration information for operation with a joint beam indication or a separate beam indication, transmit configuration information for a first set of TCI states for joint TCI states or DL TCI states, transmit configuration information for a second set of TCI states for UL TCI states if configured to operate with separate beam indication, transmit M TCI state code points activated by a MAC CE, wherein M is a positive integer, and if M>1, transmit DCI that indicates at least one TCI state code point from the M TCI state code points. The BS further includes a processor operably coupled to the transceiver. The processor is configured to determine a TCI state to apply to at least one of DL channels and UL channels and update one or more spatial filters for at least one of the DL channels and the UL channels based on the determined TCI state. If M=1, the determined TCI state is based on the one TCI state code point activated by the MAC CE. If M>1, the determined TCI state is based on the at least one TCI state code point indicated by the DCI. The transceiver is further configured to at least one of transmit and receive the DL channels and the UL channels, respectively, based on the updated one or more spatial filters.

In yet another embodiment, a method of operating a UE is provided. The method includes receiving configuration information to operate with joint beam indication or separate beam indication; receiving configuration information for a first set of TCI states for joint TCI states or DL TCI states; receiving configuration information for a second set of TCI states for UL TCI states if configured to operate with separate beam indication; and receiving M TCI state code points activated by a MAC CE. M is a positive integer. The method further includes, if M>1, receiving downlink control information (DCI) that indicates at least one TCI state code point from the M TCI state code points and determining a TCI state to apply to at least one of DL channels and UL channels. If M=1, the determined TCI state is based on the one TCI state code point activated by the MAC CE. If M>1, the determined TCI state is based on the at least one TCI state code point indicated by the DCI. The method further includes updating one or more spatial filters for at least one of the DL channels and the UL channels based on the determined TCI state; and at least one of receiving and transmitting the DL channels and the UL channels, respectively, based on the updated one or more spatial filters.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.8.0, "NR; Physical channels and modulation"; 3GPP TS 38.212 v16.8.0, "NR; Multiplexing and Channel coding"; 3GPP TS 38.213 v16.8.0, "NR; Physical Layer Procedures for Control"; 3GPP TS 38.214 v16.8.0, "NR; Physical Layer Procedures for Data"; 3GPP TS 38.321 v16.7.0, "NR; Medium Access Control (MAC) protocol specification"; and 3GPP TS 38.331 v16.7.0, "NR; Radio Resource Control (RRC) Protocol Specification."

Figure 1:
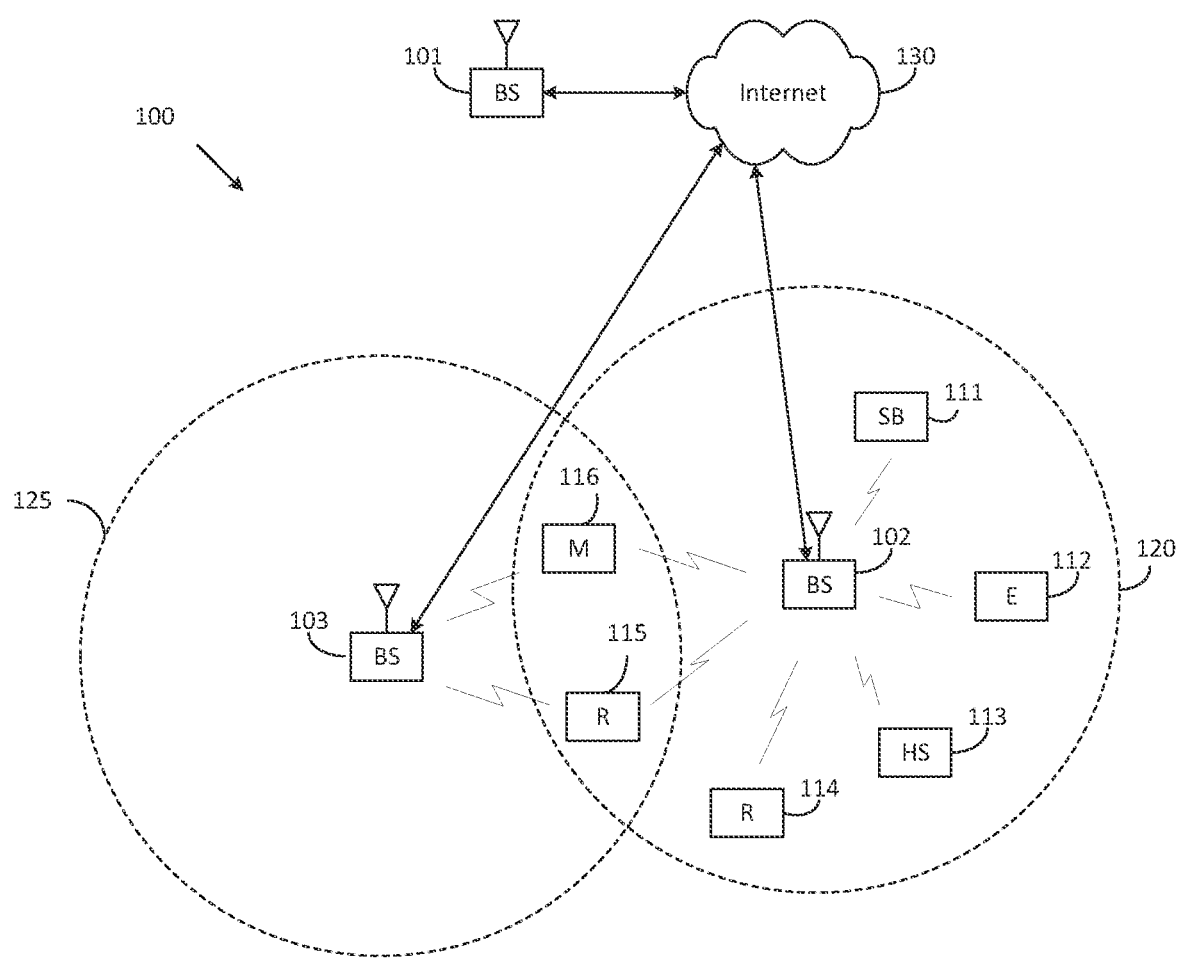
FIG. 1 illustrates an example of wireless network according to embodiments of the present disclosure.
Figure 2:
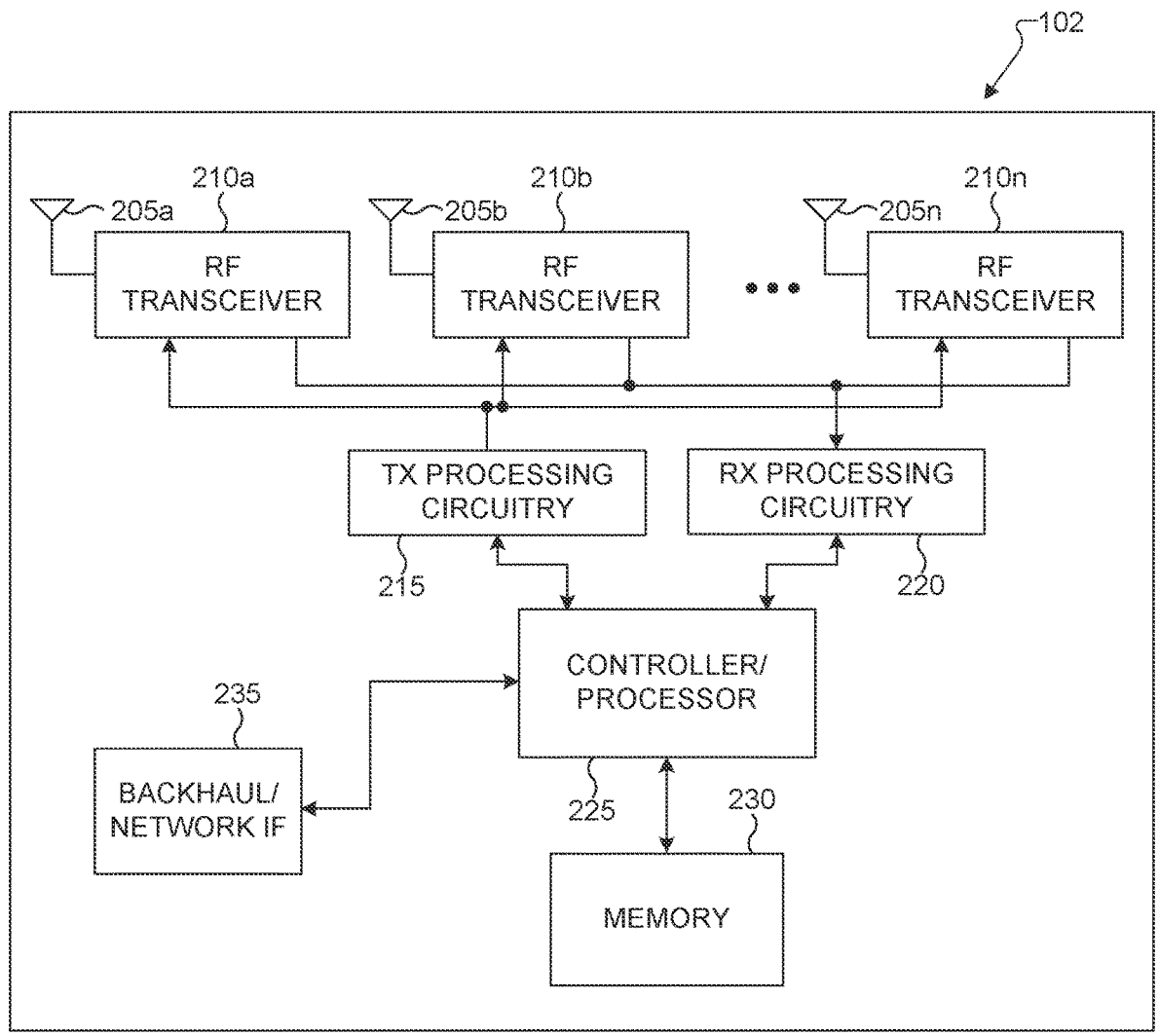
FIG. 2 illustrates an example of gNB according to embodiments of the present disclosure.
Figure 3:
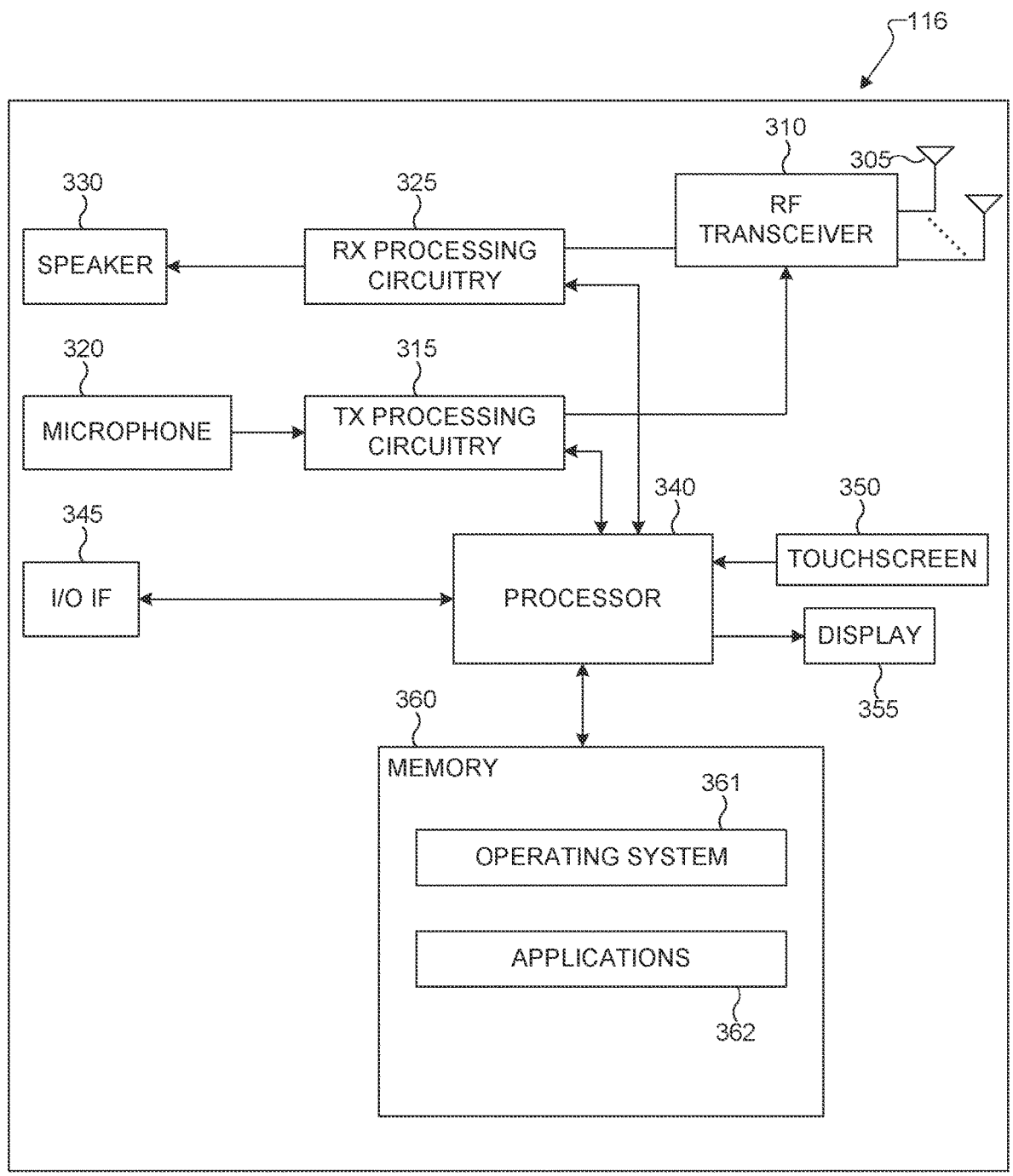
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for joint and separate beam indication in a wireless communication system. In certain embodiments, and one or more of the gNBs 101-103 includes circuitry, programing, or a combination thereof, for joint and separate beam indication in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support joint and separate beam indication in a wireless communication network. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for joint and separate beam indication in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RSI is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DM-RS is transmitted only in the BW of a respective PDCCH or PDSCH and a UE can use the DMRS to demodulate data or control information.

Figure 4:
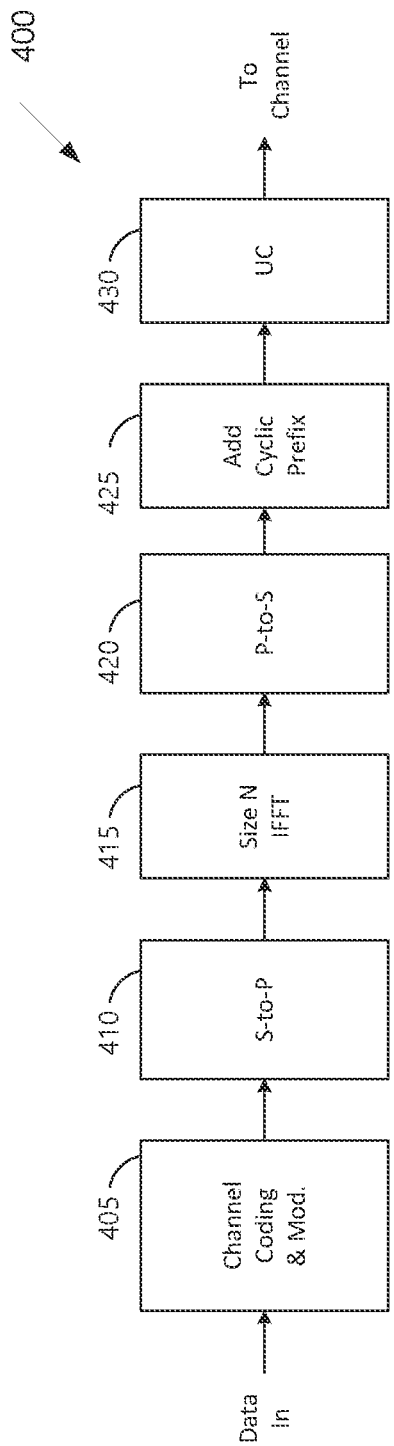
FIGS. 4 and 5 illustrate example of wireless transmit and receive paths according to this disclosure.
Figure 5:
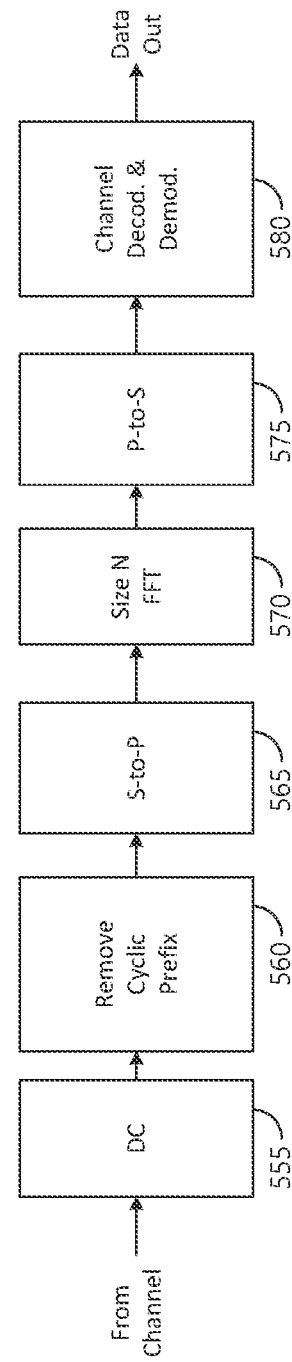

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNB s 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Figure 6A:
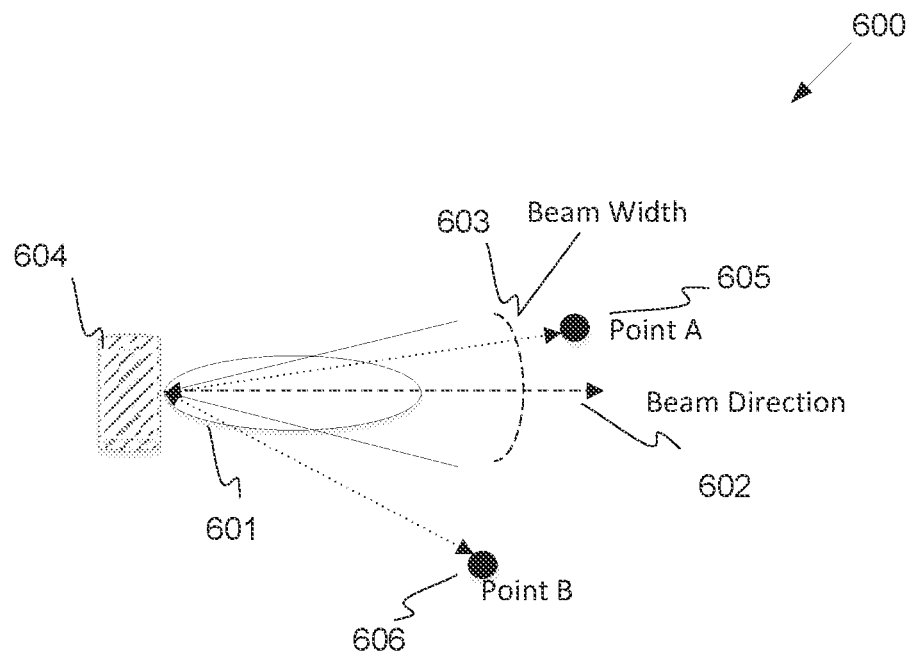
FIG. 6A illustrate an example of wireless system beam according to embodiments of the present disclosure.

FIG. 6A illustrate an example wireless system beam 600 according to embodiments of the present disclosure. An embodiment of the wireless system beam 600 shown in FIG. 6A is for illustration only.

As illustrated in FIG. 6A, in a wireless system a beam 601, for a device 604, can be characterized by a beam direction 602 and a beam width 603. For example, a device 604 with a transmitter transmits radio frequency (RF) energy in a beam direction and within a beam width. The device 604 with a receiver receives RF energy coming towards the device in a beam direction and within a beam width. As illustrated in FIG. 6A, a device at point A 605 can receive from and transmit to the device 604 as point A is within a beam width of a beam traveling in a beam direction and coming from the device 604.

As illustrated in FIG. 6A, a device at point B 606 cannot receive from and transmit to the device 604 as point B is outside a beam width of a beam traveling in a beam direction and coming from the device 604. While FIG. 6A, for illustrative purposes, shows a beam in 2-dimensions (2D), it may be apparent to those skilled in the art, that a beam can be in 3-dimensions (3D), where the beam direction and beam width are defined in space.

Figure 6B:
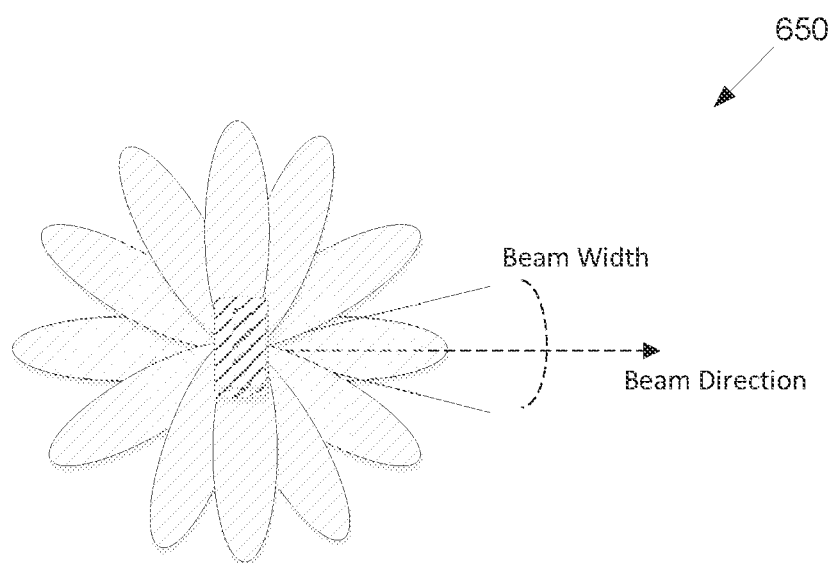
FIG. 6B illustrate an example of multi-beam operation according to embodiments of the present disclosure.

FIG. 6B illustrate an example multi-beam operation 650 according to embodiments of the present disclosure. An embodiment of the multi-beam operation 650 shown in FIG. 6B is for illustration only.

In a wireless system, a device can transmit and/or receive on multiple beams. This is known as "multi-beam operation" and is illustrated in FIG. 6B. While FIG. 6B, for illustrative purposes, is in 2D, it may be apparent to those skilled in the art, that a beam can be 3D, where a beam can be transmitted to or received from any direction in space.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 7.

Figure 7:
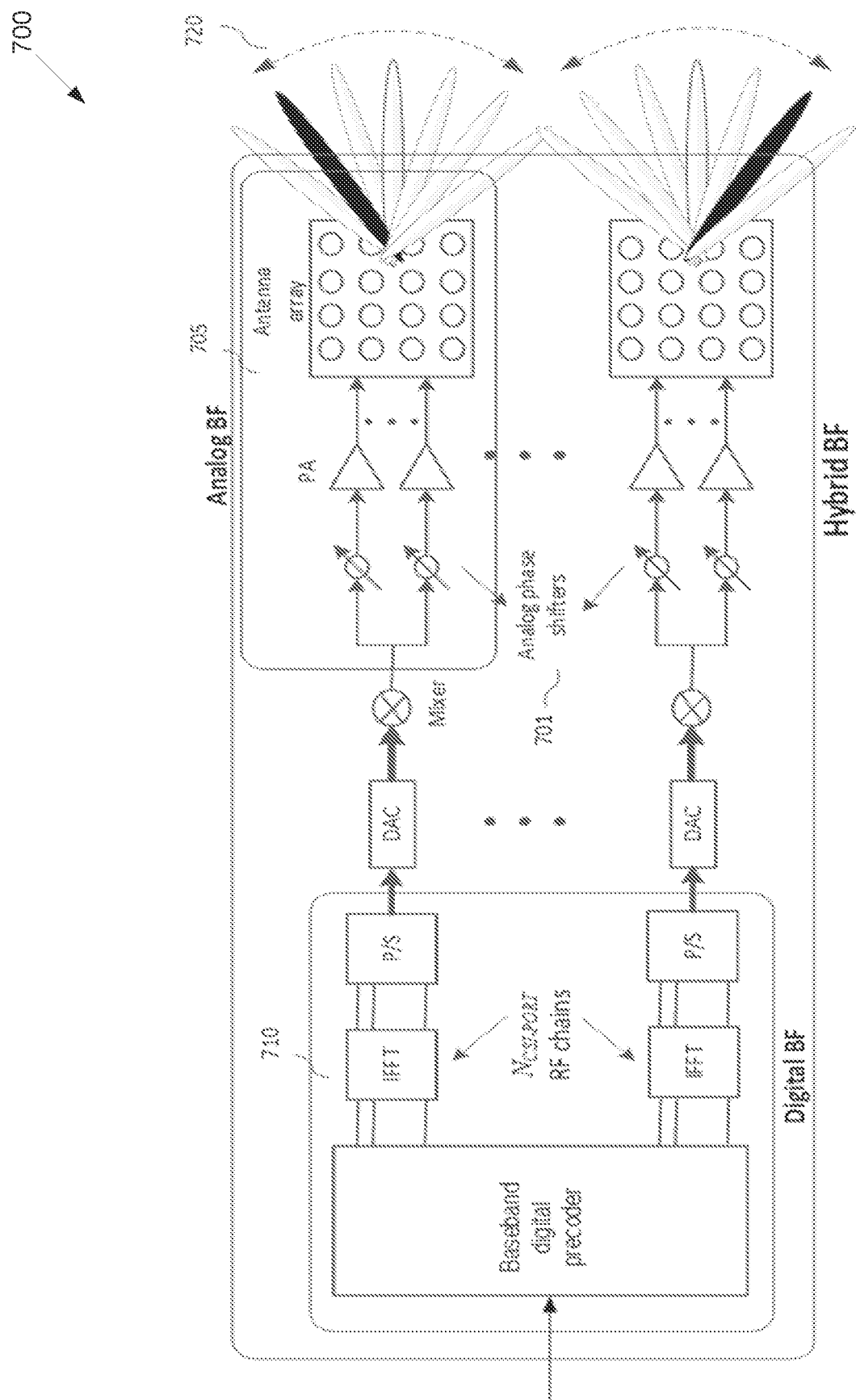
FIG. 7 illustrate an example of antenna structure according to embodiments of the present disclosure.

FIG. 7 illustrate an example antenna structure 700 according to embodiments of the present disclosure. An embodiment of the antenna structure 700 shown in FIG. 7 is for illustration only.

In this case, one CSI-RS port is mapped onto a large number of antenna elements which can be controlled by a bank of analog phase shifters 701. One CSI-RS port can then correspond to one sub-array which produces a narrow analog beam through analog beamforming 705. This analog beam can be configured to sweep across a wider range of angles 720 by varying the phase shifter bank across symbols or subframes. The number of sub-arrays (equal to the number of RF chains) is the same as the number of CSI-RS ports $N_{CSI\text{-}PORT}$. A digital beamforming unit 710 performs a linear combination across $N_{CSI\_PORT}$ analog beams to further increase precoding gain. While analog beams are wideband (hence not frequency-selective), digital precoding can be varied across frequency sub-bands or resource blocks. Receiver operation can be conceived analogously.

Since the aforementioned system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting", respectively), and receiving a DL or UL transmission via a selection of a corresponding RX beam.

The aforementioned system is also applicable to higher frequency bands such as >52.6 GHz. In this case, the system can employ only analog beams. Due to the O2 absorption loss around 60 GHz frequency (~10 dB additional loss @100m distance), larger number of and sharper analog beams (hence larger number of radiators in the array) may be needed to compensate for the additional path loss.

Rel-17 introduced the unified TCI framework, where a unified or master or main TCI state is signaled to the UE. The unified or master or main TCI state can be one of: (1) in case of joint TCI state indication, wherein a same beam is used for DL and UL channels, a joint TCI state that can be used at least for UE-dedicated DL channels and UE-dedicated UL channels; (2) in case of separate TCI state indication, wherein different beams are used for DL and UL channels, a DL TCI state that can be used at least for UE-dedicated DL channels; and/or (3) in case of separate TCI state indication, wherein different beams are used for DL and UL channels, a UL TCI state that can be used at least for UE-dedicated UL channels.

The unified (master or main) TCI state is TCI state of UE-dedicated reception on PDSCH/PDCCH or UE-dedicated transmission on dynamic-grant/configured-grant based PUSCH and all of dedicated PUCCH resources.

The unified TCI framework applies to intra-cell beam management, wherein, the TCI states have a source RS that is directly or indirectly associated (as described in component 4), through a quasi-co-location relation, e.g., spatial relation, with an SSB of a serving cell. The unified TCI state framework also applies to inter-cell beam management, wherein a TCI state can have a source RS that is directly or indirectly associated, through a quasi-co-location relation, e.g., spatial relation, with an SSB of cell that has a PCI different from the PCI of the serving cell.

A quasi-co-location (QCL) relation can be quasi-location with respect to one or more of the following relations: (1) Type A, {Doppler shift, Doppler spread, average delay, delay spread}; (2) Type B, {Doppler shift, Doppler spread}; (3) Type C, {Doppler shift, average delay}; and/or (4) Type D, {Spatial Rx parameter}.

In addition, quasi-co-location relation can also provide a spatial relation for UL channels, e.g., a DL source reference signal provides information on the spatial domain filter to be used for UL transmissions, or the UL source reference signal provides the spatial domain filter to be used for UL transmissions, e.g., same spatial domain filter for UL source reference signal and UL transmissions.

The unified (master or main) TCI state applies at least to UE dedicated DL and UL channels. The unified (master or main) TCI can also apply to other DL and/or UL channels and/or signals e.g., non-UE dedicated channel and sounding reference signal (SRS).

In U.S. patent application Ser. No. 17/148,517 filed Jan. 13, 2021, which is incorporated by reference herein, a TCI DCI can be a dedicated channel for beam indication information, i.e., a purposed designed DL channel for beam indication. Beam indication information can also be included in a DL-related DCI or in an UL-related DCI. The present disclosure provides more detailed aspects related to the configuration and signaling of beam indication relaying on L1 signaling as well as higher layer configuration and signaling.

In 3GPP standard specification release 15/16, a common framework is shared for CSI and beam management, while the complexity of such framework is justified for CSI in FR1, it makes beam management procedures rather cumbersome, and less efficient in FR2. Efficiency here refers to overhead associated with beam management operations and latency for reporting and indicating new beams.

Furthermore, in release 15/16, the beam management framework is different for different channels. This increases the overhead of beam management, and could lead to less robust beam-based operation. For example, for PDCCH the TCI state (used for beam indication), is updated through MAC CE signaling. While the TCI state of PDSCH can updated through a DL DCI carrying the DL assignment with codepoints configured by MAC CE, or the PDSCH TCI state can follow that of the corresponding PDCCH, or use a default beam indication.

In the uplink direction, the spatialRelationInfo framework is used for beam indication for PUCCH and SRS, which is updated through RRC and MAC CE signaling. For PUSCH the SRI (SRS Resource Indicator), in an UL DCI with UL grants, can be used for beam indication. Having different beam indications and beam indication update mechanisms increases the complexity, overhead and latency of beam management, and could lead to less robust beam-based operation.

To reduce the latency and overhead of beam indication, an L1 based beam indication has been provided, wherein a TCI DCI is used for beam indication. A TCI DCI can be a dedicated channel for beam indication information, i.e., a purposed designed DL channel for beam indication. Beam indication information can also be included in a DL-related DCI (with a DL assignment or without a DL assignment) or in an UL-related DCI (with an UL grant or without an UL grant). The present disclosure provides design aspects for joint and separate beam indication including RRC signaling, MAC CE and L1 control (DCI) signaling.

The present disclosure relates to a 5G/NR communication system.

The present disclosure provides design aspects for joint and separate beam indication including RRC signaling, MAC CE and L1 control (DCI) signaling.

In the following, both FDD and TDD are considered as a duplex method for DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

In the present disclosure, the term "activation" describes an operation wherein a UE receives and decodes a signal from the network (or gNB) that signifies a starting point in time. The starting point can be a present or a future slot/subframe or symbol and the exact location is either implicitly or explicitly indicated, or is otherwise specified in the system operation or is configured by higher layers. Upon successfully decoding the signal, the UE responds according to an indication provided by the signal. The term "deactivation" describes an operation wherein a UE receives and decodes a signal from the network (or gNB) that signifies a stopping point in time. The stopping point can be a present or a future slot/subframe or symbol and the exact location is either implicitly or explicitly indicated, or is otherwise specified in the system operation or is configured by higher layers. Upon successfully decoding the signal, the UE responds according to an indication provided by the signal.

Terminology such as TCI, TCI states, SpatialRelationInfo, target RS, reference RS, and other terms is used for illustrative purposes and is therefore not normative. Other terms that refer to same functions can also be used.

A "reference RS" corresponds to a set of characteristics of a DL beam or an UL TX beam, such as a direction, a precoding/beamforming, a number of ports, and so on. For instance, for DL, as the UE receives a reference RS index/ ID, for example through a field in a DCI format, that is represented by a TCI state, the UE applies the known characteristics of the reference RS to associated DL reception. The reference RS can be received and measured by the UE (for example, the reference RS is a downlink signal such as NZP CSI-RS and/or SSB) and the UE can use the result of the measurement for calculating a beam report (in Rel-15 NR, a beam report includes at least one L1-RSRP accompanied by at least one CRI). Using the received beam report, the NW/gNB can assign a particular DL TX beam to the UE. A reference RS can also be transmitted by the UE (for example, the reference RS is an uplink signal such as SRS). As the NW/gNB receives the reference RS from the UE, the NW/gNB can measure and calculate information used to assign a particular DL TX beam to the UE. This option is applicable at least when there is DL-UL beam pair correspondence.

In another instance, for UL transmissions, a UE can receive a reference RS index/ID in a DCI format scheduling an UL transmission such as a PUSCH transmission and the UE then applies the known characteristics of the reference RS to the UL transmission. The reference RS can be received and measured by the UE (for example, the reference RS is a downlink signal such as NZP CSI-RS and/or SSB) and the UE can use the result of the measurement to calculate a beam report. The NW/gNB can use the beam report to assign a particular UL TX beam to the UE. This option is applicable at least when DL-UL beam pair correspondence holds. A reference RS can also be transmitted by the UE (for example, the reference RS is an uplink signal such as SRS or DMRS). The NW/gNB can use the received reference RS to measure and calculate information that the NW/gNB can use to assign a particular UL TX beam to the UE.

The reference RS can be triggered by the NW/gNB, for example via DCI in case of aperiodic (AP) RS, or can be configured with a certain time-domain behavior, such as a periodicity and offset in case of periodic RS, or can be a combination of such configuration and activation/deactivation in case of semi-persistent RS.

For mmWave bands (or FR2) or for higher frequency bands (such as >52.6 GHz or FR4) where multi-beam operation is especially relevant, a transmission-reception process includes a receiver selecting a receive (RX) beam for a given TX beam. For DL multi-beam operation, a UE selects a DL RX beam for every DL TX beam (that corresponds to a reference RS). Therefore, when DL RS, such as CSI-RS and/or SSB, is used as reference RS, the NW/gNB transmits the DL RS to the UE for the UE to be able to select a DL RX beam. In response, the UE measures the DL RS, and in the process selects a DL RX beam, and reports the beam metric associated with the quality of the DL RS.

In this case, the UE determines the TX-RX beam pair for every configured (DL) reference RS. Therefore, although this knowledge is unavailable to the NW/gNB, the UE, upon receiving a DL RS associated with a DL TX beam indication from the NW/gNB, can select the DL RX beam from the information the UE obtains on all the TX-RX beam pairs. Conversely, when an UL RS, such as an SRS and/or a DMRS, is used as reference RS, at least when DL-UL beam correspondence or reciprocity holds, the NW/gNB triggers or configures the UE to transmit the UL RS (for DL and by reciprocity, this corresponds to a DL RX beam). The gNB, upon receiving and measuring the UL RS, can select a DL TX beam. As a result, a TX-RX beam pair is derived. The NW/gNB can perform this operation for all the configured UL RSs, either per reference RS or by "beam sweeping", and determine all TX-RX beam pairs associated with all the UL RSs configured to the UE to transmit.

The following two embodiments (A-1 and A-2) are examples of DL multi-beam operations that utilize DL-TCI-state based DL beam indication. In the first example embodiment (A-1), an aperiodic CSI-RS is transmitted by the NW/gNB and received/measured by the UE. This embodiment can be used regardless of whether or not there is UL-DL beam correspondence. In the second example embodiment (A-2), an aperiodic SRS is triggered by the NW and transmitted by the UE so that the NW (or a gNB) can measure the UL channel quality for the purpose of assigning a DL RX beam. This embodiment can be used at least when there is UL-DL beam correspondence. Although aperiodic RS is considered in the two examples, a periodic or a semi-persistent RS can also be used.

Figure 8:
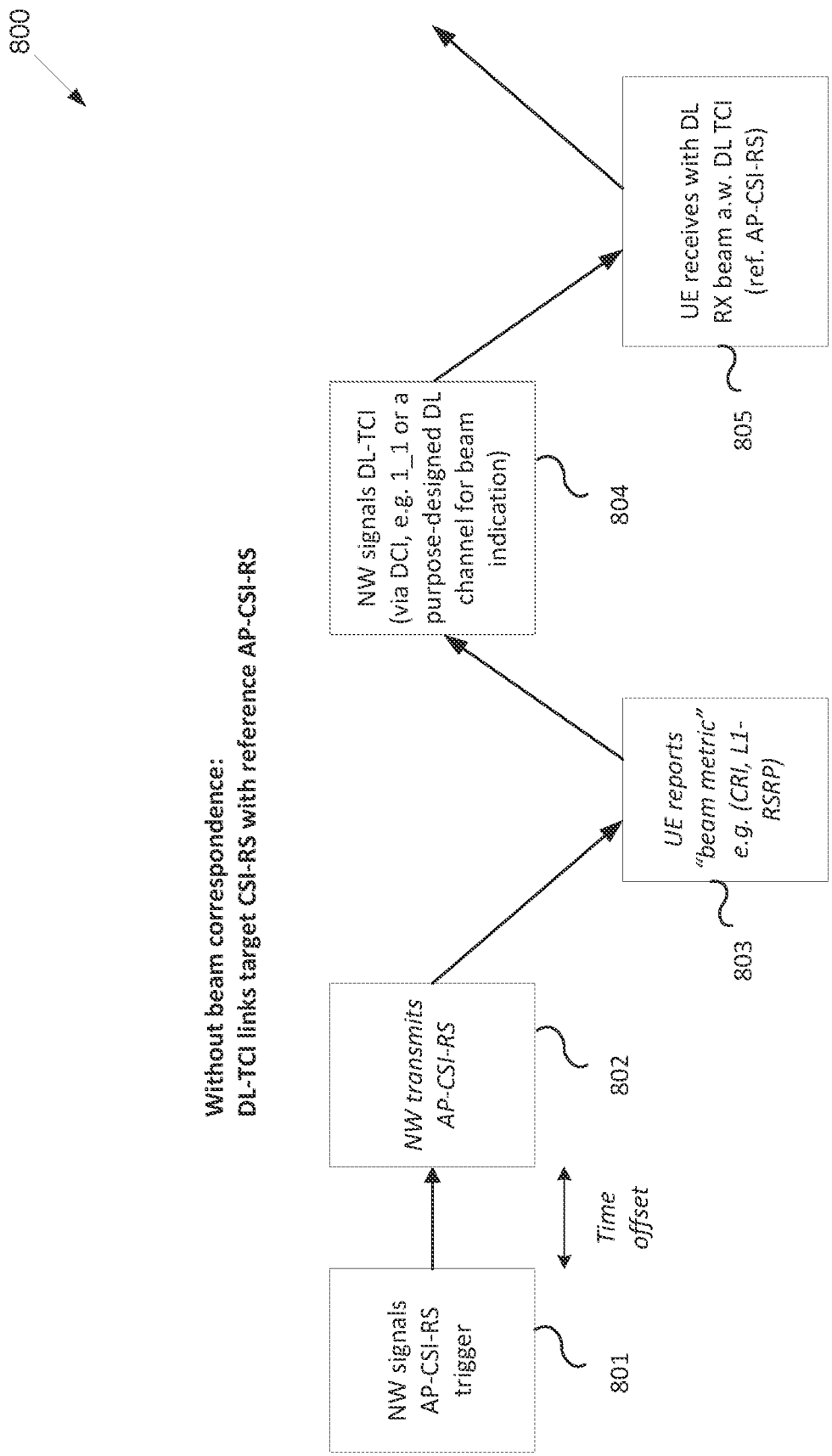
FIG. 8 illustrates an example of DL multi beam operation according to embodiments of the present disclosure.

FIG. 8 illustrates an example of DL multi beam operation 800 according to embodiments of the present disclosure. An embodiment of the DL multi beam operation 800 shown in FIG. 8 is for illustration only.

In one example illustrated in FIG. 8 (embodiment A-1), a DL multi-beam operation 800 starts with the gNB/NW signaling to a UE an aperiodic CSI-RS (AP-CSI-RS) trigger or indication (step 801). This trigger or indication can be included in a DCI and indicate transmission of AP-CSI-RS in a same (zero time offset) or in a later slot/sub-frame (>0 time offset). For example, the DCI can be related to scheduling of a DL reception or an UL transmission and the CSI-RS trigger can be either jointly or separately coded with a CSI report trigger. Upon receiving the AP-CSI-RS transmitted by the gNB/NW (step 802), the UE measures the AP-CSI-RS and calculates and reports a "beam metric" that indicates a quality of a particular TX beam hypothesis (step 803). Examples of such beam reporting are a CSI-RS resource indicator (CRI), or a SSB resource indicator (SSB-RI), coupled with an associated L1-RSRP/L1-RSRQ/L1-SINR/CQI.

Upon receiving the beam report from the UE, the gNB/NW can use the beam report to select a DL RX beam for the UE and indicate the DL RX beam selection (step 804) using a TCI-state field in a DCI format such as a DCI format scheduling a PDSCH reception by the UE. In this case, a value of the TCI-state field indicates a reference RS, such as an AP-CSI-RS, representing the selected DL TX beam (by the gNB/NW). In addition, the TCI-state can also indicate a "target" RS, such as a. CSI-RS, that is linked to the reference RS, such as an AP-CSI-RS. Upon successfully decoding the DCI format providing the TCI-state, the UE selects an DL RX beam and performs DL reception, such as a PDSCH reception, using the DL RX beam associated with the reference CSI-RS (step 805).

Alternatively, the gNB/NW can use the beam report to select a DL RX beam for the UE and indicate to the UE the selected DL RX beam (step 804) using a value of a TCI-state field in a purpose-designed DL channel for beam indication. A purpose-designed DL channel for beam indication can be UE-specific or for a group of UEs. For example, a UE-specific DL channel can be a PDCCH that a UE receives according to a UE-specific search space (USS) while a UE-group common DL channel can be a PDCCH that a UE receives according to a common search space (CSS). In this case, the TCI-state indicates a reference RS, such as an AP-CSI-RS, representing the selected DL TX beam (by the gNB/NW). In addition, the TCI-state can also indicate a "target" RS, such as a CSI-RS, that is linked to the reference RS, such as an AP-CSI-RS. Upon successfully decoding the purpose-designed DL channel for beam indication with the TCI state, the UE selects a DL RX beam and performs DL reception, such as a PDSCH reception, using the DL RX beam associated with the reference CSI-RS (step 805).

For this embodiment (A-1), as described above, the UE selects a DL RX beam using an index of a reference RS, such as an AP-CSI-RS, that is provided via the TCI state field, for example in a DCI format. In this case, the CSI-RS resources or, in general, the DL RS resources including CSI-RS, SSB, or a combination of the two, that are configured to the UE as the reference RS resources can be linked to (associated with) a "beam metric" reporting such as CRI/L1-RSRP or L1-SINR.

Figure 9:
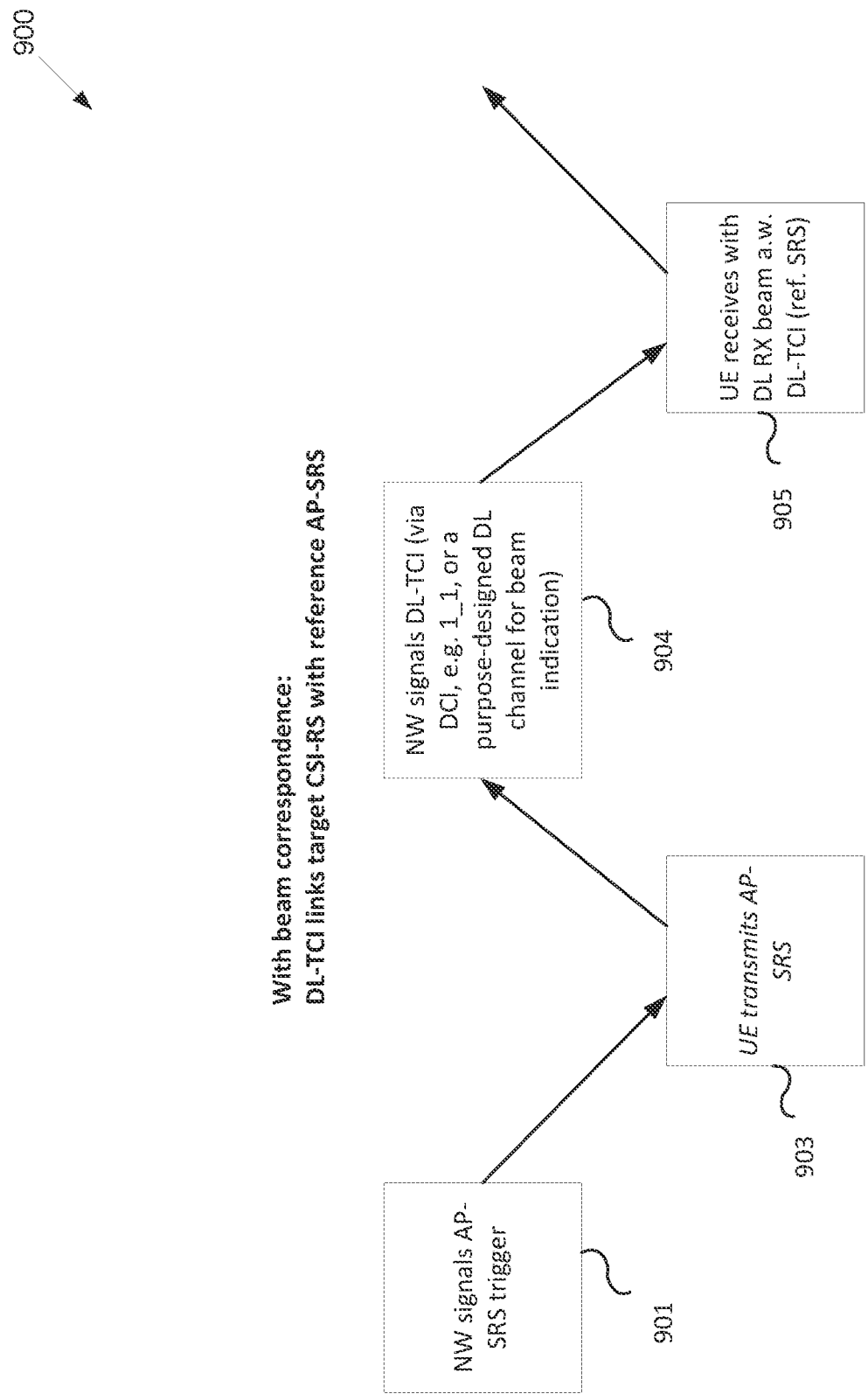
FIG. 9 illustrates an example of DL multi beam operation according to embodiments of the present disclosure.

FIG. 9 illustrates an example of DL multi beam operation 900 according to embodiments of the present disclosure. An embodiment of the DL multi beam operation 900 shown in FIG. 9 is for illustration only.

In another example illustrated in FIG. 9 (embodiment A-2), an DL multi-beam operation 900 starts with the gNB/NW signaling to a UE an aperiodic SRS (AP-SRS) trigger or request (step 901). This trigger can be included in a DCI format such as for example a DCI format scheduling a PDSCH reception or a PUSCH transmission. Upon receiving and decoding the DCI format with the AP-SRS trigger (step 902), the UE transmits an SRS (AP-SRS) to the gNB/NW (step 903) so that the NW (or gNB) can measure the UL propagation channel and select a DL RX beam for the UE for DL (at least when there is beam correspondence).

The gNB/NW can then indicate the DL RX beam selection (step 904) through a value of a TCI-state field in a DCI format, such as a DCI format scheduling a PDSCH reception. In this case, the TCI state indicates a reference RS, such as an AP-SRS, representing the selected DL RX beam. In addition, the TCI state can also indicate a "target" RS, such as a CSI-RS, that is linked to the reference RS, such as an AP-SRS. Upon successfully decoding the DCI format providing the TCI state, the UE performs DL receptions, such as a PDSCH reception, using the DL RX beam indicated by the TCI-state (step 905).

Alternatively, the gNB/NW can indicate the DL RX beam selection (step 904) to the UE using a TCI-state field in a purpose-designed DL channel for beam indication. A purpose-designed DL channel for beam indication can be UE-specific or for a group of UEs. For example, a UE-specific DL channel can be a PDCCH that a UE receives according to a UE-specific search space (USS) while a UE-group common DL channel can be a PDCCH that a UE receives according to a common search space (CSS). In this case, the TCI-state indicates a reference RS, such as an AP-SRS, representing the selected DL RX beam. In addition, the TCI-state can also indicate a "target" RS, such as a CSI-RS, that is linked to the reference RS, such as an AP-SRS. Upon successfully decoding a purpose-designed DL channel for beam indication with the TCI-state, the UE performs DL reception, such as a PDSCH reception, with the DL RX beam indicated by the TCI-state (step 905).

For this embodiment (A-2), as described above, the UE selects the DL RX beam based on the UL TX beam associated with the reference RS (AP-SRS) index signaled via the TCI-state field.

Similarly, for UL multi-beam operation, the gNB selects an UL RX beam for every UL TX beam that corresponds to a reference RS. Therefore, when an UL RS, such as an SRS and/or a DMRS, is used as a reference RS, the NW/gNB triggers or configures the UE to transmit the UL RS that is associated with a selection of an UL TX beam. The gNB, upon receiving and measuring the UL RS, selects an UL RX beam. As a result, a TX-RX beam pair is derived. The NW/gNB can perform this operation for all the configured reference RSs, either per reference RS or by "beam sweeping", and determine all the TX-RX beam pairs associated with all the reference RSs configured to the UE.

Conversely, when a DL RS, such as a CSI-RS and/or an SSB, is used as reference RS (at least when there is DL-UL beam correspondence or reciprocity), the NW/gNB transmits the RS to the UE (for UL and by reciprocity, this RS also corresponds to an UL RX beam). In response, the UE measures the reference RS (and in the process selects an UL TX beam) and reports the beam metric associated with the quality of the reference RS. In this case, the UE determines the TX-RX beam pair for every configured (DL) reference RS. Therefore, although this information is unavailable to the NW/gNB, upon receiving a reference RS (hence an UL RX beam) indication from the NW/gNB, the UE can select the UL TX beam from the information on all the TX-RX beam pairs.

The following two embodiments (B-1 and B-2) are examples of UL multi-beam operations that utilize TCI-based UL beam indication after the network (NW) receives a transmission from the UE. In the first example embodiment (B-1), a NW transmits an aperiodic CSI-RS and a UE receives and measures the CSI-RS. This embodiment can be used, for instance, at least when there is reciprocity between the UL and DL beam-pair-link (BPL). This condition is termed "UL-DL beam correspondence."

In the second example embodiment (B-2), the NW triggers an aperiodic SRS transmission from a UE and the UE transmits the SRS so that the NW (or a gNB) can measure the UL channel quality for the purpose of assigning an UL TX beam. This embodiment can be used regardless of whether or not there is UL-DL beam correspondence. Although aperiodic RS is considered in these two examples, periodic or semi-persistent RS can also be used.

Figure 10:
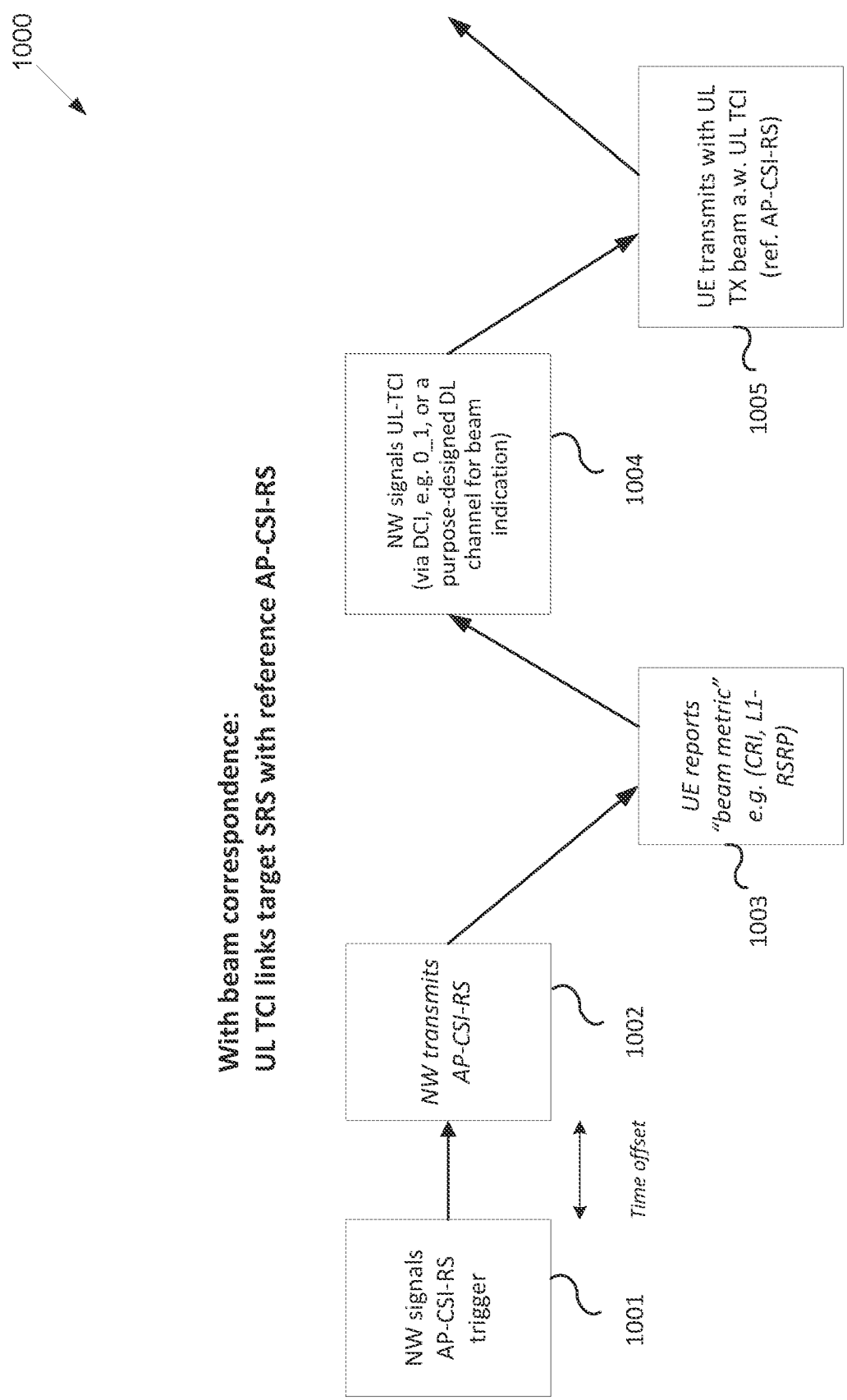
FIG. 10 illustrates an example of UL multi beam operation according to embodiments of the present disclosure.

FIG. 10 illustrates an example of UL multi beam operation 1000 according to embodiments of the present disclosure. An embodiment of the UL multi beam operation 1000 shown in FIG. 10 is for illustration only.

In one example illustrated in FIG. 10 (embodiment B-1), an UL multi-beam operation 1000 starts with the gNB/NW signaling to a UE an aperiodic CSI-RS (AP-CSI-RS) trigger or indication (step 1001). This trigger or indication can be included in a DCI format, such as a DCI format scheduling a PDSCH reception to the UE or a PUSCH transmission from the UE and can be either separately or jointly signaled with an aperiodic CSI request/trigger, and indicate transmission of AP-CSI-RS in a same slot (zero time offset) or in a later slot/sub-frame (>0 time offset). Upon receiving the AP-CSI-RS transmitted by the gNB/NW (step 1002), the UE measures the AP-CSI-RS and, in turn, calculates and reports a "beam metric" (indicating quality of a particular TX beam hypothesis) (step 1003). Examples of such beam reporting are CSI-RS resource indicator (CRI) or SSB resource indicator (SSB-RI) together with an associated L1-RS RP/L1-RSRQ/L1-S INR/CQI.

Upon receiving the beam report from the UE, the gNB/NW can use the beam report to select an UL TX beam for the UE and indicate the UL TX beam selection (step 1004) using a TCI-state field in a DCI format, such as a DCI format scheduling a PUSCH transmission from the UE. The TCI-state indicates a reference RS, such as an AP-CSI-RS, representing the selected UL RX beam (by the gNB/NW). In addition, the TCI-state can also indicate a "target" RS, such as a SRS, that is linked to the reference RS, such as an AP-CSI-RS. Upon successfully decoding the DCI format indicating the TCI-state, the UE selects an UL TX beam and performs UL transmission, such as a PUSCH transmission, using the UL TX beam associated with the reference CSI-RS (step 1005).

Alternatively, the gNB/NW can use the beam report to select an UL TX beam for the UE and indicate the UL TX beam selection (step 1004) to the UE using a value of a TCI-state field in a purpose-designed DL channel for beam indication. A purpose-designed DL channel for beam indication can be UE-specific or for a group of UEs. For example, a UE-specific DL channel can be a PDCCH that a UE receives according to a UE-specific search space (USS) while a UE-group common DL channel can be a PDCCH that a UE receives according to a common search space (CSS). In this case, the TCI-state indicates a reference RS, such as an AP-CSI-RS, representing the selected UL RX beam (by the gNB/NW). In addition, the TCI-state can also indicate a "target" RS, such as a SRS, that is linked to the reference RS, such as an AP-CSI-RS. Upon successfully decoding a purpose-designed DL channel providing a beam indication by the TCI-state, the UE selects an UL TX beam and performs UL transmission, such as a PUSCH transmission, using the UL TX beam associated with the reference CSI-RS (step 1005).

For this embodiment (B-1), as described above, the UE selects the UL TX beam based on the derived DL RX beam associated with the reference RS index signaled via the value of the TCI-state field. In this case, the CSI-RS resources or, in general, the DL RS resources including CSI-RS, SSB, or a combination of the two, that are configured for the UE as the reference RS resources can be linked to (associated with) "beam metric" reporting such as CRI/L1-RSRP or L1-SINR.

Figure 11:
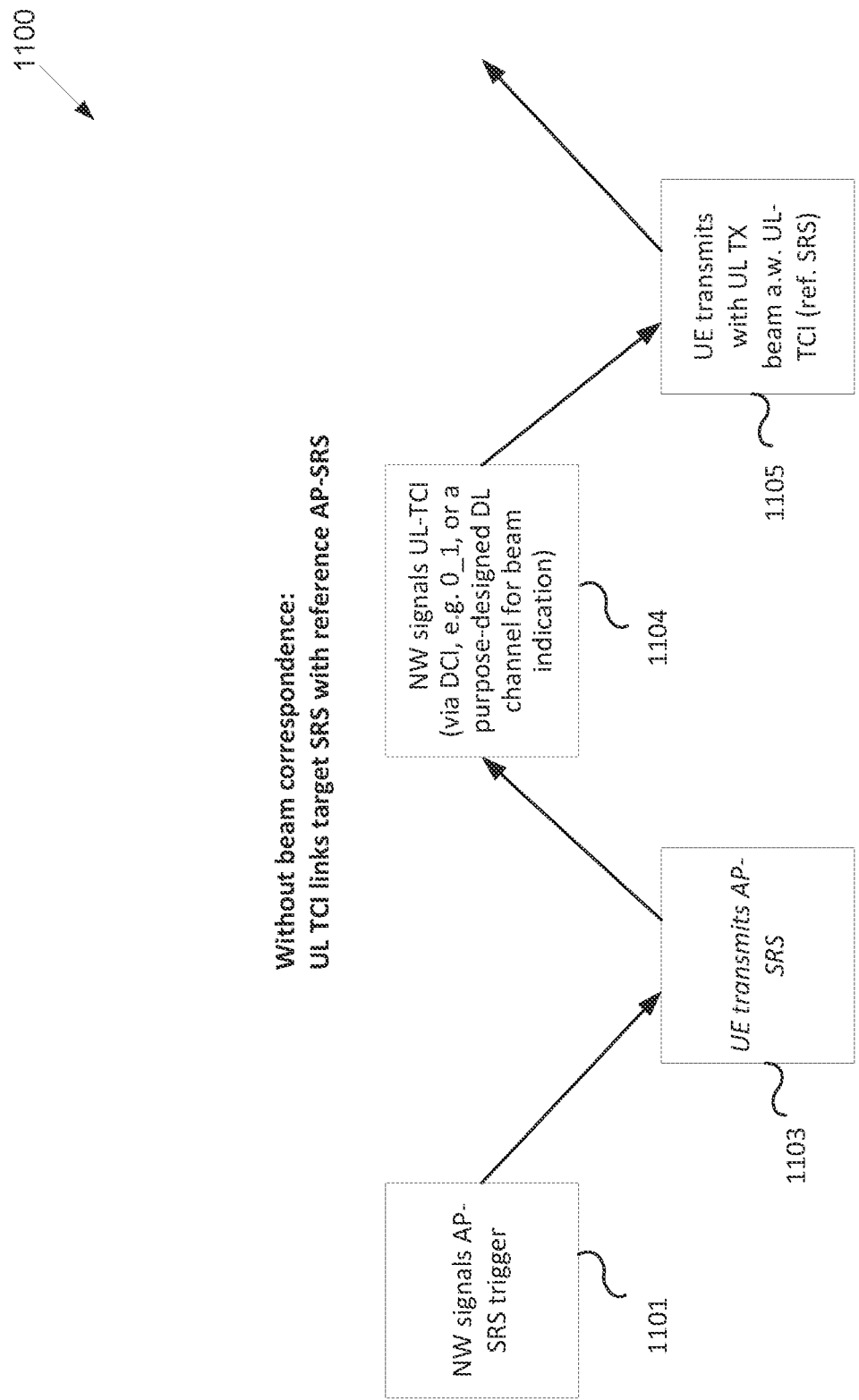
FIG. 11 illustrates an example of UL multi beam operation according to embodiments of the present disclosure.

FIG. 11 illustrates an example of UL multi beam operation 1100 according to embodiments of the present disclosure. An embodiment of the UL multi beam operation 1100 shown in FIG. 11 is for illustration only.

In another example illustrated in FIG. 11 (embodiment B-2), an UL multi-beam operation 1100 starts with the gNB/NW signaling to a UE an aperiodic SRS (AP-SRS) trigger or request (step 1101). This trigger can be included in a DCI format, such as a DCI format scheduling a PDSCH reception or a PUSCH transmission. Upon receiving and decoding the DCI format with the AP-SRS trigger (step 1102), the UE transmits AP-SRS to the gNB/NW (step 1103) so that the NW (or gNB) can measure the UL propagation channel and select an UL TX beam for the UE.

The gNB/NW can then indicate the UL TX beam selection (step 1104) using a value of the TCI-state field in the DCI format. In this case, the UL-TCI indicates a reference RS, such as an AP-SRS, representing the selected UL TX beam. In addition, the TCI-state can also indicate a "target" RS, such as a SRS, that is linked to the reference RS, such as an AP-SRS. Upon successfully decoding the DCI format providing a value for the TCI-state, the UE transmits, for example a PUSCH or a PUCCH, using the UL TX beam indicated by the TCI-state (step 1105).

Alternatively, a gNB/NW can indicate the UL TX beam selection (step 1104) to the UE using a value of a TCI-state field in a purpose-designed DL channel for beam indication. A purpose-designed DL channel for beam indication can be UE-specific or for a group of UEs. For example, a UE-specific DL channel can be a PDCCH that a UE receives according to a UE-specific search space (USS) while a UE-group common DL channel can be a PDCCH that a UE receives according to a common search space (CSS). In this case, the UL-TCI indicates a reference RS, such as an AP-SRS, representing the selected UL TX beam. In addition, the TCI-state can also indicate a "target" RS, such as a SRS, that is linked to the reference RS, such as an AP-SRS. Upon successfully decoding a purpose-designed DL channel for beam indication through a value of the TCI-state field, the UE transmits, such as a PUSCH or a PUCCH, using the UL TX beam indicated by the value of the TCI-state (step 1105).

For this embodiment (B-2), as described above, the UE selects the UL TX beam from the reference RS (in this case SRS) index signaled via the value of the TCI-state field.

In any of the following components, examples and sub-examples, flowcharts and diagrams maybe used for illustrative purposes. The present disclosure covers any possible variation of the flowcharts and diagrams as long as at least some of the components are included. In the following components, a TCI state is used for beam indication. It can refer to a DL TCI state for downlink channels (e.g., PDCCH and PDSCH), an uplink TCI state for uplink channels (e.g., PUSCH or PUCCH), a joint TCI state for downlink and uplink channels, or separate TCI states for uplink and downlink channels. A TCI state can be common across multiple component carriers or can be a separate TCI state for a component carrier or a set of component carriers. A TCI state can be gNB or UE panel specific or common across panels. In some examples, the uplink TCI state can be replaced by SRS resource indicator (SRI).

Figure 12A:
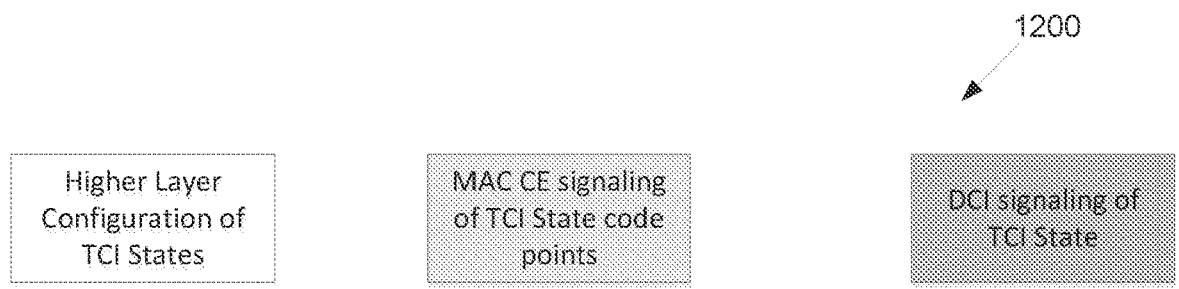
FIG. 12A illustrates an example of TCI state configuration and signaling according to embodiments of the present disclosure.

FIG. 12A illustrates an example of UL multi beam operation 1200 according to embodiments of the present disclosure. An embodiment of the UL multi beam operation 1200 shown in FIG. 12A is for illustration only.

In the following examples, as illustrated in FIG. 12A, a UE is configured/updated through higher layer RRC signaling a set of TCI States with N elements. MAC CE signaling includes a subset of M (M≤N) TCI states from the set of N TCI states, wherein each TCI state is associated with a code point of the DCI field used for indication of the TCI state. L1 control signaling (i.e., downlink control information (DCI)) updates the UE's TCI state, wherein the DCI includes a TCI State field e.g., with m bits (such that M≤$2^m$), the TCI state corresponds to a code point signaled by MAC CE. As a UE moves along a trajectory, the rate of DCI signaling to update the TCI state can be higher than the rate of MAC CE signaling to update the TCI state code points which in turn can be higher than the rate of RRC signaling to configure/update the TCI states.

Figure 13:
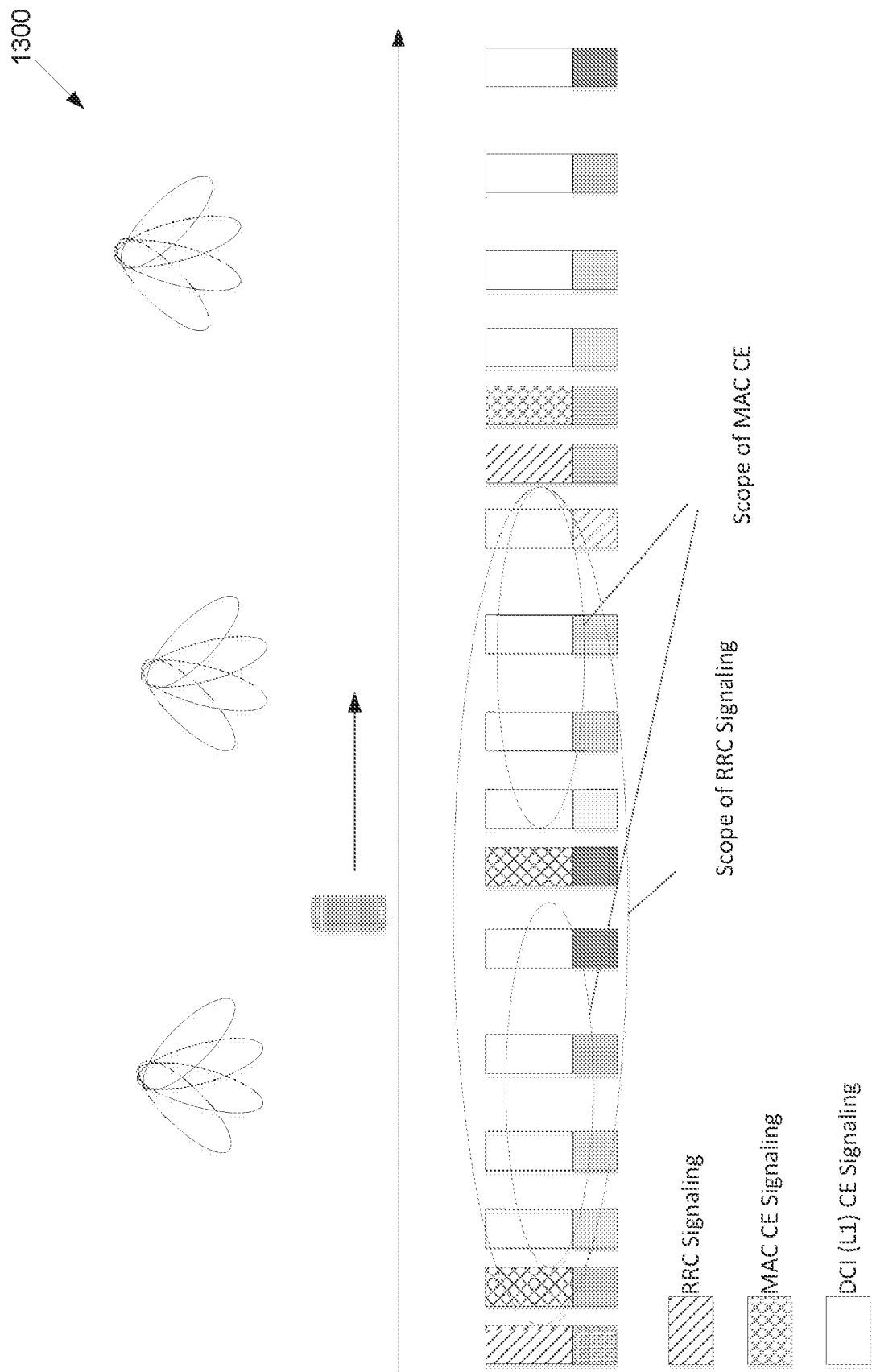
FIG. 13 illustrates an example of signaling based on UE movement according to embodiments of the present disclosure.

As illustrated in FIG. 13, as a UE moves along a trajectory, RRC signaling configures/updates a set of N TCI state states. MAC signaling includes a subset of M TCI states and associates each with code points for the DCI. There can be one or more MAC CE TCI state updates between two consecutive RRC configurations of TCI states. DCI signaling updates the TCI state as a UE moves along a trajectory according to the code points included in the MAC CE. There can be one or more DCI TCI state updates between two consecutive MAC CE TCI state updates.

Figure 12B:
FIG. 12B illustrates another example of TCI state configuration and signaling according to embodiments of the present disclosure.

FIG. 12B illustrates another example of TCI state configuration and signaling 1210 according to embodiments of the present disclosure. An embodiment of the TCI state configuration and signaling 1210 shown in FIG. 12B is for illustration only.

In one further example, there is no DCI signaling of the TCI state, the MAC CE selects or activates a TCI state out of the set of the N TCI states configured by RRC. This is illustrated in FIG. 12B.

Figure 12C:
FIG. 12C illustrates yet another example of TCI state configuration and signaling according to embodiments of the present disclosure.

FIG. 12C illustrates yet another example of TCI state configuration and signaling 1220 according to embodiments of the present disclosure. An embodiment of the TCI state configuration and signaling 1220 shown in FIG. 12C is for illustration only.

In one further example, there is no MAC CE signaling of the TCI code points, the RRC configured TCI states directly provide code points for DCI signaling of the TCI state. This is illustrated in FIG. 12C.

In one example, according to the examples of FIG. 12A, FIG. 12B, and FIG. 12C, the TCI states configured by RRC are common for UL and DL channels.

In one example, according to the examples of FIG. 12A, FIG. 12B, and FIG. 12C, the TCI states configured by RRC for UL channels are separate from the TCI state configured for DL channels.

In one example, according to the examples of FIG. 12A, the TCI states configured by RRC are common for UL and DL channels, and MAC CE signaling activates a common subset of TCI states for UL and DL channels.

In one example, according to the examples of FIG. 12A, the TCI states configured by RRC are common for UL and DL channels, and MAC CE signaling activates for UL channels a subset of TCI states separate from that activated for DL channels.

In one example, according to the examples of FIG. 12A, the TCI states configured by RRC are common for UL and DL channels, and MAC CE signaling activates a common subset of TCI states for UL and DL channels, and DCI signaling activates/signals a common (joint) TCI state for UL and DL channels.

In one example, according to the examples of FIG. 12A, the TCI states configured by RRC are common for UL and DL channels, and MAC CE signaling activates a common subset of TCI states for UL and DL channels, and DCI signaling activates/signals a TCI state for UL channels and a separate TCI state for DL channels.

In one example, according to the examples of FIG. 12B, the TCI states configured by RRC are common for UL and DL channels, and MAC CE signaling activates/signals a common (joint) TCI state for UL and DL channels.

In one example, according to the examples of FIG. 12B, the TCI states configured by RRC are common for UL and DL channels, and MAC CE signaling activates/signals a TCI state for UL channels and a separate TCI state for DL channels.

In one example, according to the examples of FIG. 12C, the TCI states configured by RRC are common for UL and DL channels, and DCI signaling activates/signals a common (joint) TCI state for UL and DL channels.

In one example, according to the examples of FIG. 12C, the TCI states configured by RRC are common for UL and DL channels, and DCI signaling activates/signals a TCI state for UL channels and a separate TCI state for DL channels.

In one further example to the examples of FIG. 12A, FIG. 12B, and FIG. 12C. TCI state signaled or activated, can be N TCI states wherein, N≥1. Wherein, the multiple TCI states can correspond to different entities, e.g., UL/DL directions, and/or serving cells, and/or bandwidth parts (BWPs) and/or component carriers and/or TRPs and/or TRP panels and/or UE panels.

Figure 12D:
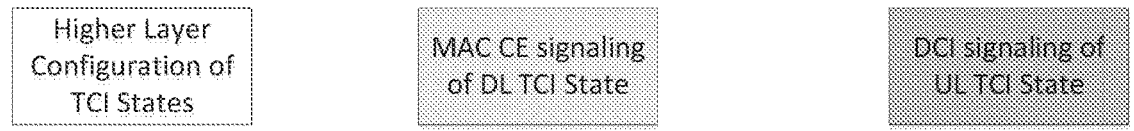
FIG. 12D illustrates yet another example of TCI state configuration and signaling according to embodiments of the present disclosure.

FIG. 12D illustrates yet another example of TCI state configuration and signaling 1230 according to embodiments of the present disclosure. An embodiment of the TCI state configuration and signaling 1230 shown in FIG. 12D is for illustration only.

In one example, RRC signaling configures a common set of TCI states for UL and DL channels. MAC CE activates/signals a TCI state for DL channels. DCI signaling activates a TCI state for UL channels. This is illustrated in FIG. 12D.

In one example, RRC signaling configures a set of TCI states for UL channels and a separate set of TCI states for DL channels. MAC CE activates/signals a TCI state for DL channels. DCI signaling activates a TCI state for UL channels. This is illustrated in FIG. 12D.

Figure 12E:
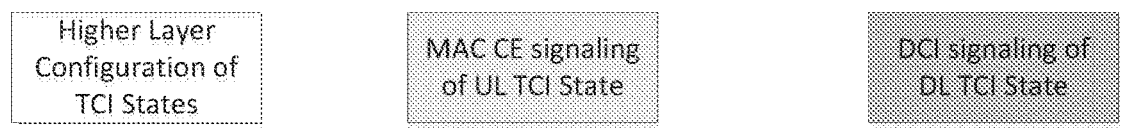
FIG. 12E illustrates yet another example of TCI state configuration and signaling according to embodiments of the present disclosure.

FIG. 12E illustrates yet another example of TCI state configuration and signaling 1240 according to embodiments of the present disclosure. An embodiment of the TCI state configuration and signaling 1240 shown in FIG. 12E is for illustration only.

In one example, RRC signaling configures a common set of TCI states for UL and DL channels. MAC CE activates/signals a TCI state for UL channels. DCI signaling activates a TCI state for DL channels. This is illustrated in FIG. 12E.

In one example, RRC signaling configures a set of TCI states for UL channels and a separate set of TCI states for DL channels. MAC CE activates/signals a TCI state for UL channels. DCI signaling activates a TCI state for DL channels. This is illustrated in FIG. 12E.

Figure 12F:
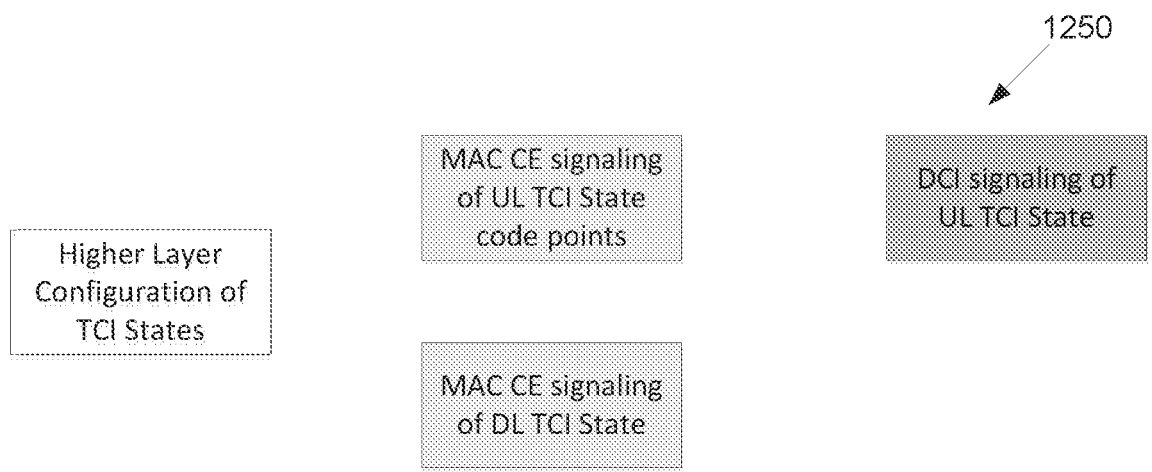
FIG. 12F illustrates yet another example of TCI state configuration and signaling according to embodiments of the present disclosure.

FIG. 12F illustrates yet another example of TCI state configuration and signaling 1250 according to embodiments of the present disclosure. An embodiment of the TCI state configuration and signaling 1250 shown in FIG. 12F is for illustration only.

Figure 12G:
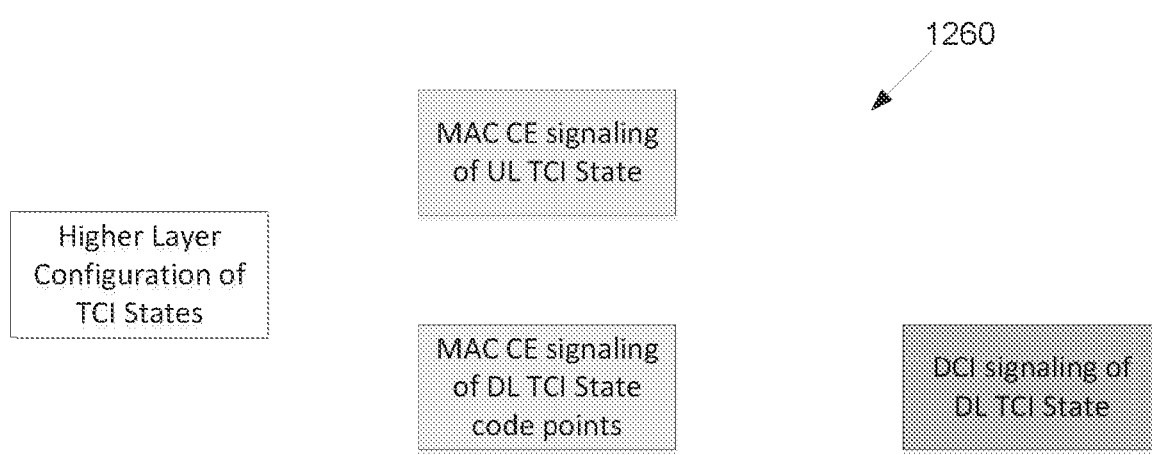
FIG. 12G illustrates yet another example of TCI state configuration and signaling according to embodiments of the present disclosure.

FIG. 12G illustrates yet another example of TCI state configuration and signaling 1260 according to embodiments of the present disclosure. An embodiment of the TCI state configuration and signaling 1260 shown in FIG. 12G is for illustration only.

In further examples following the examples of FIG. 12D and FIG. 12E, a MAC CE can activate a subset of TCI states corresponding to the code points of the DCI TCI state signaling. This is illustrated in FIG. 12F and FIG. 12G respectively.

In one sub-example, a single MAC CE message can include the UL TCI state code points and DL TCI state (e.g., the example of FIG. 12F), or a single MAC CE message can include the DL TCI state code points and UL TCI state (e.g., the example of FIG. 12G).

In another sub-example, UL TCI state code points and the DL TCI state are included in separated MAC CE messages (e.g., the example of FIG. 12F), or DL TCI state code points and the UL TCI state are included in separated MAC CE messages (e.g., the example of FIG. 12G).

In one further example to the examples of FIG. 12D, FIG. 12E, FIG. 12F, and FIG. 12G. The UL and/or DL TCI state signaled or activated, can be N UL TCI states and/or M DL TCI states wherein, N≥1 and M≥1. Wherein, the multiple TCI states can correspond to different entities, e.g., serving cells and/or bandwidth parts (BWPs) and/or component carriers and/or TRPs and/or TRP panels and/or UE panels.

FIG. 13 illustrates an example of signaling based on UE movement 1300 according to embodiments of the present disclosure. An embodiment of the signaling based on UE movement 1300 shown in FIG. 13 is for illustration only.

In one example, the mapping of TCI states to code points, by a MAC CE, can be based on the ordinal position of the activate TCI states. In one embodiment, the MAC CE provides a list of active TCI States, as illustrated in Table 1, wherein the first active TCI state in the list corresponds to code point 0, the second active TCI state in the list corresponds to code point 1, and so on.

Figure 14:
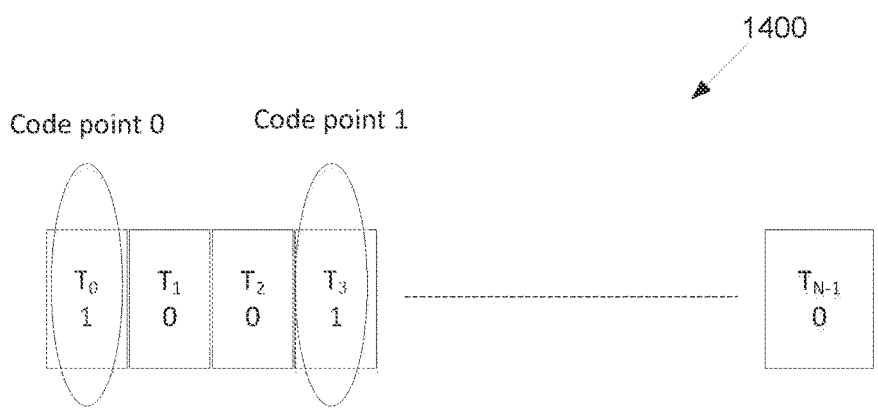
FIG. 14 illustrates an example of N RRC-configured TCI states according to embodiments of the present disclosure.

FIG. 14 illustrates an example of N RRC-configured TCI states 1400 according to embodiments of the present disclosure. An embodiment of the N RRC-configured TCI states 1400 shown in FIG. 14 is for illustration only.

In another embodiment, the MAC CE includes a bit map of the N RRC-configured TCI states as illustrated in FIG. 14, with a bit corresponding to each RRC-configured TCI state, a bit is set to 1 when its corresponding TCI state is active, otherwise the bit is set 0. The first TCI state with its corresponding bit set to 1, corresponds to code point 0. The second TCI state with its corresponding bit set to 1, corresponds to code point 1, and so on.

TABLE 1

LIST of TCI States Active by MAC CE

| Code point | List of Active TCI states |
| --- | --- |
| Code point 0 | TCI State $T_i$ |
| Code point 1 | TCI State $T_j$ |
| ... | ... |

In another example, $K_i$ TCI states are mapped to code point i, wherein $K_0, K_1, \ldots, K_{M-1}$, the number of TCI states mapped to a TCI state code point, can be configured and updated by higher layer RRC signaling and/or MAC CE signaling and/or specified in system specifications. M is the number of activated codepoint In one further embodiment $K_0=K_1= \ldots =K_{M-1}=K$.

In the examples of FIGS. 12A-12F, UE specific or UE group signaling can be used to update the TCI state.

In one example 1.1, UE specific RRC signaling can be used to configure/update the N TCI states.

In another example 1.2, UE group signaling can be used to configure/update the N TCI states, wherein an RRC message is sent to a group a UEs including a set of N TCI states.

In another example 1.3, cell-part signaling can be used to configure/update the N TCI states, wherein an RRC message is broadcast in part of a cell. For example, a part of a cell can be covered by one or more beams, or in another example a part of a cell can be covered by one or more TRPs (Transmission Reception Points). In yet a third example a part of a cell can be cover by one or more beams or one or a more TRPs. In yet a fourth example a part of cell can cover the entire cell.

Figure 15A:
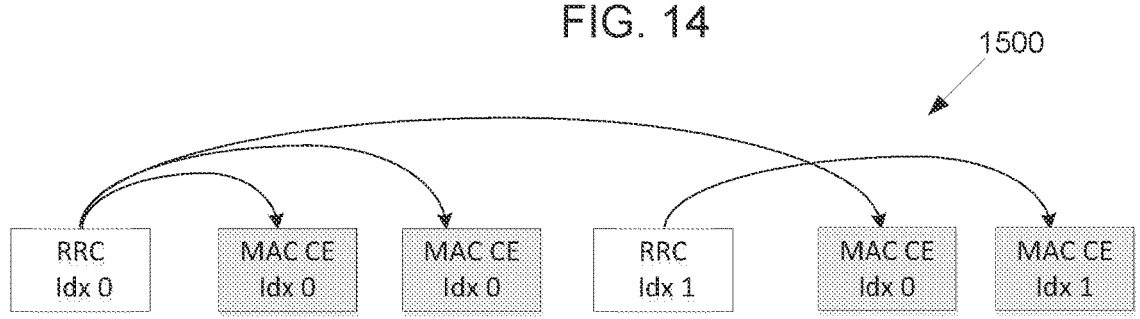
FIG. 15A illustrates an example of RRC and MAC CE including index according to embodiments of the present disclosure.

FIG. 15A illustrates an example of RRC and MAC CE including index 1500 according to embodiments of the present disclosure. An embodiment of the RRC and MAC CE including index 1500 shown in FIG. 15A is for illustration only.

In one example 1.4, the RRC message signaling the TCI states includes an index. The MAC CE including the subset of the selected TCI states and associated code points, includes the index of the corresponding RRC message providing the TCI states. This is illustrated in FIG. 15A.

Figure 15B:
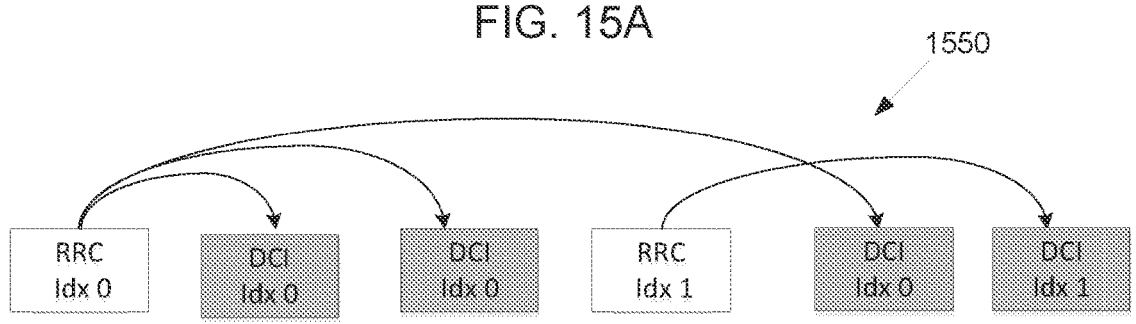
FIG. 15B illustrates another example of RRC and MAC CE including index according to embodiments of the present disclosure.

FIG. 15B illustrates another example of RRC and MAC CE including index 1550 according to embodiments of the present disclosure. An embodiment of the RRC and MAC CE including index 1550 shown in FIG. 15B is for illustration only.

In another example 1.5, the RRC signaling the TCI state includes an index. There is no configured MAC CE to update the TCI state code points (example 4.3 and example 4.4). The DCI including the TCI state field, includes the index of the corresponding RRC message providing the TCI states. As illustrated in FIG. 12C and FIG. 15B.

In one example 2.1, UE specific MAC CE signaling can be used to indicate a subset of M TCI states and associate with the code points of the DCI for TCI state update.

In one further example 2.1.1, M=1, i.e., a MAC CE activates or signals or indicates a TCI state to a UE.

In another example 2.2, UE group MAC CE signaling can be used to indicate a subset of M TCI states and associate with the code points of the DCI for TCI state update. Wherein a MAC CE message is sent to a group of UEs.

In one further example 2.2.1, according to FIG. 11A, UE group MAC CE signaling can be used to activate/indicate/signal a TCI state for each UE within a group of UEs. Wherein, a MAC CE message is sent to a group of UEs.

In one example, each UE has at least one TCI (a TCI state can be common for UL and DL channels or separate TCI states for DL and UL channels) in the MAC CE sent to a group of UEs.

In another example, a TCI state can apply to a subset of UEs within the group of UEs, wherein a TCI state can be common for UL and DL channels, and/or a TCI state for UL channels can be separate from that of a DL channel.

In yet another example a TCI state can apply to all UEs within a group of UEs, wherein a TCI state can be common for UL and DL channels, or a TCI state for UL channels can be separate from that of a DL channel.

In another example 2.3, cell-part MAC CE signaling can be used to indicate a subset of M TCI states and associate with the code points of the DCI for TCI state update. For example, a part of a cell can be covered by one or more beams, or in another example a part of a cell can be covered by one or more TRPs (Transmission Reception Points). In yet a third example a part of a cell can be cover by one or more beams or one or a more TRPs. In yet a fourth example a part of cell can cover the entire cell.

In one further example 2.3.1, according to FIG. 11A, cell-part MAC CE signaling can be used to activate/indicate/signal a TCI state for each UE within a part of a cell. Wherein, a MAC CE message is sent to a group of UEs.

In one example, each UE has at least one TCI (a TCI state can be common for UL and DL channels or separate TCI states for DL and UL channels) in the MAC CE sent to UEs in a part of a cell.

In another example, a TCI state can apply to a subset of UEs within the UEs of a part of a cell, wherein a TCI state can be common for UL and DL channels, and/or a TCI state for UL channels can be separate from that of a DL channel.

In yet another example a TCI state can apply to all UEs within the UEs of a part of a cell, wherein a TCI state can be common for UL and DL channels, or a TCI state for UL channels can be separate from that of a DL channel.

In one example 2.4, the MAC CE includes an index. The DCI including the TCI state field, includes the index of the corresponding MAC CE providing the TCI state code points. This is illustrated in FIG. 16.

Figure 16:
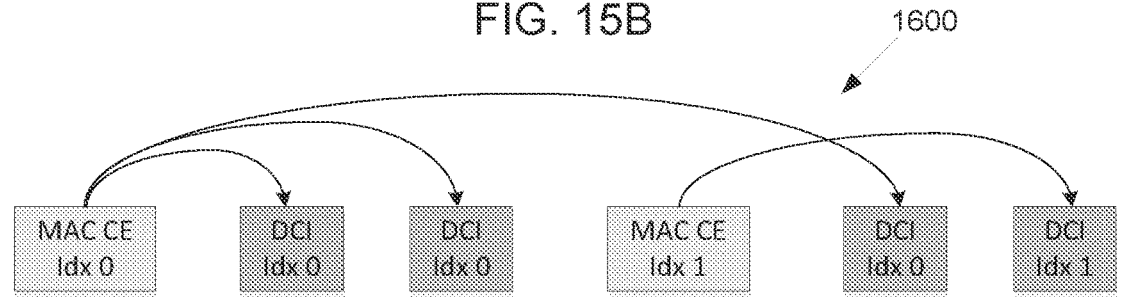
FIG. 16 illustrates an example of MAC CE and DCI including index according to embodiments of the present disclosure.

FIG. 16 illustrates an example of MAC CE and DCI including index 1600 according to embodiments of the present disclosure. An embodiment of the MAC CE and DCI including index 1600 shown in FIG. 16 is for illustration only.

In one example 3.1, UE specific L1 signaling can be used to indicate a TCI state to the UE.

In one example 3.1.1, the DCI carrying the TCI state can be a downlink related DCI with DL assignment or without DL assignment, i.e., a DCI for PDSCH assignment (e.g. DCI Format 1_0 or DCI Format 1_1 or DCI Format 1_2).

In another example 3.1.2, the DCI carrying the TCI state can be an uplink related DCI with UL grant or without UL grant, i.e., a DCI for PUSCH scheduling (e.g. DCI Format 0_0 or DCI Format 0_1 or DCI Format 0_2).

In another example 3.1.3, the DCI carrying the TCI state can be purpose designed DCI for TCI state indication.

In another example 3.2, UE group signaling can be used to indicate a TCI state for a UE. Wherein a L1 DCI message is sent to a group of UEs, a TCI state can be common for UL and DL channels and/or separate TCI states for DL and UL channels.

In one example 3.2.1, DCI can include one TCI state that applies to a group of UEs.

In another example 3.2.2, a DCI can include multiple TCI states, wherein each TCI state is associated with one UE.

In another example 3.2.3, a DCI can include multiple TCI states, wherein each TCI state is associated with one or more UEs.

In the aforementioned examples, a TCI state code point signaled or activated, can be N TCI states wherein, N≥1. Wherein, the multiple TCI states can correspond to different entities, e.g., UL/DL directions and/or serving cells and/or bandwidth parts (BWPs) and/or component carriers and/or TRPs and/or TRP panels and/or UE panels.

A TCI state of a UE can be updated by L1 control (DCI) signaling and/or MAC CE signaling, wherein the decision to update a TCI state by L1 control signaling and/or MAC CE signaling can be based on UE capability and/or higher layer (RRC and/or MAC CE) configuration or as specified in the system specifications or other condition or network implementation.

In one example 4.1, a UE can indicate its capability to support TCI state update by L1 control (DCI) signaling. If a UE doesn't support TCI state update by L1 control (DCI) signaling, the TCI state can be updated by MAC CE signaling, in this case according to the illustration of FIG. 12A, an RRC configuration message including N TCI states, and a MAC CE can be sent to a UE or to a group of UEs (example 2.2 and example 2.3).

In one embodiment, the MAC CE includes a TCI state for a UE, i.e., M=1, as illustrated in FIG. 12B. In a second embodiment, the MAC CE includes M (>1) TCI states, the first TCI state is used to indicate a beam to a UE not supporting TCI state update by L1 control (DCI) signaling. A TCI state can be common for UL and DL channels and/or separate TCI states for DL and UL channels. Separate TCI states can be used for different entities.

In another example 4.2, a UE can be configured by RRC signaling or MAC CE an L1 control (DCI) signal to update the TCI state. If a UE is not configured an L1 control (DCI) signal to update the TCI state, the TCI state can be updated by MAC CE signaling, in this case according to the illustration of FIG. 12A, an RRC configuration message including N TCI states, and a MAC CE can be sent to a UE or to a group of UEs (example 2.2 and example 2.3).

In one embodiment, the MAC CE includes a TCI state for a UE, i.e., M=1, as illustrated in FIG. 12C. In a second embodiment, the MAC CE includes M (>1) TCI states, the first TCI state is used to indicate a beam to a UE not configured an L1 control (DCI) signal to update the TCI state. A TCI state can be common for UL and DL channels and/or separate TCI states for DL and UL channels. Separate TCI states can be used for different entities.

In one example 4.2.1, a UE can be configured an L1 control (DCI) to update the TCI state, a UE can be further configured a MAC CE to update the TCI state. A UE can be further configured/updated, by RRC signaling and/or MAC CE signaling and/or L1 control (DCI) signaling, a parameter to select the mechanism for beam indication (TCI state indication), i.e., whether to use DCI for TCI state indication or MAC CE for TCI state indication.

In another example 4.2.2, a UE can be configured an L1 control (DCI) to update the TCI state, a UE can be further configured a MAC CE to select, M, TCI state codepoints for DCI state indication, wherein M can be configured/updated by RRC signaling and/or MAC CE signaling and/or L1 signaling. If M=1, i.e., the MAC CE selects 1 codepoint for TCI state, the MAC is used for TCI state indication, and there is no DCI signaling for TCI state indication.

In another example 4.2.3, a UE can be configured an L1 control (DCI) to update the TCI state, a UE can be further configured a MAC CE to update the TCI state. A gNB can select either the DCI to update the TCI state, or the MAC CE to update the TCI state. In one example, this selection is determined by the gNB's implementation. In another example, the selection can be based on the payload size of the TCI state indication. For small TCI state payloads, the DCI is used to update the TCI state. For large TCI state payload, the MAC CE is used to update the TCI state.

In one example, a maximum or threshold payload size of TCI state indication by DCI is specified in system specifications and/or is configured and updated by RRC signaling and/or by MAC CE signaling: if the payload size is larger than (or larger than or equal to) the maximum or threshold value, MAC CE TCI state indication is used instead of DCI TCI state indication. In another example, a maximum or threshold number of TCI states in a TCI state indication by DCI is specified in system specifications and/or is configured and updated by RRC signaling and/or by MAC CE signaling; if the number of TCI states is larger than (or larger than or equal to) the maximum or threshold value, MAC CE TCI state indication is used instead of DCI TCI state indication.

In another example 4.2.4, a UE can be configured an L1 control (DCI) to update the TCI state, a UE can be further configured a MAC CE to update the TCI state. A DCI TCI state indication is used for certain entities, while a MAC CE TCI state indication is used for other entities. In the examples of FIG. 12D and FIG. 12F, MAC CE is used for DL TCI state indication, while DCI is used for UL TCI state indication. While in the examples of FIG. 12E and FIG. 12G, MAC CE is used for UL TCI state indication, while DCI is used for DL TCI state indication. A person skilled in the art can realize that an entity can be other than UL/DL direction. For example, an entity can be a component carrier(s), wherein the TCI state(s) of one component carrier is indicated by MAC CE, while the TCI state(s) of other component carrier(s) is indicated by DCI. An entity can also be a TRP, or a TRP panel, or a BWP or a frequency span (e.g., PRBs or sub-carriers), or a time interval (e.g., frames or sub-frames or slots or symbols), or a UE panel, or an antenna port, or a component carrier or a direction (e.g., UL or DL) or a group of one or more of the aforementioned.

The decision which TCI state indication mechanism to use (e.g., MAC CE or DCI) can be: (1) specified in system specifications; (2) based on higher layer (RRC and/or MAC CE) configuration and reconfiguration; (3) payload load of corresponding TCI state message relative to a threshold; (4) a number of TCI states indicated in corresponding TCI state message relative to a threshold; (5) UE capability; and/or; (6) left for network implementation.

In another example 4.3, a UE can indicate its capability to support TCI state update MAC CE. If a UE doesn't support TCI state code point update by MAC CE, the TCI state code points are determined by the RRC configuration, wherein the first TCI state in the RRC configuration corresponds to code point one, the second TCI state in the RRC configuration corresponds to code point 2, and so on. In this case, according to the illustration of FIG. 12A, the only messages that can be sent to the UE are "the higher layer configuration of TCI state" and the "DCI signaling of TCI states" as illustrated in FIG. 12C. If there are N TCI state configured by RRC and the TCI state field in the DCI is m bits, $N \leq 2^m$. A TCI state can be common for UL and DL channels and/or separate TCI states for DL and UL channels.

In another example 4.4, a UE can be configured by RRC signaling a TCI state update MAC CE. If a UE is not configured a MAC CE to update the TCI state code points, the TCI state code points are determined by the RRC configuration, wherein the first TCI state in the RRC configuration corresponds to code point one, the second TCI state in the RRC configuration corresponds to code point 2, and so on. In this case, according to the illustration of FIG. 12A, the only messages that can be sent to the UE are "the higher layer configuration of TCI state" and the "DCI signaling of TCI states" as illustrated in FIG. 12C. If there are N TCI state configured by RRC and the TCI state field in the DCI is m bits, N≤2$^m$. A TCI state can be common for UL and DL channels and/or separate TCI states for DL and UL channels.

In another example 4.5, it is specified by system specification that a TCI state can be updated by MAC CE signaling, in this case according to the illustration of FIG. 12B, an RRC configuration message including N TCI states, and a MAC CE can be sent to a UE or to a group of UEs (example 2.2 and example 2.3), wherein, the MAC CE includes a TCI state for a UE, i.e., M=1. A TCI state can be common for UL and DL channels and/or separate TCI states for DL and UL channels.

In another example 4.6, it is specified by system specification that a UE does not support TCI state code point update by MAC CE, the TCI state code points are determined by the RRC configuration, wherein the first TCI state in the RRC configuration corresponds to code point one, the second TCI state in the RRC configuration corresponds to code point 2, and so on. In this case, according to the illustration of FIG. 12C, the only messages that can be sent to the UE are "the higher layer configuration of TCI state" and the "DCI signaling of TCI states". If there are N TCI state configured by RRC and the TCI state field in the DCI is m bits, N≤2$^m$. A TCI state can be common for UL and DL channels and/or separate TCI states for DL and UL channels.

In the aforementioned examples, a TCI state code point signaled or activated, can be N TCI states wherein, N≥1. Wherein, the multiple TCI states can correspond to different entities, e.g., UL/DL directions and/or serving cells and/or bandwidth parts (BWPs) and/or component carriers and/or TRPs and/or TRP panels and/or UE panels.

A TCI state of a UE can be updated by a single stage/part TCI state (beam) indication and/or a two stage/part TCI state (beam) indication, wherein the decision to update a TCI state by a single stage/part TCI state (beam) indication and/or a two stage/part TCI state (beam) indication can be based on UE capability and/or higher layer (RRC and/or MAC CE) configuration or as specified in the system specifications.

In one example 5.1, the L1 control (DCI) signal to update the TCI state is a single stage/part L1 control signal for TCI state update (cf. U.S. patent application Ser. No. 17/249,115 filed Feb. 19, 2021, which is incorporated by reference herein). Wherein, the L1 control (DCI) signal to update the TCI state can be a UE specific L1 control (DCI) signal to a single UE, or a UE group L1 control (DCI) signal to a group of UEs.

In another example 5.2, the L1 control (DCI) signal to update the TCI state is a two stage/part L1 control signal for TCI state update (cf. U.S. patent application Ser. No. 17/249, 115 filed Feb. 19, 2021, which is incorporated by reference herein). Wherein, the L1 control (DCI) signal to update the TCI state can be a UE specific L1 control (DCI) signal to a single UE, and/or a UE group L1 control (DCI) signal to a group of UEs. In one example, a first stage/part is to a single UE and a second stage/part is to single UE. In another example, a first stage/part is to a group of UEs and a second stage/part is to single UE. In another example, a first stage/part is to a single UE and a second stage/part is to a group of UEs. In another example, a first stage/part is to a group of UEs and a second stage/part is to a group of UE.

In another example 5.3, the control signal to update the TCI state is a two/stage part signal for TCI state update. Wherein, the control signal to update the TCI state can be a UE specific control signal to a single UE, and/or a UE group control signal to a group of UEs. In one example, a first stage/part is to a single UE and a second stage/part is to single UE. In another example, a first stage/part is to a group of UEs and a second stage/part is to single UE. In another example, a first stage/part is to a single UE and a second stage/part is to a group of UEs. In another example, a first stage/part is to a group of UEs and a second stage/part is to a group of UE.

Furthermore, wherein: (1) on one example 5.3.1, a first stage/part is a MAC CE, and a second stage part is a L1 control (DCI) signal; (2) in another example 5.3.2, a first stage/part is a L1 control (DCI) signal, while a second stage part is a MAC CE; and/or (3) in some examples, a first stage/part message is followed by one or more second stage/part message(s).

In one example 5.3, the MAC CE signal to update the TCI state is a single stage/part MAC CE signal for TCI state update. Wherein, the MAC CE signal to update the TCI state can be a UE specific MAC CE signal to a single UE, or a UE group MAC CE signal to a group of UEs.

In another example 5.4, the MAC CE signal to update the TCI state is a two stage/part MAC CE signal for TCI state update. Wherein, the MAC CE signal to update the TCI state can be a UE MAC CE signal to a single UE, and/or a UE group MAC CE signal to a group of UEs. In one example, a first stage/part is to a single UE and a second stage/part is to single UE. In another example, a first stage/part is to a group of UEs and a second stage/part is to single UE. In another example, a first stage/part is to a single UE and a second stage/part is to a group of UEs. In another example, a first stage/part is to a group of UEs and a second stage/part is to a group of UE.

In the present disclosure, the term TCI state is used generically to refer to any beam indication or spatial filter indication signaling, for example a TCI state can be replaced by spatial relation information, RS resources index, wherein an RS is associated with a beam or a spatial receive or transmit filter, etc.

RRC signaling can configure one or more of: (1) a list or set of joint TCI states; (2) a list or set of DL TCI states; and/or (3) a list or set of UL TCI states.

In one example each set is configured separately.

In one example a common set is configured for Joint, DL and UL TCI States.

In one example two sets are configured: a first set for Joint and DL TCI states (for joint or separate beam indication), and a second set for UL TCI states (for separate beam indication).

In one example two sets are configured: a first set for Joint and UL TCI states (for joint or separate beam indication), and a second set for DL TCI states (for separate beam indication).

In one example two sets are configured: a first set for DL and UL TCI states (for separate beam indication), and a second set for Joint TCI states (for joint beam indication).

In one example, two sets are configured: a first set of pairs of TCI states (for separate beam indication), wherein a TCI state pair includes a DL TCI state and a UL TCI state pair, and a second set for Joint TCI states (for joint beam indication).

In one example, TCI states in same pool can be used for any TCI state type, wherein a TCI state type can be a DL TCI state or an UL TCI state or a joint TCI state, associated with that pool for example: (1) a pool that includes DL and joint TCI states, any TCI state in the pool can be used for DL TCI state or Joint TCI state; and/or (2) a pool that includes DL, UL and joint TCI states, any TCI state in the pool can be used for DL TCI state, UL TCI state or Joint TCI state.

In one example, a TCI pool includes DL/Joint TCI states and UL TCI states. The QCL information field includes source reference signal information element (IE), wherein the reference signal is a choice of: (1) reference signal for DL/Joint TCI states, e.g., NZP-CSI-RS; and/or (2) reference signal for UL TCI states, e.g., SRS, SSB and NZP-CSI-RS.

In one example a TCI pool includes DL TCI states and UL TCI states and Joint TCI states. The QCL information field includes source reference signal IE, wherein the reference signal is a choice of: (1) reference signal for DL TCI states, e.g., NZP-CSI-RS; (2) reference signal for UL TCI states, e.g., SRS, SSB and NZP-CSI-RS; and/or (3) reference signal for Joint TCI states, e.g., NZP-CSI-RS.

In one example a TCI pool includes DL/Joint TCI states. The QCL information field includes source reference signal IE, wherein the reference signal is e.g., NZP-CSI-RS.

In one example a TCI pool includes UL TCI states. The QCL information field includes source reference signal IE, wherein the reference signal is e.g., SRS, SSB and NZP-CSI-RS.

In one example a TCI pool includes DL TCI states. The QCL information field includes source reference signal IE, wherein the reference signal is e.g., NZP-CSI-RS.

In one example a TCI pool includes Joint TCI states. The QCL information field includes source reference signal IE, wherein the reference signal is e.g., NZP-CSI-RS.

In one example, a common set (or list) of TCI states is configured for Joint, DL and UL TCI states. The allowed target RS, and accordingly the allow channels and signals to be associated with a TCI state and the allowed TCI state type (e.g., DL TCI state, UL TCI state and/or Joint TCI state) can be determined based on one or more of the following: (1) the number of QCL Info IEs in the TCI state. For example, the TCI state can include one QCL Info IE or two QCL Info IEs. Each QCL info includes at least a source reference signal (RS) and a QCL Type. The QCL Type can be Type A, B, C or D; (2) the type of source RS, e.g., CSI-RS for beam management (BM), CSI-RS for tracking (e.g., tracking reference signal (TRS)), CSI-RS for CSI acquisition, SRS, SSB, etc.; and/or (3) the QCL Type.

An example of such determination can be based on TABLE 2. A second example can be based on TABLE 3. TABLE 4, TABLE 5, and TABLE 6 show additional example TCI state types and Target RS. It should be noted that in TABLE 2, 3, 4, 5, and 6.

If the target RS is DL dedicated channel, this means that the DMRS of a UE-dedicated PDSCH and a UE-dedicated PDCCH is the target RS of the TCI state, furthermore the reference signal associated with any other DL channel or DL signal that follows the same beam as DL dedicated channel is also a target RS of the TCI state.

If the target RS is UL dedicated channel, this means that the DMRS of a UE-dedicated PUSCH and a UE-dedicated PUCCH is the target RS of the TCI state (for determining the Rx spatial filter), furthermore the reference signal associated with any other UL channel or UL signal that follows the same beam as DL dedicated channel is also a target RS of the TCI state.

TABLE 2

Determination of TCI state Type and applicable channels based on source RS and QCL Type.

| First QCL Info | | Second QCL Info | | | TCI state |
|---|---|---|---|---|---|
| Source RS | QCL Type | Source RS | QCL Type | Target RS | Type |
| CSI-RS for BM | Type D/UL Spatial Relation Filter | N/A | N/A | UL dedicated channels | UL TCI |
| TRS | Type A | TRS | Type D/UL Spatial Filter | DL and/or UL dedicated channels | Joint/DL/UL TCI |
| | Type A | CSI-RS for BM | Type D/UL Spatial Filter | DL and/or UL dedicated channels | Joint/DL/UL TCI |
| | Type D/UL Spatial Relation Filter | N/A | N/A | UL dedicated Channels | UL TCI |
| | Type A or Type B | N/A | N/A | CSI-RS for acquisition | DL TCI |
| | Type A | N/A | N/A | DMRS of PDSCH/ PDCCH | DL TCI |
| | Type A | N/A | N/A | CSI-RS for CSI | DL TCI |
| | Type A | TRS | Type D | CSI-RS for CSI | DL TCI |
| | Type A | SSB | Type D | CSI-RS for CSI | DL TCI |
| | Type A | CSI-RS for BM | Type D | CSI-RS for CSI | DL TCI |
| | Type B | N/A | N/A | CSI-RS for CSI | DL TCI |
| | Type A | N/A | N/A | CSI-RS for BM | DL TCI |
| | Type A | TRS | Type D | CSI-RS for BM | DL TCI |
| | Type A | CSI-RS for BM | Type D | CSI-RS for BM | DL TCI |

TABLE 2-continued

Determination of TCI state Type and applicable channels based on source RS and QCL Type.

| First QCL Info | | Second QCL Info | | | TCI state |
|---|---|---|---|---|---|
| Source RS | QCL Type | Source RS | QCL Type | Target RS | Type |
| TRS (periodic) | Type A | N/A | N/A | TRS (Aperiodic) | DL TCI |
| | Type A | TRS (periodic) | Type D | TRS (Aperiodic) | DL TCI |
| CSI-RS for CSI | Type A | | | DMRS of PDSCH/ PDCCH | |
| SSB | Type D/UL Spatial Relation Filter | N/A | N/A | UL dedicated Channels | UL TCI |
| | Type C | N/A | N/A | TRS | DL TCI |
| | Type C | SSB | Type D | TRS (periodic) | DL TCI |
| | Type C | TRS (periodic) | Type D | TRS (periodic) | DL TCI |
| | Type C | N/A | N/A | CSI-RS for BM | DL TCI |
| | Type C | SSB | Type D | CSI-RS for BM | DL TCI |
| SSB before TRS config | Type A | | | DMRS of PDSCH/ PDCCH | DL TCI |
| | Type D/UL Spatial Relation Filter | | | DL and/or UL dedicated channels | Joint/DL/UL TCI |
| SRS for BM | Type D/UL Spatial Relation Filter | N/A | N/A | UL dedicated channels | UL TCI |

TABLE 3

Determination of TCI state Type and applicable channels based on source RS and QCL Type.

| First QCL Info | | Second QCL Info | | | TCI state |
|---|---|---|---|---|---|
| Source RS | QCL Type | Source RS | QCL Type | Target RS | Type |
| CSI-RS for BM | Type D/UL Spatial Relation Filter | N/A | N/A | UL dedicated channels | UL TCI |
| TRS | Type A | TRS | Type D/UL Spatial Filter | DL and/or UL dedicated channels | Joint/DL TCI |
| | Type A | CSI-RS for BM | Type D/UL Spatial Filter | DL and/or UL dedicated channels | Joint/DL TCI |
| | Type D/UL Spatial Relation Filter | N/A | N/A | UL dedicated Channels | UL TCI |
| | Type A or Type B | N/A | N/A | CSI-RS for acquisition | DL TCI |
| | Type A | N/A | N/A | DMRS of PDSCH/ PDCCH | DL TCI |
| | Type A | N/A | N/A | CSI-RS for CSI | DL TCI |
| | Type A | TRS | Type D | CSI-RS for CSI | DL TCI |
| | Type A | SSB | Type D | CSI-RS for CSI | DL TCI |
| | Type A | CSI-RS for BM | Type D | CSI-RS for CSI | DL TCI |
| | Type B | N/A | N/A | CSI-RS for CSI | DL TCI |

TABLE 3-continued

Determination of TCI state Type and applicable channels based on source RS and QCL Type.

| First QCL Info | | Second QCL Info | | | TCI state |
|---|---|---|---|---|---|
| Source RS | QCL Type | Source RS | QCL Type | Target RS | Type |
| | Type A | N/A | N/A | CSI-RS for BM | DL TCI |
| | Type A | TRS | Type D | CSI-RS for BM | DL TCI |
| | Type A | CSI-RS for BM | Type D | CSI-RS for BM | DL TCI |
| TRS (periodic) | Type A | N/A | N/A | TRS (Aperiodic) | DL TCI |
| | Type A | TRS (periodic) | Type D | TRS (Aperiodic) | DL TCI |
| CSI-RS for CSI | Type A | | | DMRS of PDSCH/PDCCH | |
| SSB | Type D/UL Spatial Relation Filter | N/A | N/A | UL dedicated Channels | UL TCI |
| | Type C | N/A | N/A | TRS | DL TCI |
| | Type C | SSB | Type D | TRS (periodic) | DL TCI |
| | Type C | TRS (periodic) | Type D | TRS (periodic) | DL TCI |
| | Type C | N/A | N/A | CSI-RS for BM | DL TCI |
| | Type C | SSB | Type D | CSI-RS for BM | DL TCI |
| SSB before TRS config | Type A | | | DMRS of PDSCH/PDCCH | DL TCI |
| | Type D/UL Spatial Relation Filter | | | DL and/or UL dedicated channels | Joint/DL/UL TCI |
| SRS for BM | Type D/UL Spatial Relation Filter | N/A | N/A | UL dedicated channels | UL TCI |

TABLE 4

Additional examples for determination of TCI state Type and applicable channels based on source RS and QCL Type.

| First QCL Info | | Second QCL Info | | | TCI state |
|---|---|---|---|---|---|
| Source RS | QCL Type | Source RS | QCL Type | Target RS | Type |
| CSI-RS for CSI | Type D/UL Spatial Relation Filter | N/A | N/A | UL dedicated channels | UL TCI |
| | Type A | TRS | Type D/UL Spatial Filter | DL and/or UL dedicated channels | Joint/DL/UL TCI |

TABLE 5

Additional examples for determination of TCI state Type and applicable channels based on source RS and QCL Type.

| First QCL Info | | Second QCL Info | | | TCI state |
|---|---|---|---|---|---|
| Source RS | QCL Type | Source RS | QCL Type | Target RS | Type |
| CSI-RS for CSI | Type A | TRS | Type D/UL Spatial Filter | DL and/or UL dedicated channels | Joint/DL TCI |

TABLE 6

Additional examples for determination of TCI state Type and applicable channels based on source RS and QCL Type.

| First QCL Info | | Second QCL Info | | | TCI state |
|---|---|---|---|---|---|
| Source RS | QCL Type | Source RS | QCL Type | Target RS | Type |
| CSI-RS for CSI | Type D/UL Spatial Relation Filter | N/A | N/A | UL dedicated channels | UL TCI |
| | Type A | TRS | Type D/UL Spatial Filter | DL and/or UL dedicated channels | Joint/DL TCI |

In one example, a set (or list) of TCI states is configured for Joint and DL TCI states. The allowed target RS, and accordingly the allow channels and signals to be associated with a TCI state and the allowed TCI state type (e.g., DL TCI state, and/or Joint TCI state) can be determined based on one or more of the following: (1) a number of QCL Info IEs in the TCI state. For example, the TCI state can include one QCL Info IE or two QCL Info IEs. Each QCL info includes at least a source reference signal (RS) and a QCL Type. The QCL Type can be Type A, B, C or D; (2) the type of source RS, e.g., CSI-RS for beam management (BM), CSI-RS for tracking (e.g., tracking reference signal (TRS)), CSI-RS for CSI acquisition, SRS, SSB, etc.; and/or (3) the QCL Type.

The examples of TABLES 2, 3, 4, 5, and 6 exclude the UL TCI states.

In one example, a set (or list) of TCI states is configured for DL TCI states. The allowed target RS, and accordingly the allow channels and signals to be associated with a TCI state can be determined based on one or more of the following: (1) a number of QCL Info IEs (Information Elements) in the TCI state. For example, the TCI state can include one QCL Info IE or two QCL Info IEs. Each QCL info includes at least a source reference signal (RS) and a QCL Type. The QCL Type can be Type A, B, C or D; (2) the type of source RS, e.g., CSI-RS for beam management (BM), CSI-RS for tracking (e.g., tracking reference signal (TRS)), CSI-RS for CSI acquisition, SRS, SSB, etc.; and/or (3) the QCL Type.

The examples of TABLES 2, 3, 4, 5, and 6 excludes the Joint and UL TCI states.

In one example, a set (or list) of TCI states is configured for Joint and UL TCI states. The allowed target RS, and accordingly the allow channels and signals to be associated with a TCI state and the allowed TCI state type (e.g., UL TCI state, and/or Joint TCI state) can be determined based on one or more of the following: (1) a number of QCL Info IEs in the TCI state. For example, the TCI state can include one QCL Info IE or two QCL Info IEs. Each QCL info includes at least a source reference signal (RS) and a QCL Type. The QCL Type can be Type A, B, C or D; (2) the type of source RS, e.g., CSI-RS for beam management (BM), CSI-RS for tracking (e.g., tracking reference signal (TRS)), CSI-RS for CSI acquisition, SRS, SSB, etc.; and/or (3) the QCL Type.

The examples of TABLES 2, 3, 4, 5, and 6 excludes the DL TCI states.

An RRC signaling can further configure a list or set of TCI state pairs, wherein a TCI state pair includes a DL TCI state and an UL TCI state.

An RRC signaling can further configure the UE to use one of: (1) joint TCI states, wherein a TCI state codepoint is for a joint DL and UL TCI state; (2) separate TCI states, wherein a TCI state codepoint can be for: (i) a DL TCI state; (ii) an UL TCI state; and/or (iii) a pair of TCI states that includes a DL TCI state and an UL TCI state; and/or (3) joint and separate TCI states. Wherein, further configuration to use either joint or separate TCI states is by MAC CE signaling and/or DCI signaling.

As illustrated in TABLE 7, a MAC CE signaling can activate a set of: (1) joint TCI state codepoints; (2) separate TCI state codepoints, wherein a codepoint can be a DL TCI state or an UL TCI state; (3) separate TCI state codepoints, wherein a codepoint can be a TCI state pair that includes a DL TCI state and an UL TCI state; (4) DL TCI state codepoints; and/or (5) UL TCI state codepoints.

A MAC CE signaling, can further configure a UE to use joint or separate TCI state indication.

As illustrated in TABLE 7, a DCI signaling, e.g., DL related DCI format such as DCI Format 1_0 or DCI Format 1_1 or DCI Format 1_2 with a DL assignment or without a DL assignment can further indicate: (1) one or more codepoints for TCI states; and/or (2) a flag to indicate joint or separate TCI states. In case of separate TCI states, the flag can indicate DL TCI state or UL TCI state.

In TABLE 7, the TCI state set activated by MAC CE can be of size N, wherein N can depend on the bit field width of the TCI state field in the DCI format. If the bit width is n bits, then $N=2^n$. For example, if n=3, N=8. If n=4, N=16.

TABLE 7

A TCI state indication for joint and separate TCI states by MAC CE signaling and DCI signaling.

| | MAC CE Signaling | DCI signaling |
|---|---|---|
| Row 1 Example 1 Table 3 | Activate a first set of N joint TCI state codepoints Activate a second set of N separate TCI state codepoints. Each codepoint is a TCI state pair that has DL TCI state and UL TCI state. Signal (by MAC CE and/or RRC) joint or separate TCI states. | Codepoint of TCI state: Based on MAC CE or RRC indication the TCI state is a joint TCI state (from the first set) or a separate TCI state with UL and DL TCI states (from the second set). |
| Row 2 Example 1 Table 3 | Activate a first set of N joint TCI state codepoints Activate a second set of N separate TCI state codepoints. Each codepoint is a TCI state pair that has DL TCI state and UL TCI state. | Flag to indicate joint or separate TCI state. Codepoint of TCI state: Based on DCI indication the TCI state is a joint TCI state (from the first set) or a separate TCI state with UL and DL TCI states (from the second set). |
| Row 3 Example 2 Table 4 Example II.3.10 | Activate a first set of N joint TCI state codepoints or DL TCI state codepoints Activate a second set of N UL TCI state codepoints. Signal (by MAC CE and/or RRC) joint or separate TCI states. Indication in case of separate TCI state whether DL or UL TCI state is being signaled. Alternatively, this indication can be in the DCI Format. | Codepoint of TCI state: For joint TCI state or separate TCI state with DL TCI state indicated TCI state from first set. For separate TCI state with UL TCI state indicated TCI state from the second set. A flag indicates whether the TCI state is a DL or UL TCI state in case of separate TCI state indication. Alternatively, this indication can be signaled by MAC CE signaling. |

TABLE 7-continued

A TCI state indication for joint and separate TCI states by MAC CE signaling and DCI signaling.

| | MAC CE Signaling | DCI signaling |
|---|---|---|
| Row 4 Example 2 Table 4 Example II.3.10 | Activate a first set of N joint TCI state codepoints or DL TCI state codepoints Activate a second set of N UL TCI state codepoints. | Flag to indicate in case of separate TCI state whether DL or UL TCI state is being signaled. Indication of joint or separate TCI states can be by RRC, MAC CE or DCI signaling. Codepoint of TCI state: For joint TCI state or separate TCI state with DL TCI state indicated TCI state is from first set. For separate TCI state with UL TCI state indicated TCI state is from the second set. |
| Row 5 Example 3 Table 5 Example II.3.11 | Activate a first set of N joint TCI state codepoints Activate a second set of N DL TCI state codepoints. Activate a third set of N UL TCI state codepoints. Signal (by MAC CE and/or RRC) joint or separate TCI states. Indication in case of separate TCI state whether DL or UL TCI state is being signaled. Alternatively, this indication can be in the DCI Format. | Codepoint of TCI state: Based on MAC CE or RRC indication the TCI state is a joint TCI state (from the first set) or DL or UL TCI state (from the second set or the third set respectively). A flag indicates whether the TCI state is a DL or UL TCI state in case of separate TCI state indication. Alternatively, this indication can be signaled by MAC CE signaling. |
| Row 6 Example 3 Table 5 Example II.3.11 | Activate a first set of N joint TCI state codepoints Activate a second set of N DL TCI state codepoints. Activate a third set of N UL TCI state codepoints. | Flag to indicate joint or DL or UL TCI state. Alternatively, this can be indicated partially by MAC CE and/or RRC). Codepoint of TCI state Based on DCI indication the TCI state is a joint TCI state (from the first set) or a DL TCI state (from the second set), or an UL TCI state (from the third set). |
| Row 7 Example 4 Table 6 | Activate a first set of N joint TCI state codepoints. Activate a second set of N DL TCI state codepoints. Activate a third set of N UL TCI state codepoints. Activate a fourth set of N TCI state pairs, wherein a TCI state pair includes DL TCI state and UL TCI state. MAC CE or RRC indication of joint or separate TCI state pair or separate DL or UL TCI state. In case of separate DL or UL TCI state, MAC CE can indicate whether a next DCI format (subject to processing latency) carries a DL or UL TCI state, alternatively this can be indicated by the DCI format. | Codepoint of TCI state Based on MAC CE or RRC indication the TCI state is a joint TCI state (from the first set) or DL or UL TCI state (from the second set or the third set respectively) or pair of TCI states from the fourth set. A flag indicates whether the TCI state is a DL or UL TCI state in case of separate TCI state indication that is not a TCI state pair. Alternatively, this indication can be signaled by MAC CE signaling. |
| Row 8 Example 4 Table 6 | Activate a first set of N joint TCI state codepoints Activate a second set of N DL TCI state codepoints. Activate a third set of N UL TCI state codepoints. Activate a fourth set of N TCI state pairs, wherein a TCI state pair includes DL TCI state and UL TCI state. | Flag to indicate joint or DL or UL TCI state or TCI state pair. Alternatively, this can be indicated partially by MAC CE and/or RRC). Codepoint of TCI state Based on DCI indication the TCI state is a joint TCI state (from the first set) or a DL TCI state (from the second set), or an UL TCI state (from the third set), or a pair of TCI states from the fourth set. |
| Row 9 Example 5 Table 7 | Activate a set of N TCI state codepoints. Some codepoints (e.g., ~N/2) include a joint TCI state. Some codepoints (e.g., ~N/2) include a separate TCI state that includes a DL TCI state and an UL TCI state (TCI state pair). | Codepoint of TCI state. The TCI state can be a joint TCI state or a separate TCI state with a DL TCI state and an UL TCI state. |

TABLE 7-continued

A TCI state indication for joint and separate TCI states by MAC CE signaling and DCI signaling.

| | MAC CE Signaling | DCI signaling |
|---|---|---|
| Row 10 Example 6 Table 8 | Activate a set of N TCI state codepoints. Some codepoints (e.g., ~N/2) include a joint TCI state or DL TCI state in case of joint or separate TCI state indication respectively. Some codepoints (e.g., ~N/2) include an UL TCI state. Signal (by MAC CE and/or RRC) joint or separate TCI states. | Codepoint of TCI state. In case of joint beam indication, a codepoint is indicated from the joint code points. In case of separate beam indication, a codepoint can be for a DL TCI state or an UL TCI state. |
| Row 11 Example 6 Table 8 | Activate a set of N TCI state codepoints. Some codepoints (e.g., ~N/2) include a joint TCI state or DL TCI state in case of joint or separate TCI state indication respectively. Some codepoints (e.g., ~N/2) include an UL TCI state. | Flag to indicate joint or separate TCI state. In case of joint beam indication, a codepoint is indicated from the joint code points. In case of separate beam indication, a codepoint can be for a DL TCI state or an UL TCI state. |
| Row 12 Example 7 Table 9 | Activate a set of N TCI state codepoints. Some codepoints (e.g., ~N/2 or ~N/3) include a joint TCI state. Some codepoints (e.g., ~N/4 or ~N/3) include a DL TCI state. Some codepoints (e.g., ~N/4 or ~N/3) include a UL TCI state. | Codepoint of TCI state. The TCI state can be a joint TCI state or DL TCI state or UL TCI state. |
| Row 13 Example 8 Table 10 | Activate a set of N TCI state codepoints. Some codepoints (e.g., ~N/2 or ~N/4) include a joint TCI state. Some codepoints (e.g., ~N/6 or ~N/4) include a DL TCI state. Some codepoints (e.g., ~N/6 or ~N/4) include a UL TCI state. Some codepoints (e.g., ~N/6 or ~N/4) include a pair of DL and UL TCI states. | Codepoint of TCI state. The TCI state can be a joint TCI state or DL TCI state or UL TCI state or a pair of DL and UL TCI states. |
| Row 14 Example 9 Table 11 | Activate a first set of N joint TCI state codepoints. Activate a second set of N separate TCI state codepoints. Some codepoints (e.g., ~N/2) are DL TCI states, the other codepoints (e.g., ~N/2) are UL TCI states. Signal (by MAC CE and/or RRC) joint or separate TCI states. | Codepoint of TCI state Based on MAC CE or RRC indication the TCI state is a joint TCI state (from the first set) or a separate TCI state (from the second set). A separate TCI state can indicate DL TCI state or UL TCI state. |
| Row 15 Example 9 Table 11 | Activate a first set of N joint TCI state codepoints Activate a second set of N separate TCI state codepoints. Some codepoints (e.g., ~N/2) are DL TCI states, the other codepoints (e.g., ~N/2) are UL TCI states. | Flag to indicate joint or separate TCI state Codepoint of TCI state Based on DCI indication the TCI state is a joint TCI state (from the first set) or a separate TCI state (from the second set). A separate TCI state can indicate DL TCI state or UL TCI state. |
| Row 16 Example 10 Table 12 | Activate a first set of N joint TCI state codepoints Activate a second set of N separate TCI state codepoints. Some codepoints (e.g., ~N/3) are DL TCI states. Some codepoints (e.g., ~N/3) are UL TCI states. The other codepoints (e.g., ~N/3) are TCI state pairs that include a DL TCI state and an UL TCI state. Signal (by MAC CE and/or RRC) joint or separate TCI states. | Codepoint of TCI state Based on MAC CE or RRC indication the TCI state is a joint TCI state (from the first set) or a separate TCI state (from the second set). A separate TCI state can indicate DL TCI state and/or UL TCI state. |
| Row 17 Example 10 Table 12 | Activate a first set of N joint TCI state codepoints. Activate a second set of N separate TCI state codepoints. Some codepoints (e.g., ~N/3) are DL TCI states. Some codepoints (e.g., ~N/3) | Flag to indicate joint or separate TCI state Codepoint of TCI state Based on DCI indication the TCI state is a joint TCI state (from the first set) or a separate TCI state (from the |

TABLE 7-continued

A TCI state indication for joint and separate TCI states by MAC CE signaling and DCI signaling.

| | MAC CE Signaling | DCI signaling |
|---|---|---|
| | are UL TCI states. The other codepoints (e.g., ~N/3) are TCI state pairs that include a DL TCI state and an UL TCI state. | second set). A separate TCI state can indicate DL TCI state and/or UL TCI state. |
| Row 18 | Activate a first set of N joint TCI state codepoints or DL TCI state codepoints<br>Activate a second set of N UL TCI state codepoints.<br>Signal (by MAC CE and/or RRC) joint or separate TCI states. | In case of joint TCI state one codepoint of the joint TCI state from the first set.<br>In case of separate TCI state, two code points. A first codepoint for DL TCI state from the first set, a second codepoint for DL TCI state from the second set. |
| Row 19 | Activate a first set of N joint TCI state codepoints or DL TCI state codepoints<br>Activate a second set of N UL TCI state codepoints. | Flag to indicate joint or separate TCI state.<br>In case of joint TCI state one codepoint of the joint TCI state from the first set.<br>In case of separate TCI state, two code points. A first codepoint for DL TCI state from the first set, a second codepoint for DL TCI state from the second set. |
| Row 20 | Activate a first set of N joint TCI state codepoints.<br>Activate a second set of N DL TCI state codepoints. Activate a third set of N UL TCI state codepoints.<br>Signal (by MAC CE and/or RRC) joint or separate TCI states. | In case of joint TCI state one codepoint of the joint TCI state from the first set.<br>In case of separate TCI state, two code points. A first codepoint for DL TCI state from the second set, a second codepoint for UL TCI state from the third set. |
| Row 21 | Activate a first set of N joint TCI state codepoints<br>Activate a second set of N DL TCI state codepoints. Activate a third set of N UL TCI state codepoints. | Flag to indicate joint or separate TCI state.<br>In case of joint TCI state one codepoint of the joint TCI state from the first set.<br>In case of separate TCI state, two code points. A first codepoint for DL TCI state from the second set, a second codepoint for UL TCI state from the third set. |
| Row 22 | Activate a first set of N joint TCI state codepoints.<br>Activate a second set of N DL TCI state codepoints. Activate a third set of N UL TCI state codepoints.<br>Activate a fourth set of N TCI state pairs, wherein a TCI state pair includes DL TCI state and UL TCI state.<br>Signal (by MAC CE and/or RRC) indication of joint or separate TCI state pair or separate DL or UL TCI state. | In case of joint TCI state, one codepoint of the joint TCI state from the first set.<br>In case of separate TCI state with TCI state pair of DL/UL TCI states, one codepoint of the separate TCI state pair from the fourth set.<br>In case of separate TCI state with separate DL/UL TCI state indication, two code points. A first codepoint for DL TCI state from the second set, a second codepoint for UL TCI state from the third set. |
| Row 23 | Activate a first set of N joint TCI state codepoints.<br>Activate a second set of N DL TCI state codepoints. Activate a third set of N UL TCI state codepoints.<br>Activate a fourth set of N TCI state pairs, wherein a TCI state pan-includes DL TCI state and UL TCI state. | Flag to indicate joint or separate TCI state pair or separate DL/UL TCI state indication.<br>In case of joint TCI state, one codepoint of the joint TCI state from the first set.<br>In case of separate TCI state with TCI state pair of DL/UL TCI states, one codepoint of the separate TCI state pair from the fourth set.<br>In case of separate TCI state with separate DL/UL TCI state indication, two code points. A first codepoint for DL TCI state from the second set, a second codepoint for UL TCI state from the third set. |

The TCI state in the DCI can apply to UE-specific channels transmitted and received by a UE. A joint TCI state can apply to uplink and downlink channels and/or signals transmitted from/received by a UE. Alternatively, a TCI state can apply to uplink channels transmitted from a UE and a separate TCI state can apply to downlink channels received by a UE.

In one example, an indication (implicit or explicit) in a DCI with the TCI state, can indicate whether joint or separate TCI state(s) are indicated for UL and DL channels.

In one instance of Row 2 of TABLE 7, two sets of code points are configured and/or activated by MAC CE and/or RRC signaling as illustrated in Example 1 Table 3 (in TABLE 7) for TCI state indication. A first set of TCI state ID code points is configured for Joint TCI state, and a second set of TCI state ID code points is configured for separate TCI state including a DL TCI state and an UL TCI state for each code point. A 1-bit flag in a DCI Format can indicate whether a TCI state ID in a DCI Format indicates a joint TCI state (for DL and UL channel) or indicates separate TCI states (a TCI state for DL channels and a separate TCI state for UL channels as a TCI state pair).

In one instance of Row 4 of TABLE 7, two sets of code points are configured and/or activated by MAC CE and/or RRC signaling as illustrated in Example 2 Table 4 (in TABLE 7) for TCI state indication. A first set of TCI state ID code points is configured for Joint TCI state or DL TCI state, and a second set of TCI state ID code points is configured for UL TCI state. The TCI state ID in a DCI indicates the DL TCI state based on the first set of TCI state ID code points (joint/DL TCI state). A 1-bit flag in a DCI Format can indicate whether a TCI state ID in a DCI indicates the UL TCI state based on the first set of TCI state ID code points (joint/DL TCI state) or the second set of TCI state code points (UL TCI state). Alternatively, a UE can be indicated by RRC and/or MAC CE and/or DCI signaling or the UE can determine whether the TCI state indication is for joint or separate TCI states. If the TCI state indication is for joint TCI state, the indicated TCI state ID is a joint TCI state that applies to UL and DL TCI states. If the TCI state indication is for separate TCI state an indication in the DCI format can indicate whether the signaled TCI state ID is for a DL TCI state or for an UL TCI state, e.g., as described in example II.3.10.

In one instance of Row 6 of TABLE 7, three sets of code points are configured and/or activated by MAC CE and/or RRC signaling as illustrated in Example 3 Table 5 for a TCI state indication. A first set of TCI state ID code points is configured for Joint TCI state, a second set of TCI state ID code points is configured for DL TCI state and a third set of TCI state ID code points is configured for UL TCI state. A 2-bit flag in a DCI Format can indicate whether a TCI state ID in a DCI indicates a joint TCI state (for DL and UL channel) or indicates a TCI state for DL channels or indicates a DCI state for UL channels.

In one instance of Row 8 of TABLE 7, if applicable, four sets of code points are configured and/or activated by MAC CE and/or RRC signaling as illustrated in Example 4 Table 6 (in FIG. 7) for TCI state indication. A first set of TCI state ID code points is configured for Joint TCI state, a second set of TCI state ID code points is configured for DL TCI state, a third set of TCI state ID code points is configured for UL TCI state, and a fourth set of TCI state ID code points is configured for separate TCI state including a DL TCI state and an UL TCI state for each code point (TCI state pair). A 2-bit flag in a DCI can indicate whether a TCI state ID in a DCI indicates a joint TCI state (for DL and UL channel) or indicates a TCI state for DL channels or indicates a DCI state for UL channels or indicates separate TCI states (a TCI state for DL channels and a separate TCI state for UL channels).

In one option, whether these four sets of codepoints are used or not can be separately configured (by MAC CE and/or RRC signaling). In another option, these four sets of codepoints can be present/used.

In another example, it can be configured/updated by higher layer UE dedicated or common signaling (e.g., RRC signaling and/or MAC CE signaling) whether common or separate TCI state(s) are indicated for UL and DL channels.

In one instance of Row 1 of TABLE 7, two sets of code points are configured and/or activated by MAC CE and/or RRC signaling as illustrated in Example 1 Table 3 (in FIG. 7) for TCI state indication. A first set of TCI state ID code points is configured for Joint TCI state, and a second set of TCI state ID code points is configured for separate TCI state including a DL TCI state and an UL TCI state for each code point. A 1-bit flag in a MAC CE and/or RRC message can indicate whether a TCI state ID in a DCI indicates a joint TCI state (for DL and UL channel) or indicates separate TCI states (a TCI state for DL channels and a separate TCI state for UL channels as a TCI state pair).

In one instance of Row 3 of TABLE 7, two sets of code points are configured and/or activated by MAC CE and/or RRC signaling as illustrated in Example 2 Table 4 (in FIG. 7) for TCI state indication. A first set of TCI state ID code points is configured for Joint TCI state or DL TCI state, and a second set of TCI state ID code points is configured for UL TCI state. The TCI state ID in a DCI indicates the DL TCI state based on the first set of TCI state ID code points (joint/DL TCI state). A 1-bit flag in a MAC CE and/or RRC message, can indicate whether a TCI state ID in a DCI indicates the UL TCI state based on the first set of TCI state ID code points (joint/DL TCI state) or the second set of TCI state code points (UL TCI state). Alternatively, a UE can be indicated by RRC and/or MAC CE signaling or the UE can determine whether the TCI state indication is for joint or separate TCI states. If the TCI state indication is for joint TCI state, the indicated TCI state ID is a joint TCI state that applies to UL and DL TCI states. If the TCI state indication is for separate TCI state an indication in a MAC CE can indicate whether the signaled TCI state ID in a next DCI Format (subject to UE processing latency) is for a DL TCI state or for an UL TCI state, e.g., as described in example II.3.10.

In one instance of Row 5 of TABLE 7, three sets of code points are configured and/or activated by MAC CE and/or RRC signaling as illustrated in Example 3 Table 5 (in FIG. 7) for TCI state indication. A first set of TCI state ID code points is configured for Joint TCI state, a second set of TCI state ID code points is configured for DL TCI state and a third set of TCI state ID code points is configured for UL TCI state. A 2-bit flag in a MAC CE and/or RRC message can indicate whether a TCI state ID in a DCI indicates a joint TCI state (for DL and UL channel) or indicates a TCI state for DL channels or indicates a DCI state for UL channels. Alternatively, a 1-bit flag in MAC CE and/or RRC can indicate joint or separate TCI state indication, and a 1-bit flag in the DCI Format can indicate DL or UL TCI state in case of separate TCI state indication.

In one instance of Row 7 of TABLE 7, if applicable, four sets of code points are configured and/or activated by MAC CE and/or RRC signaling as illustrated in Table 6 (in TABLE 7) for TCI state indication. A first set of TCI state ID code points is configured for Joint TCI state, a second set of TCI state ID code points is configured for DL TCI state, a third set of TCI state ID code points is configured for UL TCI state, and a fourth set of TCI state ID code points is configured for separate TCI state including a DL TCI state and an UL TCI state for each code point (TCI state pair). A 2-bit flag in a MAC CE and/or RRC message can indicate whether a TCI state ID in a DCI Format indicates a joint TCI state (for DL and UL channel) or indicates a TCI state for DL channels or indicates a DCI state for UL channels or indicates separate TCI states (a TCI state for DL channels and a separate TCI state for UL channels). Alternatively, in MAC CE and/or RRC a field can indicate joint, separate TCI state indication with separate DL/UL TCI states or separate TCI state indication with a TCI state pair that includes DL and UL TCI states, and a 1-bit flag in the DCI Format can indicate DL or UL TCI state in case of separate TCI state indication with separate DL/UL TCI states. In one option, whether these four sets of codepoints are used or not can be separately configured (by MAC CE and/or RRC signaling). In another option, these four sets of codepoints can be present/used.

TABLE 8

Indication of TCI State Type

| TCI State Code Points Configured | Size of flag to indicate TCI state type |
| --- | --- |
| First set of code points: Joint TCI State<br>Second set of code points: (DL TCI State, UL TCI State) | 1-bit |
| First set of code points: Joint TCI State<br>Second set of TCI state code points: DL TCI state<br>Third set of TCI state code points: UL TCI state<br>Unused codepoint(s) can be set to 'reserved' or used for other purposes | 2-bits |
| First set of code points: Joint TCI State<br>Second set of TCI state code points: DL TCI state<br>Third set of TCI state code points: UL TCI state<br>Fourth set of code points: (DL TCI State, UL TCI State) | 2-bits |

TABLE 9

LIST of TCI States Configured/Activated by MAC CE and/or RRC in Example 1

| Code point | List of Active TCI states for joint TCI | List of Active TCI states for separate TCI |
| --- | --- | --- |
| Code point 0 | Joint TCI State $T_i$ | (DL TCI State $T_{di}$, UL TCI State $T_{ui}$) |
| Code point 1 | Joint TCI State $T_j$ | (DL TCI State $T_{dj}$, UL TCI State $T_{uj}$) |
| ... | ... | ... |

TABLE 10

LIST of TCI States Configured/Activated by MAC CE and/or in Example 2

| Code point | List of Active TCI states for joint TCI or DL TCI | List of Active TCI states for UL TCI |
| --- | --- | --- |
| Code point 0 | Joint TCI State $T_i$ or DL TCI State $T_{di}$ | UL TCI State $T_{ui}$ |
| Code point 1 | Joint TCI State $T_j$ or DL TCI State $T_{dj}$ | UL TCI State $T_{uj}$ |
| ... | ... | ... |

TABLE 11

LIST of TCI States Configured/Activated by MAC CE and/or in Example 3

| Code point | List of Active TCI states for joint TCI | List of Active TCI states for DL TCI | List of Active TCI states for UL TCI |
| --- | --- | --- | --- |
| Code point 0 | Joint TCI State $T_i$ | DL TCI State $T_{di}$ | UL TCI State $T_{ui}$ |
| Code point 1 | Joint TCI State $T_j$ | DL TCI State $T_{dj}$ | UL TCI State $T_{uj}$ |
| ... | ... | ... | ... |

TABLE 12

LIST of TCI States Configured/Activated by MAC CE and/or in Example 4

| Code point | List of Active TCI states for joint TCI | List of Active TCI states for DL TCI | List of Active TCI states for UL TCI | List of Active TCI states for separate TCI |
| --- | --- | --- | --- | --- |
| Code point 0 | Joint TCI State $T_i$ | DL TCI State $T_{di}$ | UL TCI State $T_{ui}$ | (DL TCI State $T_{sdi}$, UL TCI State $T_{sui}$) |
| Code point 1 | Joint TCI State $T_j$ | DL TCI State $T_{dj}$ | UL TCI State $T_{uj}$ | (DL TCI State $T_{sdj}$, UL TCI State $T_{suj}$) |
| ... | ... | ... | ... | ... |

In another example, a single set of code-points is configured, wherein the single set of code points can include below examples.

In one example of Example 5, Row 9 of TABLE 7, a set of code points configured and/or activated by MAC CE and/or RRC signaling as illustrated in TABLE 7 for TCI state indication. Wherein the set of code points includes: (1) a first set of TCI state ID code points configured for Joint TCI state; and (2) a second set of TCI state ID code points configured for separate TCI state including a DL TCI state and an UL TCI state for each code point (TCI state pair).

In one example of Example 6, Rows 10 and 11 of TABLE 7, a set of code points configured and/or activated by MAC CE and/or RRC signaling as illustrated in Table 7 (in TABLE 7) for TCI state indication. Wherein the set of code points includes: (1) a first set of TCI state ID code points configured for Joint TCI state or DL TCI state, and (2) a second set of TCI state ID code points configured for UL TCI state.

In one example of Example 7, Row 12 of TABLE 7, a set of code points configured and/or activated by MAC CE and/or RRC signaling as illustrated in Table 9 (in TABLE 7) for TCI state indication. Wherein the set of code points includes: (1) a first set of TCI state ID code points configured for Joint TCI state; (2) a second set of TCI state ID code points configure for DL TCI state; and (3) a third set of TCI state ID code points configure for UL TCI state.

In one example of Example 8, Row 13 of TABLE 7, a set of code points configured and/or activated by MAC CE and/or RRC signaling as illustrated in Table 10 (in TABLE 7) for TCI state indication. Wherein the set of code points includes: (1) a first set of TCI state ID code points configured for Joint TCI state; (2) a second set of TCI state ID code points configure for DL TCI state; (3) a third set of TCI state ID code points configure for UL TCI state; and (4) a fourth set of TCI state ID code points configured for separate TCI state including a DL TCI state and an UL TCI state for each code point (TCI state pair).

In examples 5, 7 and 8, no flag is required to indicate a Type of TCI state, the type of TCI state is implicitly indicated in the TCI state ID.

In example 6, a bit can indicate whether a joint/DL TCI state is a joint TCI state applied to DL and UL channels or a DL TCI state applied only to DL channels. The flag can be included in the DCI and/or MAC and/or RRC signaling.

TABLE 12

LIST of TCI States Configured/Activated by MAC CE and/or RRC in Example 5

| Code point | List of Active TCI states |
|---|---|
| Code point 0 | Joint TCI State $T_i$ |
| Code point 1 | Joint TCI State $T_j$ |
| ... | ... |
| Code point k | (DL TCI State $T_{di}$, UL TCI State $T_{ui}$) |
| Code point k + 1 | (DL TCI State $T_{dj}$, UL TCI State $T_{uj}$) |
| ... | ... |

TABLE 13

LIST of TCI States Configured/Activated by MAC CE and/or RRC in Example 6

| Code point | List of Active TCI states |
|---|---|
| Code point 0 | Joint TCI State $T_i$ or DL TCI State $T_{di}$ |
| Code point 1 | Joint TCI State $T_j$ or DL TCI State $T_{dj}$ |
| ... | ... |
| Code point m | UL TCI State $T_{ui}$ |
| Code point m + 1 | UL TCI State $T_{uj}$ |
| ... | ... |

TABLE 14

LIST of TCI States Configured/Activated by MAC CE and/or RRC in Example 7

| Code point | List of Active TCI states |
|---|---|
| Code point 0 | Joint TCI State $T_i$ |
| Code point 1 | Joint TCI State $T_j$ |
| ... | ... |
| Code point k | DL TCI State $T_{di}$ |
| Code point k + 1 | DL TCI State $T_{dj}$ |
| ... | ... |
| Code point m | UL TCI State $T_{ui}$ |
| Code point m + 1 | UL TCI State $T_{uj}$ |
| ... | ... |

TABLE 15

LIST of TCI States Configured/Activated by MAC CE and/or RRC in Example 8

| Code point | List of Active TCI states |
|---|---|
| Code point 0 | Joint TCI State $T_i$ |
| Code point 1 | Joint TCI State $T_j$ |
| ... | ... |
| Code point k | DL TCI State $T_{di}$ |
| Code point k + 1 | DL TCI State $T_{dj}$ |
| ... | ... |
| Code point m | UL TCI State $T_{ui}$ |
| Code point m + 1 | UL TCI State $T_{uj}$ |
| ... | ... |
| Code point n | (DL TCI State $T_{sdi}$, UL TCI State $T_{sui}$) |
| Code point n + 1 | (DL TCI State $T_{sdj}$, UL TCI State $T_{suj}$) |
| ... | ... |

In another example, two sets of code-points are configured, wherein a first set of code points is configured for joint TCI state incitation and a second set of codepoints is configured for separate TCI state indication as shown below.

In one example of Example 9, Rows 14 and 15 of TABLE 7, the first set of codepoints, for joint TCI state indication, is configured and/or activated by MAC CE and/or RRC signaling as illustrated in Table 11 (in TABLE 7) for joint TCI state indication. The second set of codepoints, for separate TCI state indication, is configured and/or activated by MAC CE and/or RRC signaling as illustrated in Table 11 for separate TCI state indication. Wherein the set of code points includes: (1) a first set of TCI state ID code points configure for DL TCI state, and (2) a second set of TCI state ID code points configure for UL TCI state.

Wherein, the determination of the joint TCI state and the separate TCI state can be based on one of the following: (1) a 1-bit flag in the DCI that can indicate whether the TCI state signaled in the DCI is for joint or separate TCI state indication (Row 15 of TABLE 7); and (2) a 1-bit flag in MAC CE signaling and/or RRC signaling that can indicate whether the TCI state signaled in the DCI is for joint or separate TCI state indication (Row 14 of TABLE 7).

In one example, Example 10, Rows 16 and 17 of TABLE 7, the first set of codepoints, for joint TCI state indication, is configured and/or activated by MAC CE and/or RRC signaling as illustrated in Table 12 (in TABLE 7) for joint TCI state indication. The second set of codepoints, for separate TCI state indication, is configured and/or activated by MAC CE and/or RRC signaling as illustrated in Table 12 (in TABLE 7) for separate TCI state indication. Wherein the set of code points includes: (1) a first set of TCI state ID code points configure for DL TCI state; (2) a second set of TCI state ID code points configure for UL TCI state; and (3) a third set of TCI state ID code points configured for separate TCI state including a DL TCI state and an UL TCI state for each code point (TCI state pair).

Wherein, the determination of the joint TCI state and the separate TCI state can be based on one of the following: (1) a 1-bit flag in the DCI that can indicate whether the TCI state signaled in the DCI is for joint or separate TCI state indication (Row 17 of TABLE 7); and (2) A 1-bit flag in MAC CE signaling and/or RRC signaling that can indicate whether the TCI state signaled in the DCI is for joint or separate TCI state indication (Row 16 of TABLE 7).

TABLE 16

LIST of TCI States Configured/Activated by MAC CE and/or RRC in Example 9

| Code point | List of Active TCI states for joint TCI (joint beam indication) | List of Active TCI states for separate TCI (separate beam indication) |
|---|---|---|
| Code point 0 | Joint TCI State $T_i$ | DL TCI State $T_{di}$ |
| Code point 1 | Joint TCI State $T_j$ | DL TCI State $T_{dj}$ |
| ... | ... | ... |
| Code point k | Joint TCI State $T_k$ | UL TCI State $T_{uk}$ |
| Code point k + 1 | Joint TCI State $T_l$ | UL TCI State $T_{ul}$ |
| ... | ... | ... |

TABLE 17

LIST of TCI States Configured/Activated
by MAC CE and/or RRC in Example 10

| Code point | List of Active TCI states for joint TCI | List of Active TCI states for separate TCI |
|---|---|---|
| Code point 0 | Joint TCI State $T_i$ | DL TCI State $T_{di}$ |
| Code point 1 | Joint TCI State $T_j$ | DL TCI State $T_{dj}$ |
| ... | ... | ... |
| Code point k | Joint TCI State $T_k$ | UL TCI State $T_{uk}$ |
| Code point k + 1 | Joint TCI State $T_l$ | UL TCI State $T_{ul}$ |
| ... | ... | ... |
| Code point m | Joint TCI State $T_m$ | (DL TCI State $T_{sdm}$, UL TCI State $T_{sum}$) |
| Code point m + 1 | Joint TCI State $T_n$ | (DL TCI State $T_{sdn}$, UL TCI State $T_{sun}$) |
| ... | ... | ... |

Separate TCI state(s) can be signaled in a DCI Format for common and/or UE-group specific channels. In some examples, a same TCI state can apply to common and/or UE-group specific and/or UE-specific channels.

In one example, one or two TCI state codepoints can be signaled in a DCI.

In one example of Rows 18 and 19 of TABLE 7, two sets of code points are configured and/or activated by MAC CE and/or RRC signaling as illustrated in Table 5 (in TABLE 7) for TCI state indication. A first set of TCI state ID code points is configured for Joint TCI state and DL TCI state (in case of separate indication) and a second set of TCI state ID code points is configured for UL TCI state. Either one of the following: (1) a flag in a DCI can indicate whether a TCI state ID in a DCI indicates a joint TCI state (for DL and UL channel) or indicates a separate TCI state for DL channels or for UL channels (Row 19 of TABLE 7); and (2) a flag in a MAC CE and/or RRC message can indicate whether a TCI state ID in a DCI indicates a joint TCI state (for DL and UL channel) or indicates a separate TCI state for DL channels or for UL channels (Row 18 of TABLE 7). In case of a joint TCI state, a single TCI codepoint indicates a joint TCI state for DL and UL channels from the first set. In case of a separate TCI state, two TCI state codepoints indicate a DL TCI state and an UL TCI state from the first and the second sets respectively.

In one example of Rows 20 and 21 of TABLE 7, three sets of code points are configured and/or activated by MAC CE and/or RRC signaling as illustrated in Table 5 (in TABLE 7) for TCI state indication. A first set of TCI state ID code points is configured for Joint TCI state, a second set of TCI state ID code points is configured for DL TCI state and a third set of TCI state ID code points is configured for UL TCI state. Either one of the following: (1) a flag in a DCI can indicate whether a TCI state ID in a DCI indicates a joint TCI state (for DL and UL channel) or indicates a separate TCI state for DL channels or for UL channels (Row 21 of TABLE 7); and (2) a flag in a MAC CE and/or RRC message can indicate whether a TCI state ID in a DCI indicates a joint TCI state (for DL and UL channel) or indicates a separate TCI state for DL channels or for UL channels (Row 20 of TABLE 7). In case of a joint TCI state, a single TCI codepoint indicates a joint TCI state for DL and UL channels from the first set. In case of a separate TCI state, two TCI state codepoints indicate a DL TCI state and an UL TCI state from the second and the third sets respectively.

In one example of Rows 22 and 23 of TABLE 7, if applicable, four sets of code points are configured and/or activated by MAC CE and/or RRC signaling as illustrated in Table 6 (in TABLE 7) for TCI state indication. A first set of TCI state ID code points is configured for Joint TCI state, a second set of TCI state ID code points is configured for DL TCI state, a third set of TCI state ID code points is configured for UL TCI state, and a fourth set of TCI state ID code points is configured for separate TCI state including a DL TCI state and an UL TCI state for each code point (TCI state pair).

A flag in a DCI can indicate whether a TCI state ID in a DCI indicates a joint TCI state (for DL and UL channel) or indicates a separate TCI state with a TCI state pair for DL channels and UL channels, or indicates separate TCI states with a separate DL TCI state for DL channels and a separate TCI state for UL channels (Row 23 of TABLE 7).

A flag in a MAC CE and/or RRC message can indicate whether a TCI state ID in a DCI indicates a joint TCI state (for DL and UL channel) or indicates a separate TCI state with a TCI state pair for DL channels and UL channels, or indicates separate TCI states with a separate DL TCI state for DL channels and a separate TCI state for UL channels (Row 22 of TABLE 7).

In case of a joint TCI state, a single TCI codepoint indicates a joint TCI state for DL and UL channels from the first set. In case of a separate TCI state with a TCI state pair, a single TCI codepoint indicates a TCI state pair with a DL TCI state and an UL TCI state for DL and UL channels respectively from the fourth set. In case of a separate TCI state, two TCI state codepoints indicate a DL TCI state and an UL TCI state from the second and the third sets respectively.

A DCI with a TCI state can be for a specific UE or for a group of UEs.

In one example II.1, UE-specific DCI signaling is used to indicate TCI state.

In one instance, a DCI containing a TCI state can be part of a DCI that includes other control information, e.g., a TCI state can be included in a DL related DCI with a DL assignment, or a TCI state can be included in a DL related DCI without a DL assignment, or a TCI state can be included in an UL related DCI with UL grant.

In one instance, a TCI can be included in a purposed-design DCI for TCI state indication for example a DL related DCI format for beam indication without a DL assignment.

In one example II.1.1, a TCI state of a single entity can be included in a DCI. Wherein, an entity can be serving cell ID, and/or a BWP ID and/or a TRP ID, and/or a TRP panel ID and/or a UE panel ID, etc. A TCI state can be common for UL and DL channels and/or separate TCI states for DL and UL channels.

In another example II.1.2, a TCI state of a multiple entities (e.g., N) can be included in a DCI. Wherein, an entity can be serving cell ID, and/or a BWP ID and/or a TRP ID, and/or a TRP panel ID and/or a UE panel ID, etc. The number of entities (e.g., N), can be indicated in the DCI, or it can be configured by higher layer signaling (e.g., RRC signaling and/or MAC CE signaling). A TCI state can be common for UL and DL channels and/or separate TCI states for DL and UL channels.

In another example II.1.3, a TCI state of a multiple entities (e.g., N) and sub-entities (e.g., M (common to all entities), or $M_1, M_2, \ldots, M_N$, wherein $M_n$ is the number of sub-entities of entity n) can be included in a DCI. Wherein, an entity or sub-entity can be serving cell ID, and/or a BWP ID and/or a TRP ID, and/or a TRP panel ID and/or a UE panel ID, etc. The number of entities (e.g., N) and sub-entities (e.g., M or $M_1, M_2, \ldots, M_N$), can be indicated in the DCI, or the number of entities and sub-entities can be configured by higher layer signaling (e.g., RRC signaling and/or MAC CE signaling). A TCI state can be common for UL and DL channels and/or separate TCI states for DL and UL channels.

In a further example, there could be more levels of sub-entities, i.e., sub-sub-entities, etc.

In another example II.2, UE-group DCI signaling is used to indicate TCI state, wherein a DCI with TCI state includes TCI states for one or more UEs.

A DL-related DCI is a DCI that carries DL assignment information or without DL assignment, such as DCI Format 1_1, DCI Format 1_2 or DCI Format 1_0. In one example II.3, a DL-related DCI can include a joint TCI for DL/UL beam indication or a separate TCIs for DL/UL beam indication or a DL TCI for DL beam indication (cf. U.S. patent application Ser. No. 17/148,517 filed Jan. 13, 2021, which is incorporated by reference herein or an UL TCI for UL beam indication.

DCI Format 1_1 and DCI Format 1_2 include a field "transmission configuration indication" for the indication of a downlink TCI state for PDSCH when higher layer parameter "tci-PresentForDCI", or "tci-PresentForDCI-Format1-2" is enabled.

In one example II.3.1, the "transmission configuration indication" field in DCI Format 1_1 and DCI Format 1_2 is repurposed to be used for joint (common DL and UL) TCI state indication, as described in component 1, for DL and UL channels and signals.

In another example II.3.2, a "Transmission configuration indication" field is included in DCI Format 1_0 for the indication of a joint (common DL/UL) TCI state, as described in component 1, for DL and UL channels and signals.

In another example II.3.3, and in case of separate TCI state indication, the "Transmission configuration indication" field in DCI Format 1_1 and DCI Format 1_2 is repurposed to be used for common DL TCI state indication for DL channels and signals. A second field "uplink transmission configuration indication" is included in DCI Format 1_1 and DCI Format 1_2 for common UL TCI state indication for UL channels and signals.

In another example II.3.4, and in case of separate TCI state indication, a "transmission configuration indication" field is included in DCI Format 1_0 for the indication of a common DL TCI state, as described in component 1, for DL channels and signals. A second field "uplink transmission configuration indication" is included in DCI Format 1_0 for common UL TCI state indication for UL channels and signals.

In another example II.3.5, and in case of separate TCI state indication, the "Transmission configuration indication" field in DCI Format 1_1 and DCI Format 1_2 is repurposed to be used for common DL TCI state indication for DL channels and signals or for common UL TCI state indication for UL channels and signals. A second field "transmission configuration indication type," which can be of size 1 bit, is included in DCI Format 1_1 and DCI Format 1_2, to indicate the type of "transmission configuration indication" field, wherein the type can be (1) downlink, when the "transmission configuration indication" field indicates the TCI state of DL channels or signals, or (2) uplink, when the "transmission configuration indication" field indicates the TCI state of UL channels or signals (Example 3 illustrated in Table 5 of TABLE 7).

A gNB indicates the TCI state of DL channels and signals, and the TCI state of UL channels and signals, in separate transmissions of the DL-related DCI. For example, a first transmission of a DL-related DCI includes the TCI state of DL channels and signals, and a second transmission of a DL related DCI includes the TCI state of UL channels and signals. An additional 1-bit flag can distinguish between joint and separate TCI state indication for example 3 illustrated in Table 5 (in TABLE 7), wherein the flag can be conveyed by DCI signaling and/or MAC CE signaling and/or RRC signaling.

In another example II.3.6, and in case of separate TCI state indication, a "transmission configuration indication" field is included in DCI Format 1_0 for the indication of a common DL TCI state for DL channels and signals or for the indication of a common UL TCI state for UL channels and signals. A second field "transmission configuration indication type," which can be of size 1 bit, is included in DCI Format 1_0, to indicate the type of "transmission configuration indication" field, wherein the type can be (1) downlink, when the "transmission configuration indication" field indicates the TCI state of DL channels or signals, or (2) uplink, when the "transmission configuration indication" field indicates the TCI state of UL channels or signals (Example 3 illustrated in Table 5 of TABLE 7). A gNB indicates the TCI state of DL channels and signals, and the TCI state of UL channels and signals in separate transmissions of the DL-related DCI. For example, a first transmission of a DL-related DCI includes the TCI state of DL channel and signals, and a second transmission of a DL related DCI includes the TCI state of UL channels and signals. An additional 1-bit flag can distinguish between joint and separate TCI state indication for example 3 illustrated in Table 5 in TABLE 7, wherein the flag can be conveyed by DCI signaling and/or MAC CE signaling and/or RRC signaling.

In another example II.3.7, the "transmission configuration indication" field in DCI Format 1_1 and DCI Format 1_2 can only indicate a joint (common DL and UL) TCI state, as described in component 1, for DL and UL channels and signals, or a common DL TCI state for DL channels and signals.

In another example II.3.8, a "transmission configuration indication" field is included in DCI Format 1_0 can only indicate a joint (common DL and UL) TCI state, as described in component 1, for DL and UL channels and signals, or a common DL TCI state for DL channels and signals.

In one example II.3.9, and based on examples II.3.1 to II.3.8, MAC CE activates two separate TCI state subsets (TCI state code points) as described in Example 2 illustrated Table 5 in TABLE 7. A first subset of code points is used for indication of a joint (common DL and UL) TCI state in case of joint beam indication or a common TCI state for DL channels and signals in case of separate DL/UL beam indication. A second subset of code points is used for a common TCI state for UL channels and signals in case of separate DL/UL beam indication. Wherein, a DL-related DCI (i.e., DCI Format 1_1 or DCI Format 1_2 or DCI Format 1_0) can include a first TCI field and possibly a second TCI field.

Wherein: (1) a first (or only) TCI state field indicates a code point from the first subset of code points, for a joint (common DL and UL) TCI state in case of joint beam indication or a common TCI state for DL channels and signals in case of separate DL/UL beam indication; and (2) a second (if present) TCI state field indicates a code point from the second subset of code points, for a common TCI state for UL channels and signals in case of separate DL/UL beam indication.

In a further example II.3.9.1, DCI and/or MAC CE signaling and/or RRC signaling can configure/update a UE whether joint DL/UL beam indication or separate DL/UL beam indication is being signaled (e.g., a 1-bit flag). For example, this can be based on an MPE event being detected. In case of joint DL/UL beam indication a single TCI state field in a DL related DCI indicates a joint DL/UL TCI state. In case of separate DL/UL beam indication: (1) a single TCI state field in a DL related DCI indicates a common DL TCI state for DL channels and signals (example II.3.7 and example II.3.8); and (2) two TCI state fields in a DL related DCI wherein a first TCI state indicates a common DL TCI state for DL channels and signals and a second TCI state indicates a common UL TCI state for UL channels and signals (example II.3.3 and example II.3.4).

In a further example II.3.9.2, a UE can signal to the network whether joint DL/UL beam indication or separate DL/UL beam indication may be signaled, and the network responds accordingly, i.e., based on the UE's signaling the network uses joint DL/UL beam indication or separate DL/UL beam indication. For example, this can be based on an MPE event being detected at the UE. In case of joint DL/UL beam indication a single TCI state field in a DL related DCI indicates a joint DL/UL TCI state. In case of separate DL/UL beam indication: (1) a single TCI state field in a DL related DCI indicates a common DL TCI state for DL channels and signals (example II.3.7 and example II.3.8); and (2) two TCI state fields in a DL related DCI wherein a first TCI state indicates a common DL TCI state for DL channels and signals and a second TCI state indicates a common UL TCI state for UL channels and signals (example II.3.3 and example II.3.4).

In another example II.3.10, and based on examples II.3.5 and II.3.6, MAC CE activates two separate TCI state subsets (TCI state code points) as described in Example 2 illustrated in Table 4 in TABLE 7. A first subset of code points is used for indication of a joint (common DL and UL) TCI state in case of joint beam indication or a common TCI state for DL channels and signals in case of separate DL/UL beam indication. A second subset of code points is used for a common TCI state for UL channels and signals in case of separate DL/UL beam indication.

Wherein, a DL-related DCI (i.e., DCI Format 1_1 or DCI Format 1_2 or DCI Format 1_0 with or without DL assignment) can include one TCI field. Wherein, a UE determines based on implicit indication, explicit indication (e.g., based on a field in the DCI or higher layer signaling or configuration) that: (1) the TCI state field indicates a code point from the first subset of code points, for a joint (common DL and UL) TCI state in case of joint DL/UL beam indication or a common TCI state for DL channels and signals in case of separate DL/UL beam indication; and (2) the TCI state field indicates a code point from the second subset of code points, for a common TCI state for UL channels and signals in case of separate DL/UL beam indication.

In one example II.3.10.1, DCI signaling and/or MAC CE signaling and/or RRC signaling can configure/update a UE whether joint DL/UL beam indication or separate DL/UL beam indication is being signaled. For example, this can be based on an MPE event being detected. In case of joint DL/UL beam indication a TCI state in a DL related DCI indicates a joint DL/UL TCI state. In case of separate DL/UL beam indication a TCI state in a DL related DCI indicates a common DL TCI state for DL channels and signals or a common UL TCI state for UL channels and signals.

In one example II.3.1.2, a UE can signal to the network whether joint DL/UL beam indication or separate DL/UL beam indication may be signaled, and the network responds accordingly, i.e., based on the UE's signaling the network uses joint DL/UL beam indication or separate DL/UL beam indication. For example, this can be based on an MPE event being detected at the UE. In case of joint DL/UL beam indication a TCI state in a DL related DCI indicates a joint DL/UL TCI state. In case of separate DL/UL beam indication a TCI state in a DL related DCI indicates a common DL TCI state for DL channels and signals or a common UL TCI state for UL channels and signals.

In another example II.3.11, and based on examples II.3.9 and II.3.10, MAC CE activates three separate TCI state subsets (TCI state code points) as described in Example 3 illustrated in Table 5 in TABLE 7. A first subset of code points is used for indication of a joint (common DL and UL) TCI state in case of joint beam indication. A second subset of code points is used for a common TCI state for DL channels and signals in case of separate DL/UL beam indication. A third subset of code points is used for a common TCI state for UL channels and signals in case of separate DL/UL beam indication. Based on the type of TCI state being signaled (joint DL/UL, common DL or common UL), a code point from the corresponding subset of code points activated by MAC CE is signaled to the UE in a DL related DCI.

In another example II.3.12, and based on examples II.3.9 and II.3.10, MAC CE activates a single TCI state subset (TCI state code points) as described in Examples 5, 6, 7, and 8 illustrated in Table 7-10 in TABLE 7. Wherein: (1) the subset of code points is used for indication of a joint (common DL and UL) TCI state in case of joint beam indication; (2) the subset of code points is used for a common TCI state for DL channels and signals in case of separate beam indication of a DL TCI state; (3) the subset of code points is used for a common TCI state for UL channels and signals in case of separate beam indication of a UL TCI state; and/or (4) the subset of code points is used for indication of a TCI state pair including a first common TCI state for DL channels and signals and a second common TCI state for UL channels and singles in case of separate beam indication of a UL TCI state.

Based on the type of TCI state being signaled (joint DL/UL, common DL or common UL or TCI state pair including a first common DL and a first common UL), a code point from the subset of code points activated by MAC CE is signaled to the UE in a DL related DCI to indicate: (1) a joint DL/UL TCI state; (2) a common DL TCI state; (3) a common UL TCI state, or (4) a TCI state pair including a common DL TCI state and a common UL TCI state.

In another example II.3.13, and based on examples II.3.11 and II.3.12 and FIG. 12C, the subset(s) of TCI state code points to be signaled in a DL related DCI is activated by RRC signaling.

In another example II.3.14, and based on examples II.3.9 to II.3.13 a purpose designed DCI for TCI state indication is used to signal a TCI state(s). For example, a DL related DCI format for beam indication without a DL assignment.

An UL-related DCI is a DCI that carries UL scheduling grant information, such as DCI Format 0_1, DCI Format 0_2 or DCI Format 1_0. An UL related DCI can be a DCI format, such as DCI Format 0_1, DCI Format 0_2 or DCI Format 0_0, without UL scheduling grant. In one example II.4, an UL-related DCI can include a joint TCI for DL/UL beam indication or a separate TCIs for DL/UL beam indication or an UL TCI for UL beam indication (cf. U.S. Provisional Patent Application 62/961,858 as incorporated by reference herein or a DL TCI for DL beam indication.

DCI Format 0_1 and DCI Format 0_2 can include a field "SRS resource indicator."

In one example II.4.1, the "SRS resource indicator" field in DCI Format 0_1 and DCI Format 0_2 is repurposed to be used for joint (common DL and UL) TCI state indication, as described in component 1, for DL and UL channels and signals.

In another example II.4.2, a "transmission configuration indication" field is included in DCI Format 0_0, DCI Format 0_1 and/or DCI Format 2_1 for the indication of a joint (common DL/UL) TCI state, as described in component 1, for DL and UL channels and signals.

In another example II.4.3, and in case of separate TCI state indication, the "SRS resource indicator" field in DCI Format 0_1 and DCI Format 0_2 is repurposed to be used for common UL TCI state indication for UL channels and signals. A second field "downlink transmission configuration indication" is included in DCI Format 0_1 and DCI Format 0_2 for common DL TCI state indication for DL channels and signals.

In another example II.4.4, and in case of separate TCI state indication, a "uplink transmission configuration indication" field is included in DCI Format 0_0, DCI Format 0_1 and/or DCI Format 0_2 for the indication of a common UL TCI state, as described in component 1, for UL channels and signals. A second field "downlink transmission configuration indication" is included in DCI Format 0_0, DCI Format 0_1 and/or DCI Format 0_2 for common DL TCI state indication for DL channels and signals.

In another example II.4.5, and in case of separate TCI state indication, the "SRS resource indicator" field in DCI Format 0_1 and DCI Format 0_2 is repurposed to be used for common UL TCI state indication for UL channels and signals or for common DL TCI state indication for DL channels and signals. A second field "transmission configuration indication type," which can be of size 1 bit, is included in DCI Format 0_1 and DCI Format 0_2, to indicate the type of "transmission configuration indication" field, wherein the type can be (1) downlink, when the "transmission configuration indication" field indicates the TCI state of DL channels or signals, or (2) uplink, when the "transmission configuration indication" field indicates the TCI state of UL channels or signals (Example 3 illustrated in Table 5 in TABLE 7). A gNB indicates the TCI state of DL channels and signals, and the TCI state of UL channels and signals, in separate transmissions of the UL-related DCI. For example, a first transmission of an UL-related DCI includes the TCI state of DL channels and signals, and a second transmission of an UL related DCI includes the TCI state of UL channels and signals. An additional 1-bit flag can distinguish between joint and separate TCI state indication for example 3 illustrated in Table 5 in TABLE 7, wherein the flag can be conveyed by DCI signaling and/or MAC CE signaling and/or RRC signaling.

In another example II.4.6, and in case of separate TCI state indication, a "transmission configuration indication" field is included in DCI Format 0_0, DCI Format 0_1 and/or DCI Format for the indication of a common UL TCI state for UL channels and signals or for the indication of a common DL TCI state for DL channels and signals. A second field "transmission configuration indication type," which can be of size 1 bit, is included in DCI Format 0_0, DCI Format 0_1 and/or DCI Format 0_2 to indicate the type of "transmission configuration indication" field, wherein the type can be (1) downlink, when the "transmission configuration indication" field indicates the TCI state of DL channels or signals, or (2) uplink, when the "transmission configuration indication" field indicates the TCI state of UL channels or signals (Example 3 illustrated in Table 5 in TABLE 7). A gNB indicates the TCI state of DL channels and signals, and the TCI state of UL channels and signals in separate transmissions of the UL-related DCI. For example, a first transmission of a UL-related DCI includes the TCI state of DL channel and signals, and a second transmission of a UL related DCI includes the TCI state of UL channels and signals. An additional 1-bit flag can distinguish between joint and separate TCI state indication for example 3 illustrated in Table 5 in TABLE 7, wherein the flag can be conveyed by DCI signaling and/or MAC CE signaling and/or RRC signaling.

In another example II.4.7, the "SRS resource indicator" field in DCI Format 0_1 and DCI Format 0_2 can only indicate a joint (common DL and UL) TCI state, as described in component 1, for DL and UL channels and signals, or a common UL TCI state for UL channels and signals.

In another example II.4.8, a "transmission configuration indication" field is included in DCI Format 0_0, DCI Format 0_1 and/or DCI Format 0_2 can only indicate a joint (common DL and UL) TCI state, as described in component 1, for DL and UL channels and signals, or a common UL TCI state for UL channels and signals.

In one example II.4.9, and based on examples II.4.1 to II.4.8, MAC CE activates two separate TCI state subsets (TCI state code points) as described in Example 2 illustrated Table 5 in TABLE 7. A first subset of code points is used for indication of a joint (common DL and UL) TCI state in case of joint beam indication or a common TCI state for UL channels and signals in case of separate DL/UL beam indication. A second subset of code points is used for a common TCI state for DL channels and signals in case of separate DL/UL beam indication. Wherein, a UL-related DCI (i.e., DCI Format 0_1 or DCI Format 0_2 or DCI Format 0_0) can include a first TCI field and possibly a second TCI field. Wherein: (1) a first (or only) TCI state field indicates a code point from the first subset of code points, for a joint (common DL and UL) TCI state in case of joint beam indication or a common TCI state for UL channels and signals in case of separate DL/UL beam indication; and (2) a second (if present) TCI state field indicates a code point from the second subset of code points, for a common TCI state for DL channels and signals in case of separate DL/UL beam indication.

In a further example II.4.9.1, DCI and/or MAC CE signaling and/or RRC signaling can configure/update a UE whether joint DL/UL beam indication or separate DL/UL beam indication is being signaled (e.g., a 1-bit flag). For example, this can be based on an MPE event being detected. In case of joint DL/UL beam indication a single TCI state field in a UL related DCI indicates a joint DL/UL TCI state. In case of separate DL/UL beam indication: (1) a single TCI state field in a UL related DCI indicates a common UL TCI state for UL channels and signals (example II.4.7 and example II.4.8); and (2) two TCI state fields in a UL related DCI wherein a first TCI state indicates a common UL TCI state for UL channels and signals and a second TCI state indicates a common DL TCI state for DL channels and signals (example II.4.3 and example II.4.4).

In a further example II.4.9.2, a UE can signal to the network whether joint DL/UL beam indication or separate DL/UL beam indication may be signaled, and the network responds accordingly, i.e., based on the UE's signaling the network uses joint DL/UL beam indication or separate DL/UL beam indication. For example, this can be based on an MPE event being detected at the UE. In case of joint DL/UL beam indication a single TCI state field in a UL related DCI indicates a joint DL/UL TCI state. In case of separate DL/UL beam indication: (1) a single TCI state field in a UL related DCI indicates a common UL TCI state for UL channels and signals (example II.4.7 and example II.4.8); and (2) two TCI state fields in a UL related DCI wherein a first TCI state indicates a common UL TCI state for UL channels and signals and a second TCI state indicates a common DL TCI state for DL channels and signals (example II.4.3 and example II.4.4).

In another example II.4.10, and based on examples II.4.5 and II.4.6, MAC CE activates two separate TCI state subsets (TCI state code points) as described in similar to Example 2 illustrated in Table 4 in TABLE 7. A first subset of code points is used for indication of a joint (common DL and UL) TCI state in case of joint beam indication or a common TCI state for UL channels and signals in case of separate DL/UL beam indication. A second subset of code points is used for a common TCI state for DL channels and signals in case of separate DL/UL beam indication. Wherein, a UL-related DCI (i.e., DCI Format 0_1 or DCI Format 0_2 or DCI Format 0_0) can include one TCI field. Wherein, a UE determines based on implicit indication, explicit indication (e.g., based on a field in the DCI) that: (1) the TCI state field indicates a code point from the first subset of code points, for a joint (common DL and UL) TCI state in case of joint DL/UL beam indication or a common TCI state for UL channels and signals in case of separate DL/UL beam indication; and (2) the TCI state field indicates a code point from the second subset of code points, for a common TCI state for DL channels and signals in case of separate DL/UL beam indication.

In a further example II.4.10.1, DCI and/or MAC CE signaling and/or RRC signaling can configure/update a UE whether joint DL/UL beam indication or separate DL/UL beam indication is being signaled. For example, this can be based on an MPE event being detected. In case of joint DL/UL beam indication a TCI state in a UL related DCI indicates a joint DL/UL TCI state. In case of separate DL/UL beam indication a TCI state in a UL related DCI indicates a common UL TCI state for UL channels and signals or a common DL TCI state for DL channels and signals.

In a further example II.4.10.2, a UE can signal to the network whether joint DL/UL beam indication or separate DL/UL beam indication may be signaled, and the network responds accordingly, i.e., based on the UE's signaling the network uses joint DL/UL beam indication or separate DL/UL beam indication. For example, this can be based on an MPE event being detected at the UE. In case of joint DL/UL beam indication a TCI state in a UL related DCI indicates a joint DL/UL TCI state. In case of separate DL/UL beam indication a TCI state in a UL related DCI indicates a common UL TCI state for UL channels and signals or a common DL TCI state for DL channels and signals.

In another example II.4.11, and based on examples II.4.9 and II.4.10, MAC CE activates three separate TCI state subsets (TCI state code points) as described in Example 3 illustrated in Table 5 in TABLE 7. A first subset of code points is used for indication of a joint (common DL and UL) TCI state in case of joint beam indication. A second subset of code points is used for a common TCI state for DL channels and signals in case of separate DL/UL beam indication. A third subset of code points is used for a common TCI state for UL channels and signals in case of separate DL/UL beam indication. Based on the type of TCI state being signaled (joint DL/UL, common DL or common UL), a code point from the corresponding subset of code points activated by MAC CE is signaled to the UE in a UL related DCI.

In another example II.4.12, and based on examples II.4.9 and II.4.10, MAC CE activates a single TCI state subset (TCI state code points) as described in Examples 5, 6, 7, and 8 illustrated in Table 7-10 in TABLE 7. Wherein: (1) the subset of code points is used for indication of a joint (common DL and UL) TCI state in case of joint beam indication; (2) the subset of code points is used for a common TCI state for DL channels and signals in case of separate beam indication of a DL TCI state; (3) the subset of code points is used for a common TCI state for UL channels and signals in case of separate beam indication of a UL TCI state; and/or (4) the subset of code points is used for indication of a TCI state pair including a first common TCI state for DL channels and signals and a second common TCI state for UL channels and singles in case of separate beam indication of a UL TCI state.

Based on the type of TCI state being signaled (joint DL/UL, common DL or common UL or TCI state pair including a first common DL and a first common UL), a code point from the subset of code points activated by MAC CE is signaled to the UE in a UL related DCI to indicate: (1) a joint DL/UL TCI state; (2) a common DL TCI state; (3) a common UL TCI state; or (4) a TCI state pair including a common DL DCI state and a common UL TCI state.

In another example II.4.13, and based on examples II.4.11 and II.4.12 and FIG. 12C, the subset(s) of TCI state code points to be signaled in a UL related DCI is activated by RRC signaling.

In another example II.4.14, and based on examples II.4.9 to II.4.13 a purpose designed DCI for TCI state indication is used to signal a TCI state(s). For example, a UL related DCI format for beam indication without an UL grant.

In another example II.4.15 and based on example II.3.9 to II.3.13 and II.4.9 to II.4.13, MAC CE activates two separate TCI state subsets (TCI state code points) as described in component 1.

In one example of a first subset of code points: (1) a first subset of code points is used for indication of a joint (common DL and UL) TCI state in case of joint beam indication; (2) for DL related DCI, a first subset of code points is used for a common TCI state for DL channels and signals in case of separate DL/UL beam indication; and/or (3) for UL related DCI, a first subset of code points is used for a common TCI state for UL channels and signals in case of separate DL/UL beam indication.

In one example of a second subset of code points: (1) for DL related DCI, a second subset of code points is used for a common TCI state for UL channels and signals in case of separate DL/UL beam indication; and/or (2) for UL related DCI, a second subset of code points is used for a common TCI state for DL channels and signals in case of separate DL/UL beam indication.

In one example II.5, a gNB/NW signals to the UE M DL TCI states and N UL TCI states. Wherein, the gNB/NW can configure and/or activate by RRC signaling and/or MAC CE signaling one or more of: (1) a first subset $S_1$ of TCI state code points for DL TCI states; (2) a second subset $S_2$ of TCI state code points for UL TCI states; (3) a third subset $S_3$ of TCI state code points for Joint (DL and UL) TCI states; (4) a fourth subset $S_4$ of TCI state code points for indicating DL TCI state and UL TCI state (TCI state pair); and/or (5) a fifth subset $S_5$ of TCI state code points for indicate Joint (DL and UL) TCI states for joint TCI state indication or DL TCI states for separate TCI state indication. M is the number of entities with DL channels. N is the number of entities with UL channels.

In one example II.5.1, the gNB/NW can indicate to the UE in a DCI Format (e.g., a DL related DCI Format, an UL related DCI Format or a DCI Format for TCI state indication): (1) $K_j$ TCI state IDs for indicating a joint TCI states from $S_3$; (2) $K_d$ TCI state IDs for indicating DL TCI states from $S_1$; and (3) $K_u$ TCI state IDs for indicating UL TCI states from $S_2$.

Wherein, $K_d=M-K_j$ and $K_u=N-K_j$. In addition to the general case, the following are special cases: (1) in one example, there are no joint TCI states, $K_j=0$ and $K_d=M$ and $K_u=N$; (2) in another example, M=N and a joint TCI state is used for all signaled TCI states, i.e., $K_j=M=N$ and $K_d=0$ and $K_u=0$; and (3) in another example, $K_j=\min(M, N)$ and: (i) if M>N, $K_d=M-N$, $K_u=0$; and (ii) if N>M, $K_u=N-M$, $K_d=0$.

In another example II.5.2, the gNB/NW can indicate to the UE in a DCI Format (e.g., a DL related DCI Format, an UL related DCI Format or a DCI Format for TCI state indication): (1) $K_j$ TCI state IDs for indicating joint TCI states from $S_3$; (2) $K_5$ TCI state IDs for indicating separate DL/UL TCI states from $S_4$; (3) $K_d$ TCI state IDs for indicating DL TCI states from $S_1$; and (4) $K_u$ TCI state IDs for indicating UL TCI states from $S_2$.

Wherein, $K_d=M-K_j-K_s$ and $K_u=N-K_j-K_s$. In addition to the general case, the following are special cases: (1) in one example, there are no joint TCI states, $K_j=0$ and $K_d=M-K_s$ and $K_u=N-K_s$; (2) in another example, M=N and a separate TCI state is used for all signaled TCI states, i.e., $K_j=0$, $K_s=M=N$ and $K_d=0$ and $K_u=0$; (3) in another example, M=N and $K_j$ joint TCI states are signaled, and separate TCI states are used for all remaining signaled TCI states, i.e., $K_s=M-K_j=N-K_j$ and $K_d=0$ and $K_u=0$; (4) in another example, no joint TCI states are signaled, i.e., $K_j=0$, and $K_s=\min(M, N)$ and: (i) if M>N, $K_d=M-N$, $K_u=0$ and (ii) if N>M, $K_u=N-M$, $K_d=0$; and (4) in another example, $K_j$ joint TCI states are signaled, i.e, and $K_s=\min(M-K_j, N-K^j)$ and: (i) if M>N, $K_d=M-N-=0$; and (ii) if N>M, $K_u=N-M-K_j$, $K_d=0$.

In another example II.5.3, the gNB/NW can indicate to the UE in a DCI Format (e.g., a DL related DCI Format, an UL related DCI Format or a DCI Format for TCI state indication): $K_{jd}$ TCI state IDs indicating: (1) joint TCI states from $S_5$; and/or (2) DL TCI states from $S_5$, and UL TCI states from $S_2$, wherein, a bit map of length $K_{jd}$, can indicate for each of the $K_{jd}$ TCI state IDs whether the corresponding TCI state is a joint TCI state or a separate DL/UL TCI state. The bit map can be configured and/or updated by RRC signaling and/or MAC CE signaling or included in the DCI with the TCI state IDs. alternatively, a single-bit flag can indicate for all the $K_{jd}$ TCI state IDs whether the corresponding TCI states are joint TCI states or separate DL/UL TCI states. The flag can be configured and/or updated by RRC signaling and/or MAC CE signaling or included in the DCI with the TCI state IDs. Alternatively, the $K_{jd}$ TCI state IDs can be partitioned into L groups. An L-bit bitmap can indicate for each group if TCI state IDs whether the corresponding TCI states of the group are joint TCI states or separate DL/UL TCI states. The bit map can be configured and/or updated by RRC signaling and/or MAC CE signaling or included in the DCI with the TCI state IDs.

In another example II.5.3, the gNB/NW can indicate to the UE in a DCI Format (e.g., a DL related DCI Format, an UL related DCI Format or a DCI Format for TCI state indication): $K_u$ TCI state IDs for indicating UL TCI states from $S_2$. Wherein, $K_{jd}=M$ and $K_u=\max(0, N-M)$.

In another example II.5.4, the gNB/NW can indicate to the UE in a DCI Format (e.g., a DL related DCI Format, an UL related DCI Format or a DCI Format for TCI state indication) up to M DL TCI states and/or up to N UL TCI states.

In one example II.5.4.1, the gNB/NW can indicate to the UE up to M DL TCI states.

In one example II.5.4.1.1, the gNB/NW can indicate to the UE one of M DL TCI states, a field of size $[\log_2 (M)]$ in the DCI format can indicate the DL TCI state being signaled.

In another example II.5.4.1.2, the gNB/NW can indicate to the UE one of M DL TCI states or all M DL TCI states, a field of size $[\log_2 (M+1)]$ in the DCI format can indicate either the DL TCI state being signaled or that all M DL TCI states are being signaled.

In another example II.5.4.1.3, the gNB/NW can indicate to the UE any combination of M DL TCI states, a field of size M-bits or of size $[\log_2 (2^M-1)]$ in the DCI format can indicate a subset of M DL TCI states being signaled.

In the sub-examples of example II.5.4.1, a flag can indicate whether the TCI state ID is for DL TCI state only, or a joint DL/UL TCI state. The flag can be signaled by: (1) a DCI signaling in the DCI Format with the TCI state; (2) a DCI signaling in a DCI Format separate from that of the TCI state; (3) a MAC CE signaling; and/or (4) an RRC signaling.

In the sub-examples of example II.5.4.1, the bit-field indicating the signaled TCI state, can be signaled by MAC CE signaling and/or RRC signaling instead of or in addition to DCI signaling.

In one example II.5.4.2, the gNB/NW can indicate to the UE up to N UL TCI states.

In one example II.5.4.2.1, the gNB/NW can indicate to the UE one of N UL TCI states, a field of size $[\log_2 (N)]$ in the DCI format can indicate the UL TCI state being signaled.

In another example II.5.4.2.2, the gNB/NW can indicate to the UE one of N UL TCI states or all N UL TCI states, a field of size $[\log_2 (N+1)]$ in the DCI format can indicate either the UL TCI state being signaled or that all N UL TCI states are being signaled.

In another example II.5.4.2.3, the gNB/NW can indicate to the UE any combination of N UL TCI states, a field of size N-bits or of size $[\log_2 (2^N-1)]$ in the DCI format can indicate a subset of N UL TCI states being signaled.

In the sub-examples of example II.5.4.2, a flag can indicate whether the TCI state ID is for UL TCI state only, or a joint DL/UL TCI state. The flag can be signaled by: (1) a DCI signaling in the DCI Format with the TCI state; (2) a DCI signaling in a DCI Format separate from that of the TCI state; (3) a MAC CE signaling; and/or (4) an RRC signaling.

In the sub-examples of example II.5.4.2, the bit-field indicating the signaled TCI state, can be signaled by MAC CE signaling and/or RRC signaling instead of or in addition to DCI signaling.

In one example II.5.4.3, the gNB/NW can indicate to the UE up to M DL TCI states or N UL TCI states.

In one example II.5.4.3.1, the gNB/NW can indicate to the UE one of M DL TCI states or N UL TCI states, a field of size $[\log_2 (M+N)]$ in the DCI format can indicate the DL or UL TCI state being signaled.

In another example II.5.4.3.2, the gNB/NW can indicate to the UE one of M DL TCI states or N UL TCI states or all M DL TCI states and N UL TCI states, a field of size $[\log_2 (M+N+1)]$ in the DCI format can indicate either the DL or UL TCI state being signaled or that all M DL TCI states and N UL TCI states are being signaled.

In another example II.5.4.3.3, the gNB/NW can indicate to the UE any combination of M DL TCI states and N UL TCI states, a field of size (M+N)-bits or of size [$\log_2 (2^M+N-1)$] in the DCI format can indicate a subset of M DL TCI states and N UL TCI states being signaled.

In another example II.5.4.3.4, the gNB/NW can indicate to the UE one of M DL TCI states and one of N UL TCI states, a first field of size [$\log_2 (M)$] and a second field of size [$\log_2 (N)$] in the DCI format can indicate the DL and UL TCI states being signaled respectively. In one example, an additional field of size one bit can indicate whether a joint TCI state is being signaled or separate TCI states are being signaled. In case of separate TCI states, either: (1) two TCI state IDs are being signaled, a first TCI state ID for DL TCI state from set $S_1$ or $S_5$ and a second TCI state ID from UL TCI state from set $S_2$; or (2) a single TCI state ID from set $S_4$ for indication of a separate DL TCI state and UL TCI state.

A flag in DCI signaling and/or MAC CE signaling and/or RRC signaling can indicate which one of the previous two options is selected.

In the sub-examples of example II.5.4.3, the bit-field indicating the signaled TCI state, can be signaled by MAC CE signaling and/or RRC signaling instead of or in addition to DCI signaling.

In one example II.5.4.4, the gNB/NW can indicate to the UE up to M DL TCI states or N UL TCI states.

The M DL TCI states can consist of $K_d$ DL TCI state IDs from set $S_1$ or $S_5$ and $K_{js}$ TCI state IDs that jointly indicate a DL TCI state with corresponding UL TCI state from set $S_3$ or separately indicated DL TCI state and UL TCI state but using a single TCI state ID from set $S_4$. Therefore, $M=K_d+K_{js}$.

The N UL TCI states can consist of $K_u$ UL TCI state IDs from set $S_2$ and $K_{js}$ TCI state IDs that jointly indicate a UL TCI state with corresponding DL TCI state from set $S_3$ or separately indicated from UL TCI state and DL TCI states but using a single TCI state ID from set $S_4$. Therefore, $N=K_u+K_{js}$.

A first bit-field of size $K_d+K_{js}$ can indicate which of the DL, UL, Joint/Separate TCI state IDs are being signaled. Additionally, a second bit-field of size $K_{js}$ can indicate whether joint or separate TCI state IDs are being signaled. The first and second bit fields can be signaled by: (1) a DCI signaling in the DCI Format with the TCI state; (2) a DCI signaling in a DCI Format separate from that of the TCI state; (3) a MAC CE signaling; and/or (4) an RRC signaling.

The signaling mechanism of the first bit-field can be different from that of the second bit-field.

In example II.5.5, the gNB/NW can indicate to the UE in a DCI Format (e.g., a DL related DCI Format, an UL related DCI Format or a DCI Format for TCI state indication) M DL TCI states and/or N UL TCI states using one or two TCI state codepoints.

In one example II.5.5.1, the M DL TCI states or a subset of the M TCI states are mapped to K codepoints, e.g., $K=2^k$, wherein k is the bit field size of the TCI state field in DCI Format. In one example, the size of the subset of M TCI states mapped to codepoints is configured and/or updated by higher layer RRC signaling and/or MAC CE signaling.

In one example, each code point has a TCI state corresponding to each of the M DL TCI states.

In another example, a code point may not have a TCI state corresponding to each the M DL TCI states. This is illustrated in the example of Table 13, where a N/A indicates that the TCI state is not updated when the corresponding codepoint is applied.

TABLE 18

LIST of TCI States Configured/Activated by MAC CE and/or RRC for M DL TCI states.

| Code point | DL TCI State_1 | ... | DL TCI State M |
|---|---|---|---|
| Code point 0 | DL TCI State $T_d(1, 0)$ | ... | DL TCI State $T_d(M, 0)$ |
| Code point 1 | DL TCI State $T_d(1, 1)$ | ... | N/A |
| Code point 2 | N/A | ... | DL TCI State $T_d(M, 2)$ |
| Code point 3 | DL TCI State $T_d(1, 3)$ | ... | DL TCI State $T_d(M, 3)$ |
| ... | ... | | ... |
| Code point K − 1 | DL TCI State $T_d(1, K-1)$ | ... | DL TCI State $T_d(M, K-1)$ |

In one example, the M DL TCI states are divided into m groups of M/m TCI states each. A set of codepoints is configured for each group. MAC CE signaling and/or a field in the DCI format can indicated the group of DL TCI states to which the codepoint in the DCI format applies.

In one example, the DL TCI states are from the first subset $S_1$ of TCI state code points for DL TCI states.

In another example, the DL TCI state are from the fifth subset $S_5$ of TCI state code points for indicate Joint (DL and UL) TCI states for joint TCI state indication or DL TCI states for separate TCI state indication.

In another example II.5.5.2, the N UL TCI states or a subset of the N TCI states are mapped to K codepoints, e.g., $K=2^k$, wherein k is the bit field size of the TCI state field in DCI Format. In one example, the size of the subset of N TCI states mapped to codepoints is configured and/or updated by higher layer RRC signaling and/or MAC CE signaling.

In one example, each code point has a TCI state corresponding to each of the N UL TCI states.

In another example, a code point may not have a TCI state corresponding to each the N UL TCI states. This is illustrated in the example of TABLE 19, where a N/A indicates that the TCI state is not updated when the corresponding codepoint is applied.

TABLE 19

LIST of TCI States Configured/Activated by MAC CE and/or RRC for N UL TCI states.

| Code point | UL TCI State_1 | ... | UL TCI State N |
|---|---|---|---|
| Code point 0 | UL TCI State $T_d(1, 0)$ | ... | UL TCI State $T_d(N, 0)$ |
| Code point 1 | UL TCI State $T_d(1, 1)$ | ... | N/A |
| Code point 2 | N/A | ... | UL TCI State $T_d(N, 2)$ |
| Code point 3 | UL TCI State $T_d(1, 3)$ | ... | UL TCI State $T_d(N, 3)$ |
| ... | ... | | ... |
| Code point K − 1 | UL TCI State $T_d(1, K-1)$ | ... | UL TCI State $T_d(N, K-1)$ |

In one example, the N UL TCI states are divided into n groups of N/n TCI states each. A set of codepoints is configured for each group. MAC CE signaling and/or a field in the DCI format can indicated the group of UL TCI states to which the codepoint in the DCI format applies.

In one example, the UL TCI states are from the second subset $S_2$ of TCI state code points for UL TCI states.

In another example II.5.5.3, the DCI Format for beam indication includes two codepoints, a first codepoint for [a subset of] M DL TCI states according to example II.5.5.1, and a second codepoint for [a subset of] N UL TCI states according to example II.5.5.2.

In another example II.5.5.4, the DCI format for beam indication includes a flag that indicates the type of codepoint carried by the DCI Format, wherein the codepoint can be, according to the flag, one of: (1) a codepoint for [a subset of] M DL TCI states; or (2) a codepoint for [a subset of] N UL TCI states.

In another example II.5.5.5, the M DL TCI states and N UL TCI states or a subset of the M+N TCI states are mapped to K codepoints, e.g., $K=2^k$, wherein k is the bit field size of the TCI state field in DCI Format. In one example, the size of the subset of M+N TCI states mapped to codepoints is configured and/or updated by higher layer RRC signaling and/or MAC CE signaling. A codepoint indicates TCI states for [a subset of] the M+N DL/UL TCI states.

In one example, the M DL TCI states and N UL TCI states are divided into p groups of (M+M)/p TCI states each. A set of codepoints is configured for each group. MAC CE signaling and/or a field in the DCI format can indicated the group of DL or UL TCI states to which the codepoint in the DCI format applies.

In another example II.5.6, the UE is configured with P modes examples as shown in below.

In one example, when M=1 and N=1, i.e., one DL TCI state and one UL TCI state: (1) P=2, with activated TCI state codepoints for Joint and DL TCI states and activated TCI state codepoints for UL TCI states; (2) P=3, with activated TCI state codepoints for Joint and DL TCI states, activated TCI state codepoints for UL TCI states and activated TCI state codepoints for DL/UL TCI state pairs; (3) P=2, with activated TCI state codepoints for DL TCI states and activated TCI state codepoints for UL TCI states; and (4) P=3, with activated TCI state codepoints for DL TCI states, activated TCI state codepoints for UL TCI states and activated TCI state codepoints for DL/UL TCI state pairs.

In one example, when M>1, M is the number of DL TCI states: (1) P=3, for example M=2 (m=0, m=1) and N=1, with activated TCI state codepoints for DL TCI states for first DL TCI state (m=0), activated TCI state codepoints for DL TCI states for second DL TCI state (m=1), and activated TCI state codepoints for UL TCI states.

In one example, when N>1, N is the number of UL TCI states: (1) P=3, for example M=1 and N=2 (n=0, n=1) and N=1, with activated TCI state codepoints for DL TCI states, activated TCI state codepoints for UL TCI states for first UL TCI state (n=1), and activated TCI state codepoints for UL TCI states for second UL TCI state (n=2).

In one example, when M>1, and N>1, M is the number of DL TCI states and N is the number of UL TCI states: (1) P=4, for example M=2 (m=0, m=1) and N=2 (n=0, n=1), with activated TCI state codepoints for DL TCI states for first DL TCI state (m=0), activated TCI state codepoints for DL TCI states for second DL TCI state (m=1), activated TCI state codepoints for UL TCI states for first UL TCI state (n=1), and activated TCI state codepoints for UL TCI states for second UL TCI state (n=2).

In one example, the mode is activated by MAC CE and the TCI state codepoint in a DCI Format conveying beam indication sent after the MAC CE activation of a mode and subject to the processing delay requirement indicates the TCI state of a DL TCI state and/or UL TCI state according to the activated mode.

In another example, the mode is included with the TCI state codepoint in a DCI Format conveying beam indication that indicates the TCI state of a DL TCI state and/or UL TCI state according to the indicated mode.

In example II.5.7, the gNB/NW can indicate to the UE in a DCI Format (e.g., a DL related DCI Format, an UL related DCI Format or a DCI Format for TCI state indication) M DL TCI states and/or N UL TCI states using one TCI state codepoint. The TCI state field in the DCI format of size k-bits can indicate one of K codepoints, wherein $K=2^k$. In one example, the UE is configured with P modes. The K TCI state codepoints are split among the P modes (evenly or unevenly), as illustrated in TABLE 20.

TABLE 20

| Allocation of TCI state code points to Modes | |
| --- | --- |
| Mode | Allocated Code points |
| 0 | $0, \ldots K_0 - 1$ |
| 1 | $K_0, \ldots, K_1 - 1$ |
| ... | ... |
| P − 1 | $K_{P-2}, \ldots, K - 1$ |

A mode corresponds to a set of channels with a common or joint TCI state. For example, if M=1 and N=1, and joint beam indication is used for DL and UL channels, there is a single mode and all activated code points are allocated to that mode. A codepoint indicates the joint TCI state for DL and UL channels.

A mode corresponds to a set of channels with a common or joint TCI state. For example, if M=1 and N=1, and separate beam indication is used for DL and UL channels, there are two modes. The activated codepoints are split among these two modes. For example, if K=8, 4 codepoints are allocated to the first mode and 4 codepoints are allocated to the second mode: (1) a first mode: DL TCI state indication. A codepoint indicates a DL TCI state; and (2) a second mode: UL TCI state indication. A codepoint indicates a UL TCI state.

A mode corresponds to a set of channels with a common or joint TCI state. For example, if M=2 (m=0, m=1) and N=2 (n=0, n=1), and joint beam indication is used for DL and UL channels, there are two modes. The activated codepoints are split among these two modes. For example, if K=8, 4 codepoints are allocated to the first mode and 4 codepoints are allocated to the second mode: (1) a first mode: Joint TCI state indication for m=0 and n=0. A codepoint indicates a Joint (DL/UL) TCI state for m=0 and n=0; and (2) a second mode: Joint TCI state indication for m=1 and n=1. A codepoint indicates a Joint (DL/UL) TCI state for m=1 and n=1.

A mode corresponds to a set of channels with a common or joint TCI state. For example, if M=2 (m=0, m=1) and N=2 (n=0, n=1), and joint beam indication is used for DL and UL channels with m=0 and n=0, and separate beam indication is used for DL and U channels with m=1 and n=1, there are three modes. The activated codepoints are split among these three modes. For example, if K=8, (3 or 4) codepoints are allocated to the first mode, (3 or 2) codepoints are allocated to the second mode, and (2 or 2) codepoints are allocated to the third mode: (1) a first mode: Joint TCI state indication for m=0 and n=0. A codepoint indicates a Joint (DL/UL) TCI state for m=0 and n=0; (2) a second mode: DL TCI state indication for m=1. A codepoint indicates a DL TCI state for m=1; and (3) a third mode: UL TCI state indication for n=1. A codepoint indicates a UL TCI state for n=1.

A mode corresponds to a set of channels with a common or joint TCI state. For example, if M=2 (m=0, m=1) and N=2 (n=0, n=1), and separate beam indication is used for DL and U channels, there are four modes. The activated codepoints are split among these four modes. For example, if K=8, 2 codepoints are allocated to the first mode, 2 codepoints are allocated to the second mode, 2 codepoints are allocated to the third mode and 2 codepoints are allocated to the fourth mode: (1) a first mode: DL TCI state indication for m=0. A codepoint indicates a DL TCI state for m=0; (2) a second mode: UL TCI state indication for n=0. A codepoint indicates a UL TCI state for n=0; (3) a third mode: DL TCI state indication for m=1. A codepoint indicates a DL TCI state for m=1; and (4) a fourth mode: UL TCI state indication for n=1. A codepoint indicates a UL TCI state for n=1.

A mode corresponds to a set of channels with a common or joint TCI state. For example, if M=2 (m=0, m=1) and N=1 (n=0), and separate beam indication is used for DL and UL channels, there are three modes. The activated codepoints are split among these three modes. For example, if K=8, (3 or 4) codepoints are allocated to the first mode, (3 or 2) codepoints are allocated to the second mode, and (2 or 2) codepoints are allocated to the third mode: (1) a first mode: DL TCI state indication for m=0. A codepoint indicates a DL TCI state for m=0; (2) a second mode: DL TCI state indication for m=1. A codepoint indicates a DL TCI state for m=1; and (3) a third mode: UL TCI state indication for n=0. A codepoint indicates a UL TCI state for n=0.

In one example, (1) if M=1 and N=1, the UE can be configured with joint TCI state indication (single mode), or separate TCI state indication (two modes, a first mode for DL and a second mode for UL); and (2) if M=2 (m=0, m=1) and N=2 (n=0, n=1), the UE can only be configured with joint TCI state indication (two modes, a first mode for m=0 and n=0, and a second mode for m=1 and n=1), configuring the UE with separate TCI state indication would have required 4 modes which increases the fragmentation of the activated TCI state codepoints and reduces the number of active codepoints for each mode which is not desirable.

In one example, if M=2 (m=0, m=1) and N=2 (n=0, n=1), the UE can only be configured with joint TCI state indication (two modes, a first mode for m=0 and n=0, and a second mode for m=1 and n=1), configuring the UE with separate TCI state indication would have required 4 modes which increases the fragmentation of the activated TCI state codepoints and reduces the number of active codepoints for each mode which is not desirable.

In one example, (1) if M=1 and N=1, the UE can be configured with joint TCI state indication (single mode), or separate TCI state indication (two modes, a first mode for DL and a second mode for UL); and (2) if M=2 (m=0, m=1) and N=1 (n=0), the UE can only be configured with joint TCI state indication for m=0 and n=0 (two modes, a first mode for m=0 and n=0, and a second mode for m=1), configuring the UE with separate TCI state indication would have required 3 modes which increases the fragmentation of the activated TCI state codepoints and reduces the number of active codepoints for each mode which is not desirable.

In one example, if M=2 (m=0, m=1) and N=1 (n=0), the UE can only be configured with joint TCI state indication for m=0 and n=0 (two modes, a first mode for m=0 and n=0, and a second mode for m=1), configuring the UE with separate TCI state indication would have required 3 modes which increases the fragmentation of the activated TCI state codepoints and reduces the number of active codepoints for each mode which is not desirable.

In the above examples a single TCI state codepoint is indicated and the TCI state of the corresponding entity is updated. The TCI state of the remaining entities is not changed.

In one example II.5.8, the gNB/NW can indicate to the UE in a DCI Format (e.g., a DL related DCI Format with a DL assignment or without a DL assignment, an UL related DCI Format with an UL grant or without an UL grant or a DCI Format for TCI state indication) 2 DL TCI states (m=0 and m=1) and/or 2 UL TCI states (n=0 and n=1) using one TCI state codepoint. The TCI state field in the DCI format of size k-bits can indicate one of K code points, wherein $K=2^k$.

In one example II.5.8.1, the TCI states for m=0, n=0, m=1 and n=1 are mapped to a TCI state code point.

For joint TCI states, two TCI states are mapped to a TCI state code point. The first TCI state is a joint TCI state for m=0 and n=0. The second TCI state is a joint TCI state for m=1 and n=1. This is illustrated in TABLE 21.

TABLE 21

TCI state code points with two joint TCI states per TCI state code point.

| TCI State Code Point | First Joint TCI State (for m = 0 and n = 0) | Second Joint TCI State (for m = 1 and n = 1) |
|---|---|---|
| 0 | Joint TCI State (0, 0) | Joint TCI State (1, 0) |
| 1 | Joint TCI State (0, 1) | Joint TCI State (1, 1) |
| ... | ... | ... |

In on example, if the number of TCI state code points is K, the number of first joint TCI states and second Joint TCI states for full pairing is $\sqrt{K}$. For example, with K=16, it may have full pairing of 4 first joint TCI states with 4 second joint TCI states.

For separate TCI states, four TCI states are mapped to a TCI state code point. The first TCI state is a DL TCI state for m=0. The second TCI state is an UL TCI state for n=0. The third TCI state is a DL TCI state for m=1. The fourth TCI state is an UL TCI state for n=1. This is illustrated in TABLE 22.

TABLE 22

TCI state code points with four separate TCI states per TCI state code point.

| TCI State Code Point | First DL TCI State (m = 0) | First UL TCI State (n = 0) | Second DL TCI State (m = 1) | Second UL TCI State (n = 1) |
|---|---|---|---|---|
| 0 | DL TCI State (0, 0) | UL TCI State (0, 0) | DL TCI State (1, 0) | UL TCI State (1, 0) |
| 1 | DL TCI State (0, 1) | UL TCI State (0, 1) | DL TCI State (1, 1) | UL TCI State (1, 1) |
| ... | ... | ... | ... | ... |

In one example, if the number of TCI state code points is K, the number of first DL TCI states (m=0), first UL TCI states (n=0), second DL TCI states (m=1) and second UL TCI (n=1) states for full pairing is $\sqrt[4]{K}$. For example, with K=16, it may have full pairing of 2 first DL TCI states with 2 first UL TCI states with 2 second DL TCI state and with 2 second UL TCI states. It should be noted that using separate TCI states with M=2 and N=2 limits the number of TCI states that can be indicated when compared to joint TCI states with M=2 and N=2 for the same number of code points.

In one example II.5.8.1.1, the UE is configured (e.g., by RRC signaling and/or MAC CE signaling and/or L1 control signaling) to use joint TCI states, and joint TCI state code points are activated for example as indicated in TABLE 21.

In another example II.5.8.1.2, the UE is configured (e.g., by RRC signaling and/or MAC CE signaling and/or L1 control signaling) to use separate TCI states, and separate TCI state code points are activated for example as indicated in TABLE 22.

In another example II.5.8.1.3, the UE is not configured to use only joint TCI states or only separate TCI states or is configured (e.g., by RRC signaling and/or MAC CE signaling and/or L1 control signaling) to use a combination of joint and separate TCI states, and TCI state code points are activated for example using some code points from TABLE 16 and some code points from TABLE 22.

In one example II.5.8.2, the TCI states for m=0, n=0, m=1 and n=1 are mapped individually to a TCI state code point. i.e., the TCI state code points are divided between m=0, n=0, m=1, n=1.

For joint TCI states, one TCI state is mapped to a TCI state code point. One set of code points are mapped to the joint TCI state for m=0 and n=0, and one set of code points (remaining code points) are mapped to the joint TCI state for m=1 and n=1. This is illustrated in TABLE 23. The TCI state code points can be divided evenly between the TCI states as illustrated in TABLE 23; or the TCI state code points can be divided unevenly between the TCI states.

TABLE 23

TCI state code points with one TCI state per TCI state code point with joint TCI state indication and M = 2 and N = 2.

| TCI State Code Point | TCI State |
|---|---|
| 0 | Joint TCI State (0, 0), for m = 0 and n = 0 |
| 1 | Joint TCI State (0, 1), for m = 0 and n = 0 |
| . . . | . . . |
| K/2 | Joint TCI State (1, 0), for m = 1 and n = 1 |
| K/2 + 1 | Joint TCI State (1, 1), for m = 1 and n = 1 |
| . . . | . . . |

In one example, if the number of TCI state code points is K, the number of first joint TCI states (m=0, n=0) and second Joint TCI states (m=1, n=1) is K/2 each. For example, with K=16, it may have 8 first joint TCI states and 8 second joint TCI states. The indicated TCI state is either a first Joint TCI state or a second joint TCI state. The UE applies the indicated TCI state and keeps the remaining TCI states unchanged.

For separate TCI states, one TCI states is mapped to a TCI state code point. One set of code points are mapped to the DL TCI state for m=0. One set of code points are mapped to the UL TCI state for n=0. One set of code points are mapped to the DL TCI state for m=1. One set of code points (remaining code points) are mapped to the UL TCI state for n=1. This is illustrated in TABLE 24. The TCI state code points can be divided evenly between the TCI states as illustrated in TABLE 24; or the TCI state code points can be divided unevenly between the TCI states.

TABLE 24

TCI state code points with one TCI state per TCI state code point with separate TCI state indication and M = 2 and N = 2.

| TCI State Code Point | TCI State |
|---|---|
| 0 | DL TCI State (0, 0), for m = 0 |
| 1 | DL TCI State (0, 1), for m = 0 |
| . . . | . . . |
| K/4 | UL TCI State (0, 0), for n = 0 |
| K/4 + 1 | UL TCI State (0, 1), for n = 0 |
| . . . | . . . |
| K/2 | DL TCI State (1, 0), for m = 1 |
| K/2 + 1 | DL TCI State (1, 1), for m = 1 |
| . . . | . . . |

TABLE 24-continued

TCI state code points with one TCI state per TCI state code point with separate TCI state indication and M = 2 and N = 2.

| TCI State Code Point | TCI State |
|---|---|
| 3K/4 | UL TCI State (1, 0), for n = 1 |
| 3K/4 + 1 | UL TCI State (1, 1), for n = 1 |
| . . . | . . . |

In one example, if the number of TCI state code points is K, the number of first DL TCI states (for m=0), first UL TCI states (for n=0), second DL TCI states (for m=1) and second UL TCI states (n=1) is K/4 each. For example, with K=16, it may have 4 first DL TCI states, 4 first UL TCI states, 4 second DL TCI states and 4 second UL TCI states. It should be noted that using separate TCI states with M=2 and N=2 limits the number of TCI states that can be indicated when compared to joint TCI states with M=2 and N=2 for the same number of code points. The indicated TCI state is either a first DL TCI state, a first UL TCI state, a second DL TCI state, or a second UL TCI state. The UE applies the indicated TCI state and keeps the remaining TCI states unchanged.

In another example II.5.8.3 for separate TCI states, two TCI states are mapped to a TCI state code point. One set of code points are mapped to the DL TCI state for m=0 and UL TCI state for n=0. One set of code points (remaining code points) are mapped to the DL TCI state for m=1 and UL TCI state for n=1. This is illustrated in TABLE 25. The TCI state code points can be divided evenly between the TCI states as illustrated in TABLE 25; or the TCI state code points can be divided unevenly between the TCI states.

TABLE 25

TCI state code points with two TCI states per TCI state code point with separate TCI state indication and M = 2 and N = 2.

| TCI State Code Point | First TCI State | Second TCI State |
|---|---|---|
| 0 | DL TCI State (0, 0), for m = 0 | UL TCI State (0, 0), for n = 0 |
| 1 | DL TCI State (0, 1), for m = 0 | UL TCI State (0, 1), for n = 0 |
| . . . | . . . | . . . |
| K/2 | DL TCI State (1, 0), for m = 1 | UL TCI State (1, 0), for n = 1 |
| K/2 + 1 | DL TCI State (1, 1), for m = 1 | UL TCI State (1, 1), for n = 1 |
| . . . | . . . | . . . |

In another example II.5.8.4, for separate TCI states, two TCI states is mapped to a TCI state code point. One set of code points are mapped to the DL TCI state for m=0 and DL TCI state for m=1. One set of code points (remaining code points) are mapped to the UL TCI state for n=0 and UL TCI state for n=1. This is illustrated in TABLE 26. The TCI state code points can be divided evenly between the TCI states as illustrated in TABLE 26; or the TCI state code points can be divided unevenly between the TCI states.

TABLE 26

TCI state code points with two TCI states per TCI state code point with separate TCI state indication and M = 2 and N = 2.

| TCI State Code Point | First TCI State | Second TCI State |
|---|---|---|
| 0 | DL TCI State (0, 0), for m = 0 | DL TCI State (1, 0), for m = 1 |

TABLE 26-continued

TCI state code points with two TCI states per TCI state code point with separate TCI state indication and M = 2 and N = 2.

| TCI State Code Point | First TCI State | Second TCI State |
|---|---|---|
| 1 | DL TCI State (0, 1), for m = 0 | DL TCI State (1, 1), for m = 1 |
| ... | ... | ... |
| K/2 | UL TCI State (0, 0), for n = 0 | UL TCI State (1, 0), for n = 1 |
| K/2 + 1 | UL TCI State (0, 1), for n = 0 | UL TCI State (1, 1), for n = 1 |
| ... | ... | ... |

In one example II.5.8.5.1, the UE is configured (e.g., by RRC signaling and/or MAC CE signaling and/or L1 control signaling) to use joint TCI states, and joint TCI state code points are activated for example as indicated in TABLE 21.

In another example II.5.8.5.2, the UE is configured (e.g., by RRC signaling and/or MAC CE signaling and/or L1 control signaling) to use separate TCI states, and separate TCI state code points are activated for example as indicated in combination of one or more of TABLES 24-26.

In another example II.5.8.5.3, the UE is not configured to use only joint TCI states or only separate TCI states or is configured (e.g., by RRC signaling and/or MAC CE signaling and/or L1 control signaling) to use a combination of joint and separate TCI states, and TCI state code points are activated for example using some code points from TABLE 23 and (some code points from TABLE 24, TABLE 25, and/or TABLE 26).

In one example II.5.8.6, the TCI code points are a combination of code points from example II.5.8.1 and example II.5.8.2, 11.5.8.3, 11.5.8.4.

For example, for joint TCI states, the code points can be a combination of the code points illustrated in TABLE 21 and TABLE 23. For separate TCI states, the code points can be a combination of the code points illustrated in TABLE 22 and (TABLE 24, TABLE 25, and/or TABLE 26).

In one example II.5.8.6.1, the UE is configured (e.g., by RRC signaling and/or MAC CE signaling and/or L1 control signaling) to use joint TCI states, and joint TCI state code points are activated for example using some code points from TABLE 21 and TABLE 23.

In another example II.5.8.6.2, the UE is configured (e.g., by RRC signaling and/or MAC CE signaling and/or L1 control signaling) to use separate TCI states, and separate TCI state code points are activated for example using some code points from TABLE 22 and (some code points from TABLES 24-26).

In another example II.5.8.6.3, the UE is not configured to use only joint TCI states or only separate TCI states or is configured (e.g., by RRC signaling and/or MAC CE signaling and/or L1 control signaling) to use a combination of joint and separate TCI states, and TCI state code points are activated for example using some code points from TABLE 21, some code points from TABLE 22, some code points from TABLE 23 and (some code points from TABLE 24, TABLE and/or TABLE 26).

$M$, $N$, $K_d$, $K_u$ and/or $K_{js}$ can be configured or updated by MAC CE signaling and/or RRC signaling. Due to the inter-dependence of some of these parameters, not all parameters need to be signaled.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), comprising:
a transceiver configured to:
receive first information for indicating one of: (i) a joint transmission configuration indicator (TCI) state configuration for downlink (DL) and uplink (UL) or (ii) a separate TCI state configuration for each of the DL and the UL,
receive second information on a first set of TCI states for the joint TCI state configuration or for the DL,
receive third information on a second set of TCI states for the UL in case that the first information indicates the separate TCI state configuration,
receive a message for activating at least one TCI state among the first set or the second set, via medium access control-control element (MAC CE) signaling, the at least one activated TCI state being mapped to one or more codepoints of a TCI field in downlink control information (DCI) based on the message, and
receive the DCI including the TCI field; and
a processor operably coupled to the transceiver and configured to identify a TCI state to apply to at least one of a DL channel or a UL channel,
wherein the transceiver is further configured to receive the DL channel or transmit the UL channel based on the identified TCI state, and
wherein, in case that a number of the one or more codepoints mapped to the at least one activated TCI state is one, the identified TCI state is the at least one activated TCI state.

2. The UE of claim 1, wherein, in case that the number of the one or more codepoints mapped to the at least one activated TCI state is two or more, the identified TCI state is based on a codepoint indicated by the TCI field among the at least one activated TCI state.

3. The UE of claim 1, wherein, in case that the first information indicates the separate TCI state configuration, the message maps a codepoint of the TCI field with one of:
a DL TCI state for the DL channel from the first set,
a UL TCI state for the UL channel from the second set, or
a pair of the DL TCI state for the DL channel and the UL TCI state for the UL channel.

4. The UE of claim 3, wherein:
the first information indicates the separate TCI state configuration,
in case that the codepoint indicated by the TCI field is mapped with the DL TCI state, the DL TCI state is applied to receive the DL channel and a previously signaled UL TCI state is applied to transmit the UL channel,
in case that the codepoint indicated by the TCI field is mapped with the UL TCI state, a previously signaled DL TCI state is applied to receive the DL channel and the UL TCI state is applied to transmit the UL channel, and in case that the codepoint indicated by the TCI field is mapped with the pair, the DL TCI state is applied to receive the DL channel and the UL TCI state is applied to transmit the UL channel.

5. The UE of claim 1, wherein, in case that the first information indicates the joint TCI state configuration, the message maps a codepoint of the TCI field with a joint TCI state for the DL channel and the UL channel from the first set.

6. The UE of claim 1, wherein:
a source reference signal associated with a TCI state of the first set is at least one of:
a non-zero power channel state information-reference signal (NZP CSI-RS) for beam management, and
a NZP CSI-RS for tracking or a tracking reference signal (TRS), and
a source reference signal associated with a TCI state of the second set is at least one of:
the NZP CSI-RS for beam management,
the NZP CSI-RS for tracking or the TRS,
a sounding reference signal (SRS), and
a synchronization signal/physical broadcast channel (PBCH) block (SSB).

7. A base station (BS), comprising:
a processor; and
a transceiver operably coupled to the transceiver and configured to:
transmit, to a user equipment (UE), first information for indicating one of: (i) a joint transmission configuration indicator (TCI) state configuration for downlink (DL) and uplink (UL) or (ii) a separate TCI state configuration for each of the DL and the UL,
transmit, to the UE, second information on a first set of TCI states for the joint TCI state configuration or the DL,
transmit, to the UE, third information on a second set of TCI states for the UL in case that the first information indicates the separate TCI state configuration,
transmit, to the UE, a message for activating at least one TCI state among the first set or the second set, via medium access control-control element (MAC CE) signaling, the at least one activated TCI state being mapped to one or more codepoints of a TCI field in downlink control information (DCI) based on the message,
transmit, to the UE, the DCI including TCI field, and
transmit, to the UE, a DL channel or receive, from the UE, a UL channel based on a TCI state,
wherein, in case that a number of the one or more codepoints mapped to the at least one activated TCI state is one, the TCI state is the at least one activated TCI state.

8. The BS of claim 7, wherein, in case that the number of the one or more codepoints mapped to the at least one activated TCI state is two or more, the TCI state is based on a codepoint indicated by the TCI field among the at least one activated TCI state.

9. The BS of claim 7, wherein, in case that the first information indicates the separate TCI state configuration, the message maps a codepoint of the TCI field with one of:
a DL TCI state for the DL channel from the first set,
a UL TCI state for the UL channel from the second set, or
a pair of the DL TCI state for the DL channel and the UL TCI state for the UL channel.

10. The BS of claim 9, wherein:
the first information indicates the separate TCI state configuration,
in case that the codepoint indicated by the TCI field is mapped with the DL TCI state, the DL TCI state is for the DL channel and a previously signaled UL TCI state is for the UL channel,
in case that the codepoint indicated by the TCI field is mapped with the UL TCI state, a previously signaled DL TCI state is for the DL channel and the UL TCI state is for the UL channel, and
in case that the codepoint indicated by the TCI field is mapped with the pair, the DL TCI state is for the DL channel and the UL TCI state is for the UL channel.

11. The BS of claim 7, wherein, in case that the first information indicates the joint TCI state configuration, the message maps a codepoint of the TCI field with a joint TCI state for the DL channel and the UL channel.

12. The BS of claim 7, wherein:
a source reference signal associated with a TCI state of the first set is at least one of:
a non-zero power channel state information-reference signal (NZP CSI-RS) for beam management, and
a NZP CSI-RS for tracking or a tracking reference signal (TRS), and
a source reference signal associated with a TCI state of the second set is at least one of:
the NZP CSI-RS for beam management,
the NZP CSI-RS for tracking or the TRS,
a sounding reference signal (SRS), and
a synchronization signal/physical broadcast channel (PBCH) block (SSB).

13. A method performed by a user equipment (UE) in a wireless communication system, the method comprising:
receiving first information for indicating one of (i) a joint transmission configuration indicator (TCI) state configuration for downlink (DL) and uplink (UL) or (ii) a separate TCI state configuration for each of the DL and the UL;
receiving second information on a first set of TCI states for the joint TCI state configuration or for the DL;
receiving third information on a second set of TCI states for the UL in case that the first information indicates the separate TCI state configuration;
receiving a message for activating at least one TCI state among the first set or the second set, via medium access control-control element (MAC CE) signaling, the at least one activated TCI state being mapped to one or more codepoints of a TCI field in downlink control information (DCI) based on the message;
receiving the DCI including the TCI field;
identifying a TCI state to apply to at least one of a DL channel or a UL channel; and
receiving the DL channel or transmitting the UL channel based on the identified TCI state,
wherein, in case that a number of the one or more codepoints mapped to the at least one activated TCI state is one, the identified TCI state is the at least one activated TCI state.

14. The method of claim 13, wherein, in case that the number of the one or more codepoints mapped to the at least one activated TCI state is equal to or more than two, the identified TCI state is based on a codepoint indicated by the TCI field among the at least one activated TCI state.

15. The method of claim 13, wherein, in case that the first information indicates the separate TCI state configuration, the message maps a codepoint of the TCI field with one of:
- a DL TCI state for the DL channel from the first set,
- a UL TCI state for the UL channel from the second set, or
- a pair of the DL TCI state for the DL channel and the UL TCI state for the UL channel.

16. The method of claim 15, wherein:
- the first information indicates the separate TCI state configuration,
- in case that the codepoint indicated by the TCI field is mapped with the DL TCI state, the first TCI state corresponds to the DL TCI state is applied to receive the DL channel and a previously signaled UL TCI state is applied to transmit the UL channel,
- in case that the codepoint indicated by the TCI field is mapped with the UL TCI state, a previously signaled DL TCI state is applied to receive the DL channel and the UL TCI state is applied to transmit the UL channel, and
- in case that the codepoint indicated by the TCI field is mapped with the pair, the DL TCI state is applied to receive the DL channel and the UL TCI state is applied to transmit the UL channel.

17. The method of claim 13, wherein, in case that the first information indicates the joint TCI state configuration, the message maps a codepoint of the TCI field with a joint TCI state for the DL channel and the UL channel from the first set.

18. The method of claim 13, wherein:
- a source reference signal associated with a TCI state of the first set is at least one of:
  - a non-zero power channel state information-reference signal (NZP CSI-RS) for beam management, and
  - a NZP CSI-RS for tracking or a tracking reference signal (TRS), and
- a source reference signal associated with a TCI state of the second set is at least one of:
  - the NZP CSI-RS for beam management,
  - the NZP CSI-RS for tracking or the TRS,
  - a sounding reference signal (SRS), and
  - a synchronization signal/physical broadcast channel (PBCH) block (SSB).

* * * * *